United States Patent
Yamashita et al.

(10) Patent No.: US 8,022,287 B2
(45) Date of Patent: Sep. 20, 2011

(54) MUSIC COMPOSITION DATA RECONSTRUCTION DEVICE, MUSIC COMPOSITION DATA RECONSTRUCTION METHOD, MUSIC CONTENT REPRODUCTION DEVICE, AND MUSIC CONTENT REPRODUCTION METHOD

(75) Inventors: Kosei Yamashita, Kanagawa (JP); Yasushi Miyajima, Kanagawa (JP); Motoyuki Takai, Tokyo (JP); Yoichiro Sako, Tokyo (JP); Toshiro Terauchi, Tokyo (JP); Toru Sasaki, Tokyo (JP); Yuichi Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 771 days.

(21) Appl. No.: 11/721,759

(22) PCT Filed: Dec. 9, 2005

(86) PCT No.: PCT/JP2005/022631
§ 371 (c)(1),
(2), (4) Date: Jun. 14, 2007

(87) PCT Pub. No.: WO2006/064722
PCT Pub. Date: Jun. 22, 2006

(65) Prior Publication Data
US 2009/0249945 A1  Oct. 8, 2009

(30) Foreign Application Priority Data
Dec. 14, 2004  (JP) .................................. 2004-360670

(51) Int. Cl.
*G10H 1/40* (2006.01)
(52) U.S. Cl. ................ 84/611; 84/609; 84/635; 84/649; 84/651; 84/667

(58) Field of Classification Search ........................ None
See application file for complete search history.

(56) References Cited

U.S. PATENT DOCUMENTS

| | | | |
|---|---|---|---|
| 5,576,685 A | 11/1996 | Saito | |
| 5,876,213 A | 3/1999 | Matsumoto | |
| 5,919,047 A | 7/1999 | Sone | |
| 6,463,014 B1 | 10/2002 | Kanou et al. | |
| 7,030,308 B2 * | 4/2006 | Yagi | 84/484 |
| 2001/0015123 A1 | 8/2001 | Nishitani et al. | |
| 2003/0167908 A1 * | 9/2003 | Nishitani et al. | 84/723 |
| 2003/0221544 A1 * | 12/2003 | Weissflog | 84/667 |

(Continued)

FOREIGN PATENT DOCUMENTS

CN  1150289 A  5/1997

(Continued)

*Primary Examiner* — Marlo Fletcher
(74) *Attorney, Agent, or Firm* — Oblon, Spivak, McClelland, Maier & Neustadt, L.L.P.

(57) ABSTRACT

An apparatus that allows a musical piece to be recomposed by reflecting, for example, the mood, preference, and ambient environment of a listening user in the musical piece in real time. The apparatus includes a rhythm master unit and a rhythm slave unit. The rhythm master unit generates synchronization signals containing a signal having a period corresponding to a measure of a musical piece and a signal having a period corresponding to a beat of the musical piece and also generates musical-piece recomposition information in synchronization with the synchronization signals. The rhythm slave unit recomposes musical-piece data of input music content in accordance with the synchronization signals and the musical-piece recomposition information, generates output musical-piece data, and outputs the musical-piece data to the rhythm slave unit.

37 Claims, 30 Drawing Sheets

U.S. PATENT DOCUMENTS

| | | | |
|---|---|---|---|
| 2004/0079220 A1* | 4/2004 | Yagi | 84/484 |
| 2007/0022867 A1* | 2/2007 | Yamashita | 84/612 |
| 2008/0034947 A1* | 2/2008 | Sumita | 84/613 |
| 2008/0115656 A1* | 5/2008 | Sumita | 84/612 |

FOREIGN PATENT DOCUMENTS

| | | | |
|---|---|---|---|
| CN | 1161525 A | | 10/1997 |
| CN | 1495754 A | | 5/2004 |
| JP | 3 163498 | | 7/1991 |
| JP | 5 204387 | | 8/1993 |
| JP | 5-204387 | | 8/1993 |
| JP | 8-115084 | | 5/1996 |
| JP | 10-63265 | | 3/1998 |
| JP | 10 63265 | | 3/1998 |
| JP | 11 305777 | | 11/1999 |
| JP | 11-305777 | | 11/1999 |
| JP | 2000 269840 | | 9/2000 |
| JP | 2001 184061 | | 7/2001 |
| JP | 2001-184061 | | 7/2001 |
| JP | 2001-189969 | | 7/2001 |
| JP | 2001 189969 | | 7/2001 |
| JP | 2001 195059 | | 7/2001 |
| JP | 2001-195059 | | 7/2001 |
| JP | 2001 296865 | | 10/2001 |
| JP | 2002-114107 | | 4/2002 |
| JP | 2002 114107 | | 4/2002 |
| JP | 2003 5756 | | 1/2003 |
| JP | 2003 173350 | | 6/2003 |
| JP | 2003 177784 | | 6/2003 |
| JP | 2003-271138 | | 9/2003 |
| JP | 2003 271138 | | 9/2003 |
| JP | 2004-213047 | | 7/2004 |
| JP | 2004 213047 | | 7/2004 |

* cited by examiner

EXAMPLE OF APPLICATION
TO OPTICAL DISC

FIG. 15

| MUSICAL-PIECE MATERIAL NAME | CHORD VALUE | BMP VALUE | MUSICAL INSTRUMENT NAME | FEELING VALUE (UPTEMPO FEELING) |
|---|---|---|---|---|
| MATERIAL 3A | F | 120 | GUITAR | |
| MATERIAL 3B | F | 120 | GUITAR | |
| | | | | 1 |
| | | | | 2 |
| | | | | 3 |
| | | | | 4 |
| | | | | 5 |
| | | | | 6 |
| | | | | 7 |
| | | | | 8 |

| MUSICAL-PIECE MATERIAL NAME | CHORD VALUE | BMP VALUE | MUSICAL INSTRUMENT NAME | FEELING VALUE (UPTEMPO FEELING) |
|---|---|---|---|---|
| MATERIAL 2A | E | 100 | PIANO | |
| MATERIAL 2B | E | 100 | PIANO | |
| | | | | 1 |
| | | | | 2 |
| | | | | 3 |
| | | | | 4 |
| | | | | 5 |
| | | | | 6 |
| | | | | 7 |
| | | | | 8 |

| MUSICAL-PIECE MATERIAL NAME | CHORD VALUE | BMP VALUE | MUSICAL INSTRUMENT NAME | FEELING VALUE (UPTEMPO FEELING) |
|---|---|---|---|---|
| MATERIAL 1A | D | 140 | VOCAL | 1 |
| MATERIAL 1B | D | 140 | VOCAL | 2 |
| MATERIAL 1C | D | 140 | VOCAL | 3 |
| MATERIAL 1D | D | 140 | VOCAL | 4 |
| MATERIAL 1E | D | 140 | VOCAL | 5 |
| MATERIAL 1F | D | 140 | VOCAL | 6 |
| MATERIAL 1G | D | 140 | VOCAL | 7 |
| MATERIAL 1H | D | 140 | VOCAL | 8 |

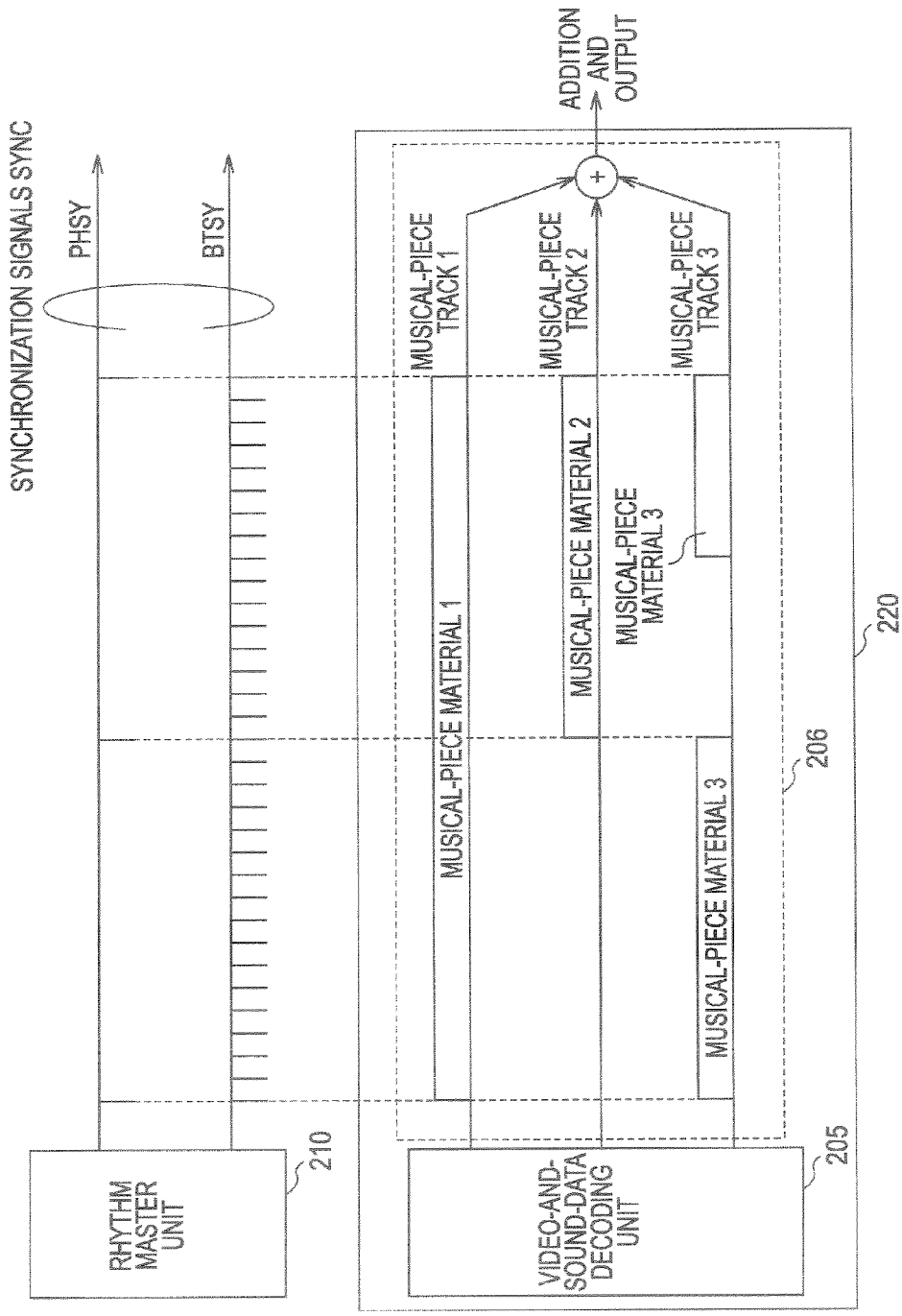

MUSIC COMPOSITION DATA RECONSTRUCTION DEVICE, MUSIC COMPOSITION DATA RECONSTRUCTION METHOD, MUSIC CONTENT REPRODUCTION DEVICE, AND MUSIC CONTENT REPRODUCTION METHOD

TECHNICAL FIELD

This invention relates to a musical-piece data recomposing apparatus, a musical-piece data recomposing method, a music-content playback apparatus, and a music-content playback method which can provide playback audio data that is equivalent to, for example, audio data played back through music-content arrangement performed by a disk jockey.

BACKGROUND ART

With increased storage capacities of storage media such as optical discs and hard disks, a large amount of music content can be stored in the storage media. Music-content playback apparatuses using the large-capacity storage media are also available.

In such a conventional music-content playback apparatus, a user who views/listens to music selects music content he or she desires to listen to from a large amount of music content and performs a playback operation.

Also, for example, a system for recommending playback musical-piece candidates to a user by using playback history regarding the user's previous music content is also provided (refer to, e.g., Japanese Unexamined Patent Application Publication No. 2003-173350).

DISCLOSURE OF INVENTION

As described above, conventionally, a method has been proposed in which a user performs selection or an apparatus performs selection based on previous playback history to present playback musical-piece candidates to the user. However, in the conventional music-content playback apparatus, musical pieces that are selected as described above and that are to be played back are only played back as intended by the musical-piece producer. Thus, an apparatus that allows a personal preference to be reflected in playback musical pieces, for example, particularly, that allows a change in tune to be made for each user, does not exist.

That is, with respect to musical piece created by the producer side including an artist and so on, what the user can do is to just listen to the musical-piece in a fixed manner as intended by the producer, due to restrictions and so on of the conventional music-content playback apparatus.

However, if it is possible to recompose and modify a musical piece so as to meet the mood at a given place, just like the so-called "disk jockey" does, by changing the tempo or interval of the musical piece, remixing the musical piece with another musical piece, and so on, it can be expected that an entertainment aspect of the musical-piece playback can be improved.

In view of the foregoing points, an object of the present invention is to allow, for example, the mood, preference, and ambient environment of a listening user to be reflected in a musical piece in real time to recompose the musical piece, thereby making it possible to improve the entertainment aspect of the musical-piece playback.

In order to overcome the above described problems, a musical-piece data recomposing apparatus according to an aspect of claim 1 includes:

a rhythm master unit for generating synchronization signals containing a signal having a period corresponding to a measure of a musical piece and a signal having a period corresponding to a beat of the musical niece and generating musical-piece recomposition information in synchronization with the synchronization signals; and a rhythm slave unit for generating output musical-piece data by recomposing input musical-piece data of music content in accordance with the synchronization signals and the musical-piece recomposition information from the rhythm master unit and for outputting the output musical-piece data.

The aspect of claim 1 allows, for example, the mood, preference, and ambient environment of the listening user to be reflected in real time to recompose the musical-piece data of music content to be played back, in accordance with the synchronization signals and the musical-piece recomposition information from the rhythm master unit.

A music-content playback apparatus according to an aspect of claim 17 includes:

a music-content-data storage unit in which data of multiple pieces of music content are stored;

first obtaining means for obtaining, from the music-content-data storage unit, the data of music content to be played back;

rhythm master means for generating synchronization signals containing a signal having a period corresponding to a measure of a musical piece and a signal having a period corresponding to a beat of the musical piece and generating musical-piece recomposition information in synchronization with the synchronization signals; and rhythm slave means for generating output musical-piece data by recomposing the music content data to be played back, the music content data being obtained by the first obtaining means, in accordance with the synchronization signals and the musical-piece recomposition information from the rhythm master unit, and for performing sound playback and output.

According to the aspect of claim 17, when music content stored in the music-content-data storage unit is played back, the musical-piece data of the music content to be played back can be recomposed in accordance with the synchronization signals and the musical-piece recomposition information from the rhythm master. Thus, for example, the mood, preference, and ambient environment of the user (listener) who is listening to the musical piece are reflected in real time in accordance with the synchronization signals and the musical-piece recomposition information from the rhythm master unit. This allows the user (listener) to give a listening request at a given time to playback a musical piece.

BRIEF DESCRIPTION OF THE DRAWINGS

FIG. 15 is a diagram for describing part of the functional block diagram shown in FIG. 11.

FIG. 16 is a timing diagram for describing the functional block diagram shown in FIG. 11.

BEST MODE FOR CARRYING OUT THE INVENTION

First Embodiment

Figure 1:
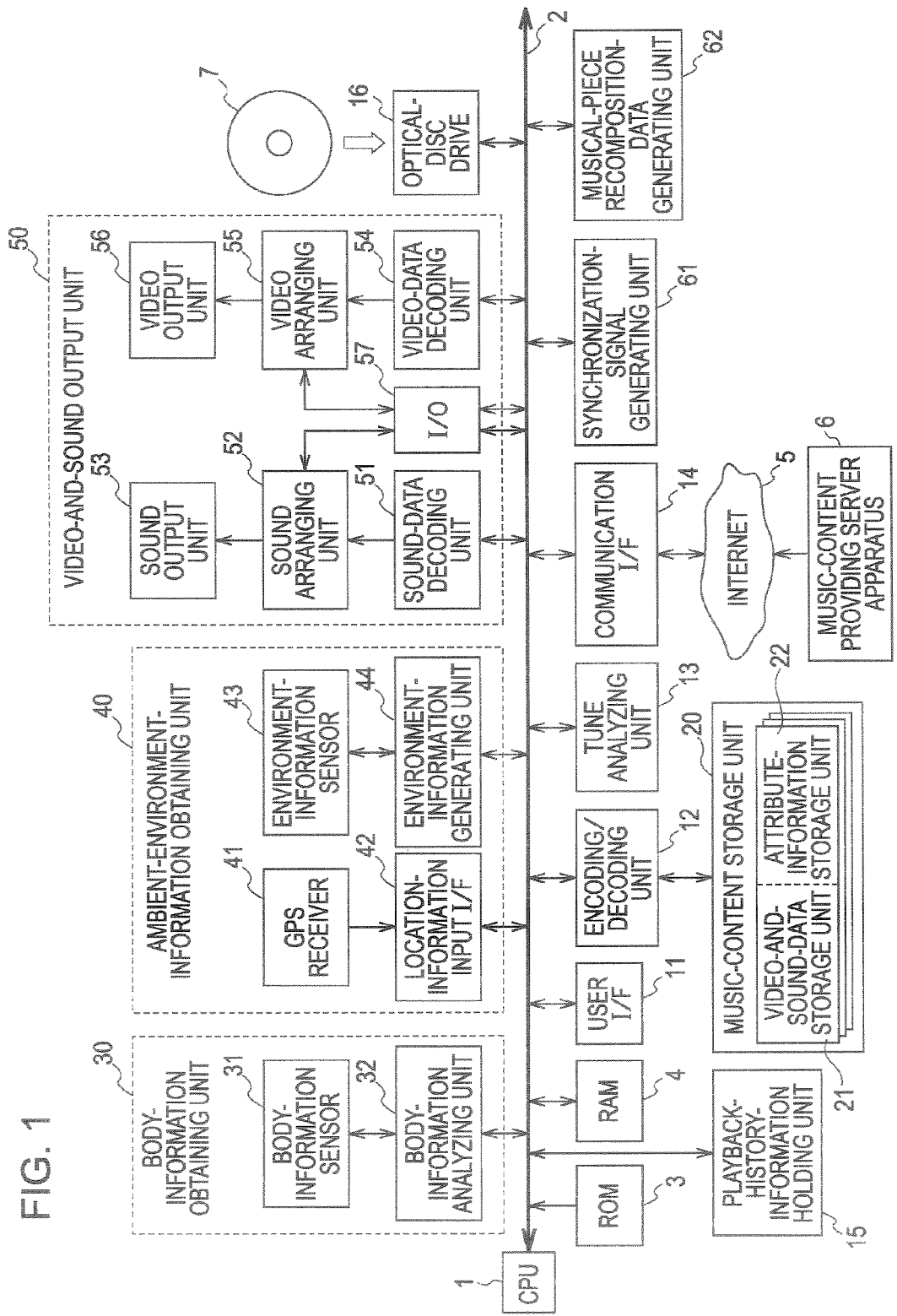
FIG. 1 is a block diagram of a recording/playback apparatus to which a first embodiment of a music-content playback apparatus of the present invention is applied.

A first embodiment of the present invention will be described with reference to the drawings. FIG. 1 is a block diagram showing the configuration of one example of a recording/playback apparatus to which a first embodiment of a music-content playback apparatus of the present invention and a first embodiment of a music-content and attribute-information recording apparatus are applied.

In this first embodiment, the recording/playback apparatus includes a music-content storage unit in which video-and-sound data are stored as the data of music content. It is designed that the video-and-sound data may contain video data in addition to the sound data of musical pieces. In this first embodiment, attribute information for the respective musical pieces accompanies the data of music content, and is stored and associated therewith by the identification information of the music content.

The attribute information includes not only tune attribute information (which is contained in musical-piece composition information described below) for determining the tune in connection with rhythms, such as a tempo, key (tone) chord (chord), but also player information, lyric information, feeling information, ambient-environment information, and so on. When music content contains video information, the attribute information may contain information regarding the attributes of the video.

As described above, when music content is stored in a removable (detachable) storage medium such as a DVD (digital versatile disc) and the attribute information is recorded in the storage medium in association with the music content, the attribute information recorded in the storage medium can be used.

When the data of music content is recorded from the storage medium such as a DVD into a storage unit of the recording/playback apparatus, the attribute information is also recorded therein in association with the data of the music content.

When no attribute information is recorded in the storage medium the recording/playback apparatus generates necessary attribute information and records the generated attribute information in association with the video-and-sound data of music content to be recorded, during recording the data of music content from the storage medium to the storage unit of the recording/playback apparatus.

The recording/playback apparatus in this first embodiment is configured so that information of the music content can also be downloaded from, for example, a music-content providing server on the Internet.

It is assumed that the music-content information from the music-content providing server in this example is accompanied by attribute information. Upon receiving a music-content obtaining request from the recording/playback apparatus in this first embodiment, the music-content providing server causes the attribute information to be downloaded to the recording/playback apparatus together with the video-and-sound data of the requested music content.

The recording/playback apparatus associates the downloaded video-and-sound data and the attribute information by using the identification information of the music content and stores the video-and-sound data and the attribute information.

In the recording/playback apparatuses of this example includes a microcomputer. As shown in FIG. 1, a program ROM (read only memory) 3, and a RAM (random access memory) 4 for a work area are connected to a CPU (central processing unit) 1 through a system bus 2.

A user interface 11, an encoding/decoding unit 12, a tune analyzing unit 13, a communication interface 14, a playback-history-information holding unit 15, and an optical-disc drive 16 are also connected to the system bus 2.

The user interface 11 includes, for example, a button operation unit (not shown) for receiving a user operation input and a display, such as an LCD (fluid crystal display).

A music-content storage unit 20 is connected to the encoding/decoding unit 12. In this example, the music-content storage unit 20 is implemented with, for example, a large-capacity hard-disk device. A write/read device unit that uses a large-capacity writable optical disc can also be used to implement the music-content storage unit 20.

For writing data to the hard-disk device that implements the music-content storage unit 20, the encoding/decoding unit 12 performs processing for encoding write data into data having a format that can be recorded to the hard disk device, and also performs decode processing corresponding to the encoding with respect to data read from the hard disk device. In this case, the encoding processing can involve data compression processing and, correspondingly, the decoding processing can involve data decompression processing.

In this example, the data of music content include not only musical-piece data but also video data associated with the music content and attribute information (which is detailed below) related to the music content.

The music-content storage unit 20 includes a video-and-sound-data storage unit 21, in which musical-piece data and video data for pieces of music content are stored, and an attribute-information storage unit 22, in which attribute information for the pieces of music content are stored. For each piece of music content, the musical-piece data and video data stored in the video-and-sound-data storage unit 21 and the attribute information stored in the attribute-information storage unit 22 are associated with each other by corresponding music-content identification information (a content ID), which identifies the music content.

For storing the musical-piece data of music content to the video-and-sound-data storage unit 21 in the music-content storage unit 20, the tune analyzing unit 13 analyzes the musical-piece data, detects segments of musical-piece materials of a musical piece, and extracts musical-piece composition information of each musical-piece material. This musical-piece composition information is recorded in the attribute-information storage unit 22 as part of the attribute information. Only when the attribute information is attached to the information of music content to be recorded, the tune analyzing unit 13 operates to extract and record the musical-piece composition information as part of the attribute information.

One musical-piece material is a unit to which beats, a measure, and chords can be attached. The musical-piece composition information includes information that serves as a basis for determining the so-called "tune", such as a tempo, key, chord, sound volume, rhythm, musical score, and chord progression, for each musical-piece material of a musical piece.

The communication interface 14 is used for connection to a music-content providing server apparatus 6 or the like through an external network, such as an Internet 5. In this example, the music-content providing server apparatus 6 is configured so that it can provide not only musical-piece data and video data but also the attribute information.

The playback-history-information holding unit 15 holds history information indicating how often, when, and which musical piece was previously listened to using this recording/playback apparatus. The number (frequency) of playbacks, playback time, ambient-environment information during the playback (the ambient-environment information will also be detailed below), and so on are stored in the playback-history-information holding unit 15 in association with the identification information (the content ID) of the played back music content.

The optical-disc drive 16 reads musical-piece data and video data from an optical disc 7, such as a CD (compact disc), a DVD (digital versatile disc), or the like. When the attribute information of the music content is recorded on the optical disc 7, the optical-disc drive 16 also reads the attribute information therefrom.

In the recording/playback apparatus of this example, a body-information obtaining unit 30, an ambient-environment-information obtaining unit 40, and a video-and-sound output unit 50 are further connected the system bus 2.

The body-information obtaining unit 30 includes a body-information sensor 31 and a body-information analyzing unit 32. The body-information sensor 31 detects information for determining whether or not a listener who is viewing/listening to music content is showing a preference for the music content. The body-information sensor 31 detects body information, such as body movement, respiration, blood pressure, body-surface temperature, skin perspiration, and skin resistance, and supplies the body information to the body-information analyzing unit 32.

For example, when the listener is showing a preference for a musical piece he or she is listening to and is in a state of the so-called "riding music", the body movement and respiration may synchronize with a rhythm and tempo of music being played. For example, when it is desired to play a slow melody, the body movement and respiration become slow correspondingly, and also, when the sound volume increases suddenly, the body also may move greatly so as to correspond thereto and a change in respiration, for example, shifting suddenly from temporal breath holding to breathing, may occur correspondingly.

In addition, for example, for a music part with which he or she is on a high, the listener may display changes, such as increases in the pulse and heartbeat and an increase in skin perspiration. For a mellow music part, changes occur so that the pulse and heartbeat becomes slow and stable.

The body-information analyzing unit 32 receives listener-emotion information as described above from the body-information sensor, and sends, to the system bus 2, a result indicating whether or not the listener is showing a preference for the musical piece he or she is listening to. In this case, by also referring to the musical-niece composition information of the music piece being played back, the body-information analyzing unit 32 determines whether or not the listener's body movement is synchronizing with the musical piece.

In this embodiment, the body-information analyzing unit 32 is configured to have threshold values in multiple steps with respect to, for example, the degree of preference based on body information, such as body movement. For example, the body-information analyzing unit 32 is configured to output determinations as to multiple steps, for example, "the listener is not showing a preference (i.e., not riding music)", "the listener is showing a preference, but the degree thereof low", and "the listener is showing a preference considerably (i.e., is riding music).

The ambient-environment-information obtaining unit 40 includes a GPS receiver 41, a location-information input interface 42, an environment-information sensor 43, and an environment-information generating unit 44.

Based on radio waves received from multiple satellites, the GPS receiver 41 performs measurement and computation for determining the location of the GPS receiver 41 and sends a computational result to the location-information input interface 42. In this example, the location-information input interface 42 converts the measurement-and-computation result received from the GPS receiver 41 into, for example, location information such as a place name, and sends the converted information to the system bus 2. The location information indicates the place where the corresponding recording is performed. Thus, when music content is recorded, the location information is recorded as part of the ambient-environment information, which is part of the attribute information.

The environment-information sensor 43 includes a clock unit for detecting a season and date-and-time as well as a temperature sensor and a humidity sensor. The environment-information generating unit 44 receives information from the environment-information sensor 43 and sends information, such as a temperature, humidity, season, and date-and-time, to the system bus 2. When the music content is recorded, the aforementioned information is also recorded as part of the ambient-environment information, which is part of the attribute information.

The video-and-sound output unit 50 includes a sound-data decoding unit 51, a sound arranging unit 52, a sound output unit 53, a video-data decoding unit 54, a video arranging unit 55, a video output unit 56, and an I/O port 57.

When the audio data is a PCM audio signal, which is an uncompressed audio signal, the sound-data decoding unit 51 directly outputs the audio data to the sound output unit 53 via the sound arranging unit 52. When the music data is compressed by ATRAC (Adaptive Transform Acoustic Coding) or AC (Advanced Audio Coding), the sound-data decoding unit 51 extracts (decompresses) the compression. When the data is a MIDI (Music Instrument Digital Interface) data, the sound-data decoding unit 51 decodes and generates digital audio signal from the MIDI data.

The sound arranging unit 52 performs special-effect (effect) processing and mixes data of another musical piece (i.e., remixing), in response to a control signal supplied thereto via the I/O port 57.

In this embodiment, examples of the effect processing performed by the sound arranging unit 52 include applying distortion (distortion) and reverberation (reverb) to sound data.

Remixing is a technique used by a typical disc jockey. In the remixing, multiple music materials are mixed into a musical piece being played back so as not to lose musical integrity for each measure or beat. The remixing uses the musical-piece composition information, such as prepared measure breaks (segments of each musical piece material), tempo information and chord information, to smoothly mix the multiple music materials into the musical piece being played back, in accordance with a music theory.

For remixing in accordance with an instruction from the CPU 1, sound data to be remixed, the sound data being extracted from a musical piece other than the musical piece being played back, is supplied to the sound-data decoding unit 51. Thus, in the present embodiment the sound-data decoding unit 51 has a function that allows decoding processing of sound data being played back and decoding processing of sound data to be remixed to be executed in parallel.

An output of the sound arranging unit 52 is supplied to the sound output unit 53. The sound output unit 53 converts the input digital audio signal into an analog audio signal and supplies the analog audio signal to speakers via an output amplifier (not shown) or to a headphone (not shown) via an output terminal, so that sound playback is performed.

In this embodiment, the video-data decoding unit 54 decodes (extracts (decompresses)) compressed video data that accompanies the music content. In this case, the accompanying compressed video data is, for example, still-image data compressed in a JPEG (Joint Photographic Experts Group) format or the like or moving-image data compressed in an MEPG (Moving Picture Experts Group) 2, MPEG 4 format, or the like. The video-data decoding unit 54 has a function for decompressing and decoding the compression.

The video data decoded by the video-data decoding unit 54 is supplied to the video arranging unit 55. The video arranging unit 55 applies, for example, a special effect (effect) to the video data. A conventional technology is used for the special effect, and details thereof will be omitted in this embodiment.

Video data output from the video arranging unit 55 is supplied to the video output unit 56. The video output unit 56 outputs the digital video data as digital video signals, or outputs analog video signals after conversion, as needed, so that the video signals are displayed on the screen of the display through a video output terminal.

[Description of Attribute Information]

In this embodiment as the attribute information of each piece of music content, various types of information as described below are recorded so as to correspond to a musical piece.

(1) Musical-Piece Composition Information

The musical-piece composition information contains, for example, the aforementioned segment information of each musical-piece material, as well as information of a tempo, key, chord, sound volume, and rhythm of a musical piece, information of a musical score, information of a chord progression, and information of rising of a music waveform for a loop for repeated remixing. For example, a BPM (beat per minute) value is used as the temp information.

The musical-piece composition information indicates the rune of the musical piece. The music-content recording/playback apparatus analyzes the musical-piece composition information, and can determine that musical pieces that are similar in the musical-piece composition information are similar in the tune. Thus, when the listener is showing a preference for a musical piece being played back, musical pieces having tunes similar to the musical piece being played back can be selected as next playback musical-niece candidates, based on the result of analysis of the musical-piece composition information.

When the listener is not showing a preference for the musical piece being played back, a musical piece that seems to be preferred by the listener is detected based on, for example, previous playback history and the musical-piece composition information of the detected musical piece is checked. Further, musical pieces whose musical-piece composition information is similar to that of the detected musical piece are designated as next musical-piece playback candidates. With this arrangement, based on the playback history, musical pieces that are similar in tune to a musical piece that seems be preferred by the listener can be designated as next musical-piece playback candidates.

The use of the segment information of each musical-piece material, the tempo information and so on of each musical piece, chord-progression information, and so on that are contained in the musical-piece composition information makes it possible to perform smooth remixing.

In this case, it is ensured that the video-and-sound data and the attribute information of the music content correspond to each other. For example, the arrangement is such that, for example, time-code information of the segment of a measure, the time-code information being described in the attribute information as the musical-piece composition information and the measure being a musical-piece material unit, exactly matches time code of the segment of a measure of actual-video-sound data.

Thus, the musical-piece composition information makes it possible to detect the timing of the segment of each musical-piece material of a musical piece being played back, for example, the timing of the segment of a measure or beat. Further, the musical-piece composition information allows the information of each musical-piece material of another musical piece to be remixed to be added in synchronization with the segment of each musical-piece material of the musical piece being played back, thus making it possible to perform smooth remixing.

(2) Effect Information

Effect information is information of a special effect applied to a musical piece and contains effect parameters for, for example, the aforementioned distortion and reverberation. In this case, when the effect parameters change with time, the effect information becomes parameter information that changes in response to the change in time.

As the effect information, multiple types of effect information which are prepared in a fixed manner in the music-content recording/playback apparatus of this example can be used. However, when effective and recommended effect information is available for each musical piece, the effect information is contained as part of the attribute information. The recommended effect information is supplied by, for example, the producer of the music content. Not only one type but also multiple types of effect information can be contained as the attribute information.

The effect information may also be contained in the attribute information so as to correspond to a time period corresponding to each musical-piece material.

(3) Musical Instrument Information

Musical instrument information is information of musical instruments used in the musical piece. Examples include a drum and a guitar. For example, a drum-and-percussion performance pattern for one measure can be recorded as the attribute information so as to be repeated in a loop manner. The performance pattern information of the musical instruments can also be used for remixing.

Rather than recording the information of the drum-and-percussion performance pattern for one measure as the attribute information, the recording/playback apparatus can prepare multiple patterns therefor for remixing.

(4) Performer Information

Figure 2:
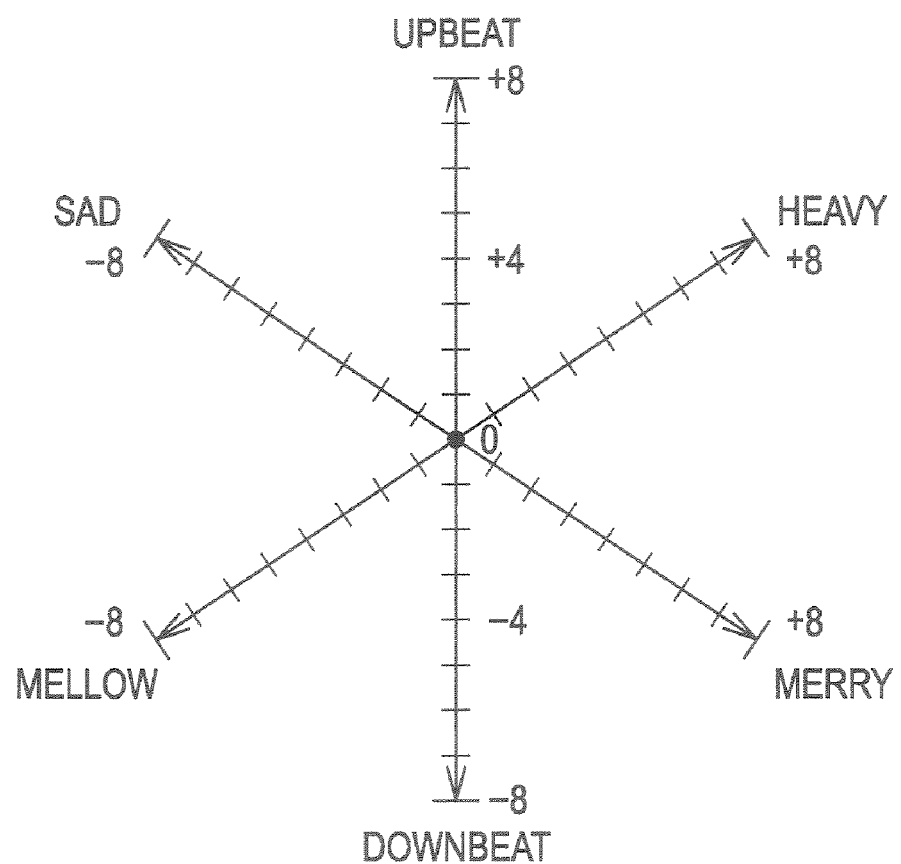
FIG. 2 is a diagram illustrating part of attribute information used for the recording/playback apparatus of the embodiment.

Performer information is information regarding performers. Examples include a name or names (including a group name) of the performer(s) (including a singer) of the musical piece, gender, age, and group members (5) Feeling Information Feeling information indicates sensory recognition of the listener who has listened to the musical piece and is data obtained by quantifying for example, upbeat music/downbeat music, mellow music/heavy music, and merry music/sad music. For example, the feeling information may be obtained by a method as shown in FIG. 2. That is, for example, upbeat/downbeat, mellow/heavy, and merry/sad are pre-defined along corresponding feeling axes, and the listener sets a numerically expressed degree of subjective sensory recognition with respect to each feeling axis.

For example, as shown in FIG. 2, for the upbeat/downbeat feeling axis, the degree of subjective sensory recognition is expressed by, for example, numeric values in 16 step. In the example shown in FIG. 2, the numeric value is larger for an upbeat musical-piece, and a numeric value "0" is assigned for the most downbeat musical-piece. The same is applicable to the other feeling axes, such as mellow/heavy and merry/sad axes. It is also possible to set other feeling axes.

As shown in FIG. 2, when values are set on the feeling axes, connecting some of the values with a line yields a figure having a shape corresponding to the tune (i.e., changes a triangular shape in response to the tune, in FIG. 2). In other words, the use of the feeling axes can facilitate the searching of a musical piece having a similar tune.

In this case, for the attribute information that is recorded in the storage medium in association with the data of music content and the attribute information supplied from the music-content providing server, it is possible to have, for example, dozens of listeners listen to the musical piece and report numeric values for the degree of subjective sensory recognition with respect to each feeling axis and to use, for example, the average value thereof with respect to each feeling axis.

As described below, the user of the recording/playback apparatus may set and input the feeling information through listening to the musical piece as a listener. When the listener feels that a feeling-information numeric value contained in the attribute information recorded in the storage medium or a feeling-information report contained in the attribute information obtained from the music-content providing server is different from the result obtained when the listener actually listens to the musical piece, the listener can overwrite the feeling-information value as the feeling information in the attribute information stored in the music-content storage unit of the recording/playback apparatus.

(6) Ambient-Environment Information

The ambient-environment information contains regional information indicating a location recommended for listening to the musical piece. An example of the regional information is a mountain or sea. The regional information is input and set by the producer of the DVD or the provider of the music content sent from the music-content providing server. The ambient-environment information may also be information obtained and recorded (audio-recorded) by the ambient-environment-information obtaining unit 40, when the recording/playback apparatus records the musical piece. Examples of the ambient-environment information include a location, date-and-timer season, temperature, and humidity. The ambient-environment information also includes regional information input and set by the listener during the recording. Examples of the regional information include a location recommended for listening to the musical piece (7) Playback History Information Playback history information indicates which musical piece, how often, and when the listener listens to. In this embodiment, the playback history information is stored and held by the playback-history-information holding unit 15, as described above. The playback history information is contained in the attribute information during record processing in which the data of music content are stored in the music-content storage unit 20, and is stored in the attribute-information storage unit 22 in the music-content storage unit 20 as part of the attribute information.

The playback history information is not contained in a DVD produced by the producer or in the attribute information obtained from the server.

[Record Processing of Recording/Playback Apparatus of First Embodiment]

Next, a description will be given of recording processing of the recording/playback apparatus of this first embodiment. Some schemes are available for the record processing in this embodiment.

One of the schemes is to perform recording by reading music-content data recorded on a DVD and writing the data to the music-content storage unit 20. Another scheme is to record music-content data downloaded from the music-content providing server apparatus 6. Further, another scheme, which is not illustrated, is to store music-content data, transferred from other playback equipment via an external input terminal in the music-content storage unit 20.

In those schemes, when the music-content data contains the attribute information, the recording/playback apparatus of this embodiment also reads the attribute information in addition to the video-and-sound data of the music-content and writes the read information and data to the music-content storage unit 20. The recording/playback apparatus of this embodiment is configured so that, when it is difficult for the user to perform addition or modification on the attribute information during the recording the apparatus can perform addition or modification on the attribute information.

When the music-content data contains only the video-and-sound data and does not contain the attribute information the recording/playback apparatus of this embodiment generates (sets) attribute information and stores it in the attribute-information storage unit 22 in the music-content storage unit 20.

That is, the tune analyzing unit 13 analyzes a DVD or downloaded sound data to obtain musical-piece composition information, which is then stored as part of the attribute information. The user inputs one of the numeric values in 16 steps as described above, as feeling information indicating a subjective sensory degree value for his or her own actual listening of the musical piece. The feeling information is then recorded as part of the attribute information. In addition, the ambient-environment information obtained by the ambient-environment-information obtaining unit 40 is also recorded as part of the attribute information. Moreover, the playback history information is recorded as the attribute information, as needed.

In the present embodiment, an attribute-information providing server apparatus in which attribute information is stored so as to correspond to the identification information of music content can be provided on the Internet 5. In this case, a download instruction including the identification information of the music content is transmitted to the server apparatus so that the attribute information corresponding to the identification information of the music content can be received.

Figure 3:
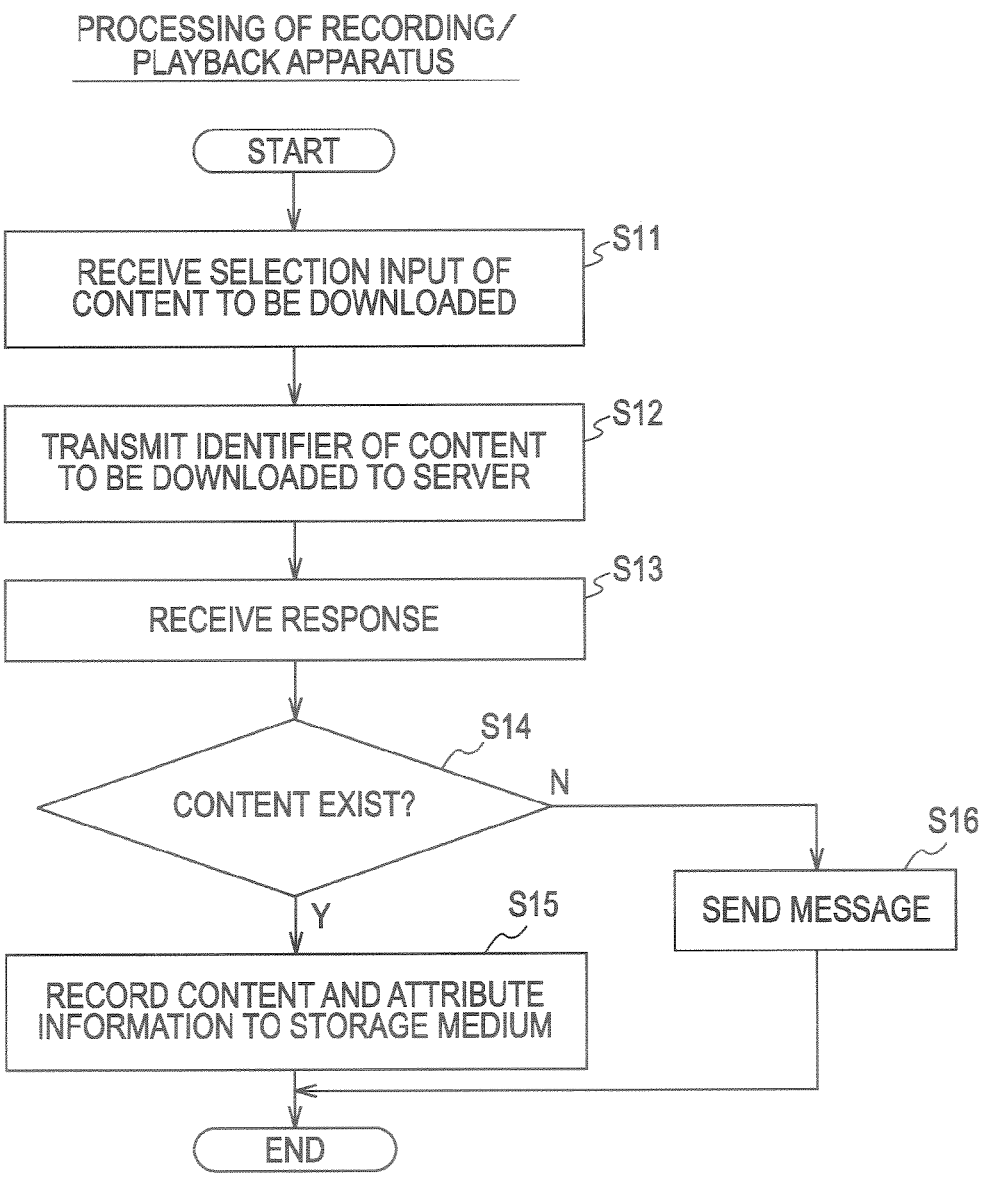
FIG. 3 is a flowchart of one example of processing performed by the recording/playback apparatus shown in FIG. 1.
Figure 4:
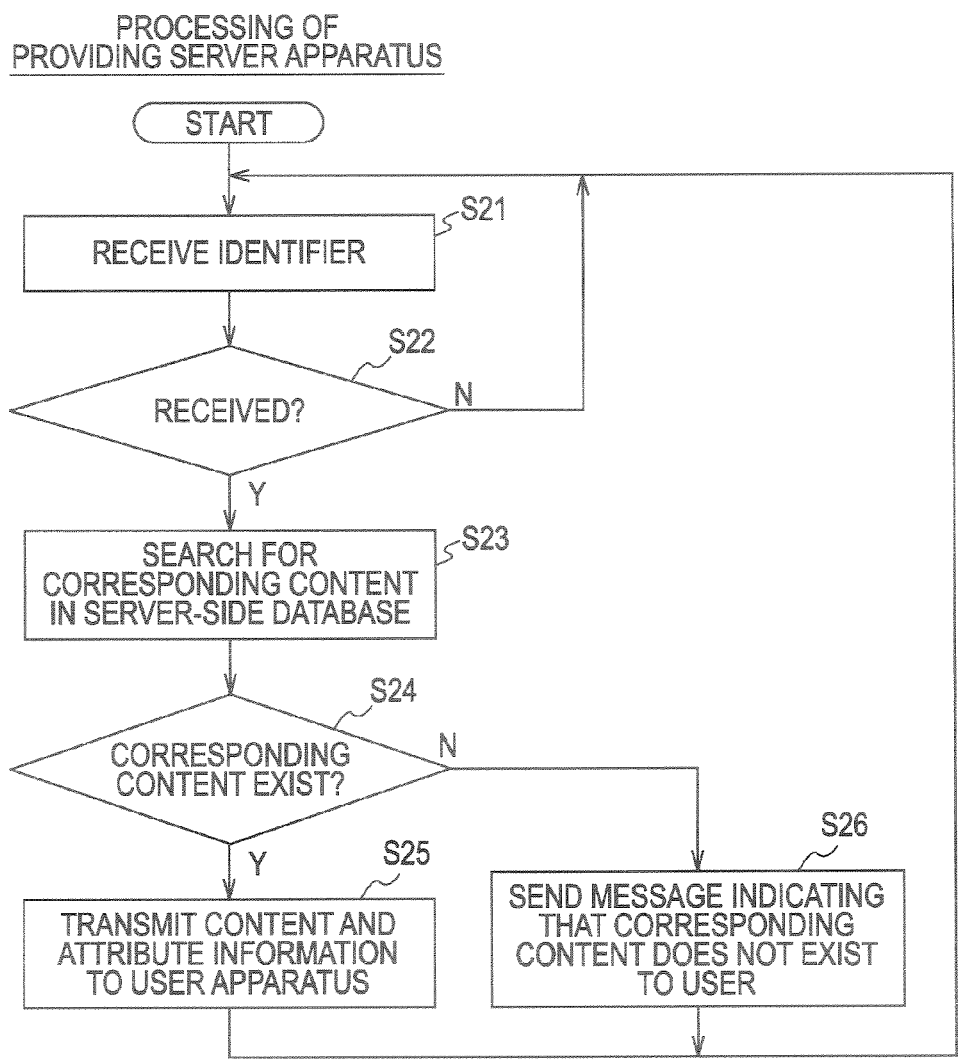
FIG. 4 is a flowchart used for describing the operation of the recording/playback apparatus shown in FIG. 1.

FIGS. 3 and 4 are flowcharts of the operations of the recording/playback apparatus and the music-content providing server apparatus 6 when the recording/playback apparatus obtains music content and attribute information from the music-content providing server apparatus 6.

Although a description below is given of an example of a case in which the recording/playback apparatus receives music-content data and attribute information accompanying the music-content data from the music-content providing server apparatus 6, similar processing is essentially performed in a case in which multiple different recording/playback apparatuses transmit and receive attribute information therebetween.

FIG. 3 is a flowchart illustrating processing of the recording/playback apparatus that issues a request for provision of music-content data and attribute information accompanying the music-content data. FIG. 4 is a flowchart illustrating processing of the music-content providing server apparatus 6 that provides the music-content data and the attribute information accompanying the music-content data.

When a predetermined operation for launching a program for issuing a request for provision of music-content data and attribute information accompanying the music-content data is performed on the recording/playback apparatus, the CPU 1 of the recording/playback apparatus executes processing shown in FIG. 3 and first receives a selection input of music content to be downloaded (step S11).

Based on the received selection input, the recording/playback apparatus generates a music-content provision request containing the identifier of the music content for which a downloading request is given, and transmits the generated request to the music-content providing server apparatus 6 through the communication interface 14 and the Internet 5 (step S2).

On the other hand, a control unit (CPU) of the music-content providing server apparatus 6 is always executing processing shown in FIG. 4 and is waiting to receive the music-content provision request from the recording/playback apparatus (step S21). The control unit determines whether or not the music-content providing server apparatus 6 has received the provision request (step S22). When the control unit determines in step S22 that it has not received the music-content provision request, the control unit repeats the processing from step S21 and waits to receive the music-content provision request.

When the control unit of the music-content providing sever apparatus 6 determines in the determination processing in step S22 that it has received the music-content provision request from the recording/playback apparatus, the control unit of the music-content providing server apparatus 6 searches for the desired music-content data and the corresponding attribute information from the music content stored in the music-content providing server apparatus 6, based on the music-content identifier contained in the received provision request (step S23).

The control unit of the music-content providing server apparatus 6 then determines whether or not the desired music-content data exists (step S24). When the control unit determines that the data exists, the data is transmitted to the requesting-end recording/playback apparatus through a communication interface and the Internet 5 (step S25). Thereafter, the process returns to step S21 and the processing from step S21 is repeated.

When the control unit of the music-content providing server apparatus 6 determines in the determination processing in step S24 that the desired music-content data does not exist, the control unit generates a response message indicating so and sends the response message to the requesting-end recording/playback apparatus through the communication interface and the Internet 5 (step S26). Thereafter, the process returns to step S21 and the processing from step S21 is repeated.

On the other hand, the requesting-end recording/playback apparatus receives the response (reply) from the music-content providing server apparatus 6 through the communication interface 14 (step S13). Based on the received response, the recording/playback apparatus determines whether or not the requested music-content data has been transmitted thereto (step S14). When the recording/playback apparatus determines in the determination processing in step S14 that the requested music-content data is received, it records (stores) the received music-content data and the attribute information, obtained together with the music-content data, in the music-content storage unit (step S15), and the processing shown in FIG. 3 ends.

When the control unit of the recording/playback apparatus determines in the determination processing in step S14 that it has not received the requested music-content data (it has received the message indicating that corresponding music-content data does not exist), the control unit issues a message indicating that the desired music-content data does not exist to the user of the recording/playback apparatus (step S16) by using a device included therein. Examples of the device, which is not shown in FIG. 1, include a display device such as an LCD (liquid crystal device), a light emitting device such as an LED (light emitting diode), or a buzzer or alarm. Through the processing described above, the processing shown in FIG. 3 ends.

In this embodiment, as described above, when receiving the desired music content data, the recording/playback apparatus can also receive the attribute information supplied together with the music-content data. The received music-content data and the attribute information for the music-content data can be stored in the music-content storage unit 20 so as to be usable for playback.

When the music-content data is not accompanied by attribute information, attribute information is constituted by, for example, musical-piece composition information obtained by the analysis performed by the tune analyzing unit 13 and ambient-environment information obtained by the ambient-environment-information obtaining unit, as described above, and is stored in the music-content storage unit 20 in association with the video-and-sound data of the music content.

When the musical-piece data of the music content exists in the music-content storage unit of the recording/playback apparatus but the attribute information of the music content does not exist therein, the recording/playback apparatus can also download only the attribute information through accessing the music-content providing server apparatus 6 by using the identification information of the music content as a search key.

Figure 5:
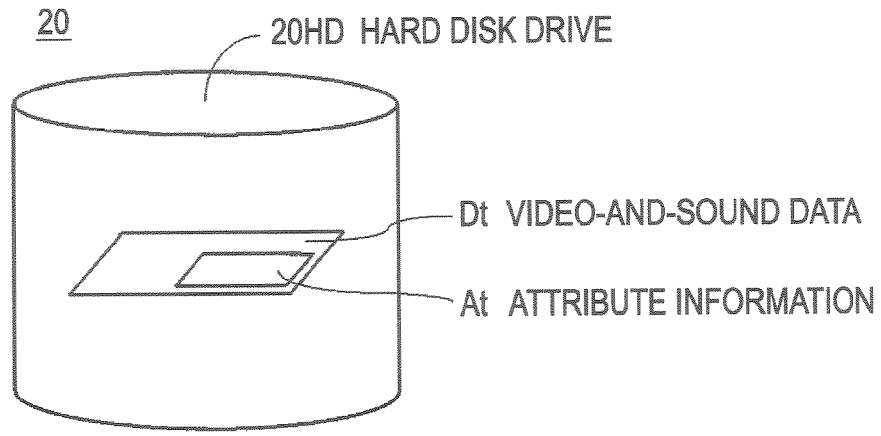
FIG. 5 is a diagram illustrating an example of a music-content storage unit shown in FIG. 1.

FIG. 5 is a diagram illustrating a schematic configuration of a hard disk device as one example of the music-content storage unit 20 of the recording/playback apparatus of this embodiment. Specifically, a hard disk device 20HD, which serves as the music-content storage unit 20, includes a region 23 for video-and-sound data Dt, such as the video data and sound data of music content, and a region 24 for attribute information At therefor. The region 23 is included in the video-and-sound-data storage unit 21 and the region 24 is included in the attribute-information storage unit 22.

Figure 6:
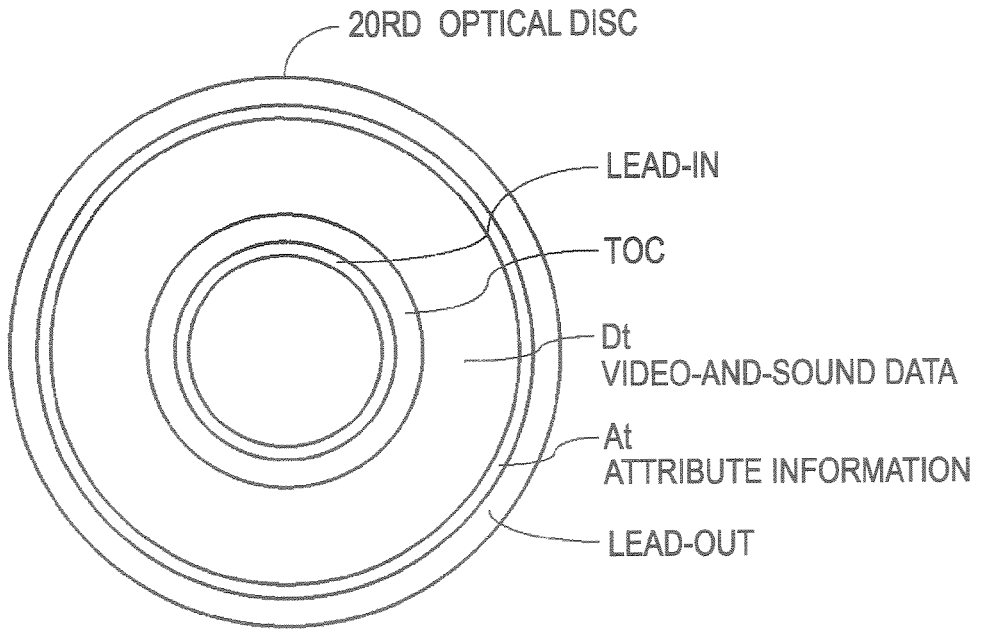
FIG. 6 is a diagram illustrating an example of the music-content storage unit shown in FIG. 1.

In this embodiment although the music-content storage unit 20 is implemented with a hard disk device, a disk medium, such as a DVD which is a removable (detachable) storage medium may also be used as the music-content storage unit 20. FIG. 6 is a diagram illustrating another example of the music-content storage unit 20 in such a case, that is, one example of a disk medium (e.g., a readable/writable magneto-optical disc) 20RD.

As shown in FIG. 6, content data (video-and-sound data) Dt, such as audio content data and video content data, are stored in data storage region of the optical disc 20RD. As shown in FIG. 6, the optical disc 20RD has an area for storing content-attribute information At in addition to a lead-in area, a TOC (table-of-content) area, and a lead-out area, which are commonly provided on an optical disc. In the area for the content-attribute information At attribute information is stored. When the content data Dt contains data of multiple musical pieces, the attribute information of each musical piece is recorded. In this case, as described above, the content data Dt and the attribute information At are associated with each other by the corresponding music-content-identification information (music-content IDs).

The optical disc 20RD may be a disk that is commercially available from the producer or the like of music content, with the music-content data being recorded on the disk. Alternatively, using a personal computer or the like, a general user may create the optical disc 20RD by recording music content downloaded from the Internet.

As shown in FIGS. 5 and 6, using the recording/playback apparatus, the user can arbitrarily overwrite the contents of the attribute information At recorded on the storage medium, add information to the attribute information delete information therefrom, or replace the attribute information with new attribute information. For example, for adding the segment information of each musical-piece material to the attribute information the recording/playback apparatus can automatically analyze desired music-content data. This allows automatic generation of the segment information of a new musical-piece material or allows addition of segment information input by the user through the user interface 11.

Upon receiving a change instruction input from the user through the user interface 11, the recording/playback apparatus can also change the attribute information recorded in the music-content storage unit 20. Similarly, upon receiving a change instruction input from the user through the user interface 11 the recording/playback apparatus can delete the attribute information recorded in the music-content storage unit 20, can create new attribute information, or can replace the already recorded attribute information with input attribute information.

The recording/playback apparatus can also receive new attribute information through the Internet 5 and the communication interface 14; can receive attribute information from external equipment, such as another recording/playback apparatus connected through a digital interface, such as a USE (universal serial bus) interface; or can receive attribute information via a wireless LAN through a wireless interface and a transmitting/receiving antenna. Further, the recording/playback apparatus can use the received attribute information for addition and replacement.

Naturally, in any case described above the music-content data and the attribute information always correspond to each other by the identifier of the corresponding music content, so as to make it clear that which music-content data is accompanied by which attribute information.

As described above, the music content is accompanied by the attribute information. Thus, by distributing the attribute information in response to distribution of the music-content data, it is possible to effectively use the attribute information during the use of the music-content data and to utilize the music content data in a new application.

When the optical disc 7 that is to be read by the optical-disc drive 15 contains attribute information for music-content data, the optical disc 7 has the same structure as the optical disc 20RD shown in FIG. 6.

Figure 7:
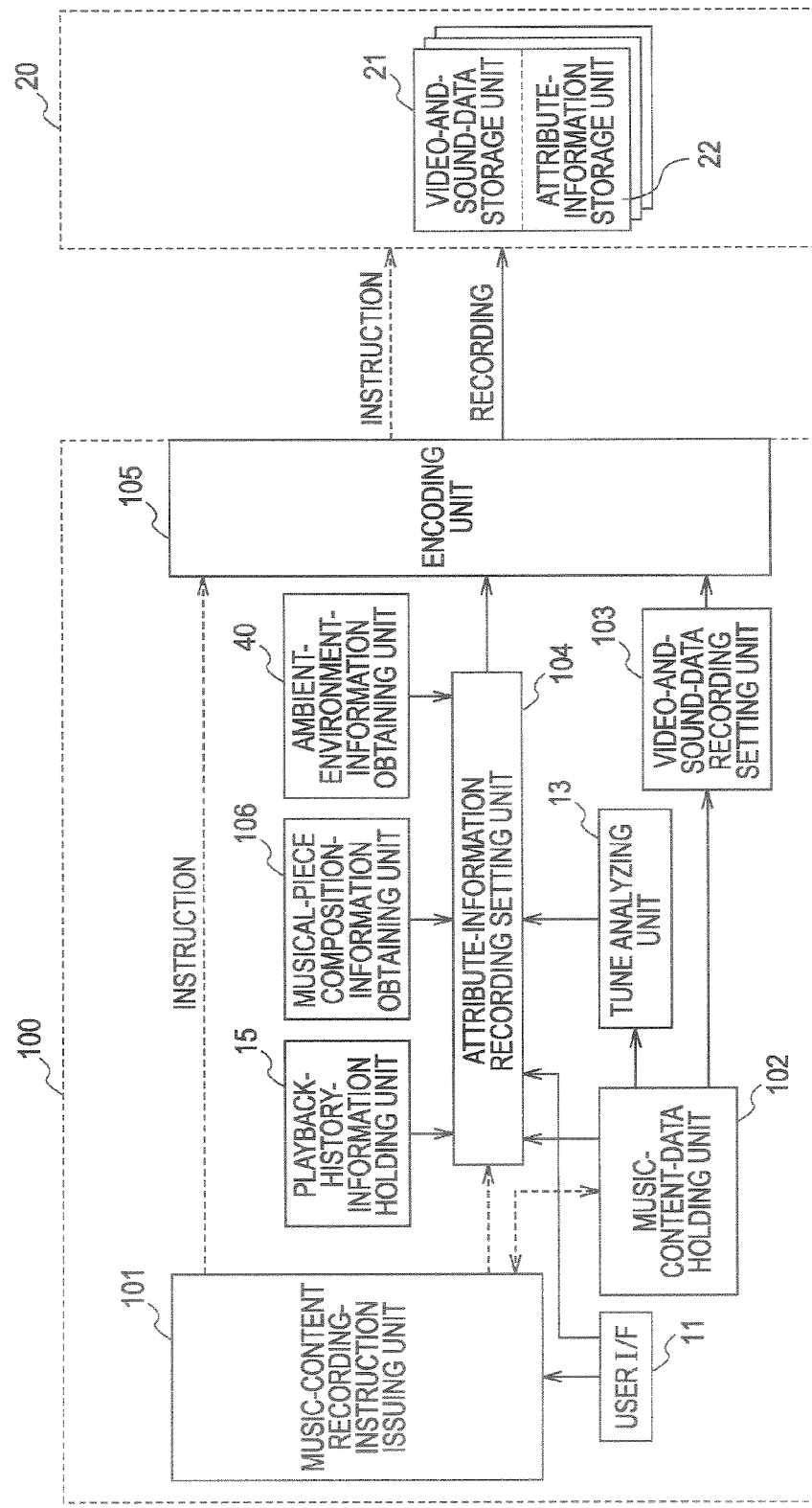
FIG. 7 is a functional block diagram for describing a recording processing operation section of the recording/playback apparatus shown in FIG. 1.

Next, one example of the record-processing operation of the recording/playback apparatus of the embodiment shown in FIG. 1 will now be described with reference to the drawings. FIG. 7 is a block diagram showing a recording processing section functionally extracted from the recording/playback apparatus of this embodiment. FIGS. 3 to 9 are flowcharts illustrating one example of the record-processing operation.

As shown in FIG. 7, the recording function of the recording/playback apparatus is constituted by two components. One of them is the music-content storage unit 20 in which multiple pieces of music content are recorded and held, and the other is a recording unit 100 for recording music content. Since the music-content storage unit 20 is the same as the one described above, the description thereof will be omitted below. The recording unit 100 is a section for performing processing for recording music-content data and attribute information. The configuration of the recording unit 100 will be described below.

In this example, the recording unit 100 associates input music-content data (video-and-sound data) and attribute information with each other and stores the associated data and information in the music-content storage unit 20. In this case, when attribute information corresponding to the music content is input, the attribute information is directly stored in the attribute-information storage unit 22 in the music-content storage unit 20, or is stored therein after a change is made to part of the attribute information or information is added to the attribute information.

However, when the music content is not accompanied by attribute information, the recording unit 100 has a function for generating attribute information, adding the attribute information to the music-content data, and storing it in the attribute-information storage unit 22 in the music-content storage unit 20.

In this case, in the method for adding the attribute information to the music content data, ultimately, the user can add it based on his or her subjective judgment. Also, based on unprocessed video-and-sound data, the recording/playback apparatus can automatically calculate part of the attribute information and can add it. That is, the tempo information of musical-piece composition information included in the attribute information, the location of the recording playback apparatus, ambient-environment information, and so on can be automatically determined and automatically added. However, in this example, the recording/playback apparatus is adapted to only obtain the musical-piece composition information and the ambient-environment information, and thus, the user ultimately decides whether or not attribute information to be added to the music content is the most suitable.

As shown in FIG. 7, the recording unit 100 includes the user interface 11, the tune analyzing unit 13, the playback-history-information holding unit 15, and the ambient-environment-information obtaining unit 40, which are described above. In addition, as functional processing units, the recording unit 100 includes a music-content recording-instruction control unit 101, a music-content-data holding unit 102, a video-and-sound-data recording setting unit 103, an attribute-information recording setting unit 104, an encoding unit 105, and a musical-piece composition-information obtaining unit 106.

The music-content recording-instruction control unit 101 is a section for controlling a music-content recording instruction in accordance with a user instruction through the user interface 11, and corresponds to a section that the CPU 1 executes by using the RAM 4 as its work area based on a recording program stored in the ROM 3.

The music-content-data holding unit 102 is a section for holding the video-and-sound data of music content to be recorded, accompanying attribute information to be accompanied and the attribute information.

When the source of music content to be recorded is the optical disc 7 read by the optical-disc drive 16, the music-content-data holding unit 102 corresponds to the optical disc 7 and the optical-disc drive 16.

When music content to be recorded is supplied from the music-content providing server apparatus 6 through the Internet 5, the music-content-data holding unit 102 corresponds to, for example, a buffer memory for temporarily storing the data of the music content received through the communication interface 14.

The encoding unit 105 corresponds to a section having a function of only the encoding section extracted from the encoding/decoding unit 12.

The video-and-sound-data recording setting unit 103 holds video-and-sound data to be fed to the encoding unit 105 and utilizes an area of the RAM 4.

The attribute-information recording setting unit 104 holds attribute-information data to be fed to the encoder circuit and also utilizes an area of the RAM 4.

When the music-content data is not accompanied by attribute information, the musical-piece composition-information obtaining unit 106 serves as a functional unit that obtains attribute information corresponding to the music content to be recorded. As described above, the musical-piece composition-information obtaining unit 106 is constituted by, for example, a functional unit that accesses the attribute-information providing server apparatus through the Internet by using a music-content ID as a search key to obtain attribute information corresponding to the music-content ID or a functional unit that obtains attribute information corresponding to the music content from another recording/playback apparatus.

Next, a record-processing operation will be described with reference to the flowcharts of FIGS. 8 and 9. In accordance with the program in the ROM 3 the CPU 1 executes processing steps shown in FIGS. 8 and 9 by using the RAM 4 as its work area.

Prior to recording, the user prepares the data of musical piece he or she desires to record as music content and stores the data in the music-content-data holding unit 102. When the musical-piece data is accompanied by attribute information the attribute information of the musical piece, which is music content, is also stored in the music-content-data holding unit 102. The music-content-data holding unit 102 issues, to the music-content recording-instruction control unit 101, a report as to whether or not attribute information accompanies the musical piece the user desires to record. Thus, the music-content recording-instruction control unit 101 pre-recognizes whether or not attribute information accompanies the music content to be recorded.

Figure 8:
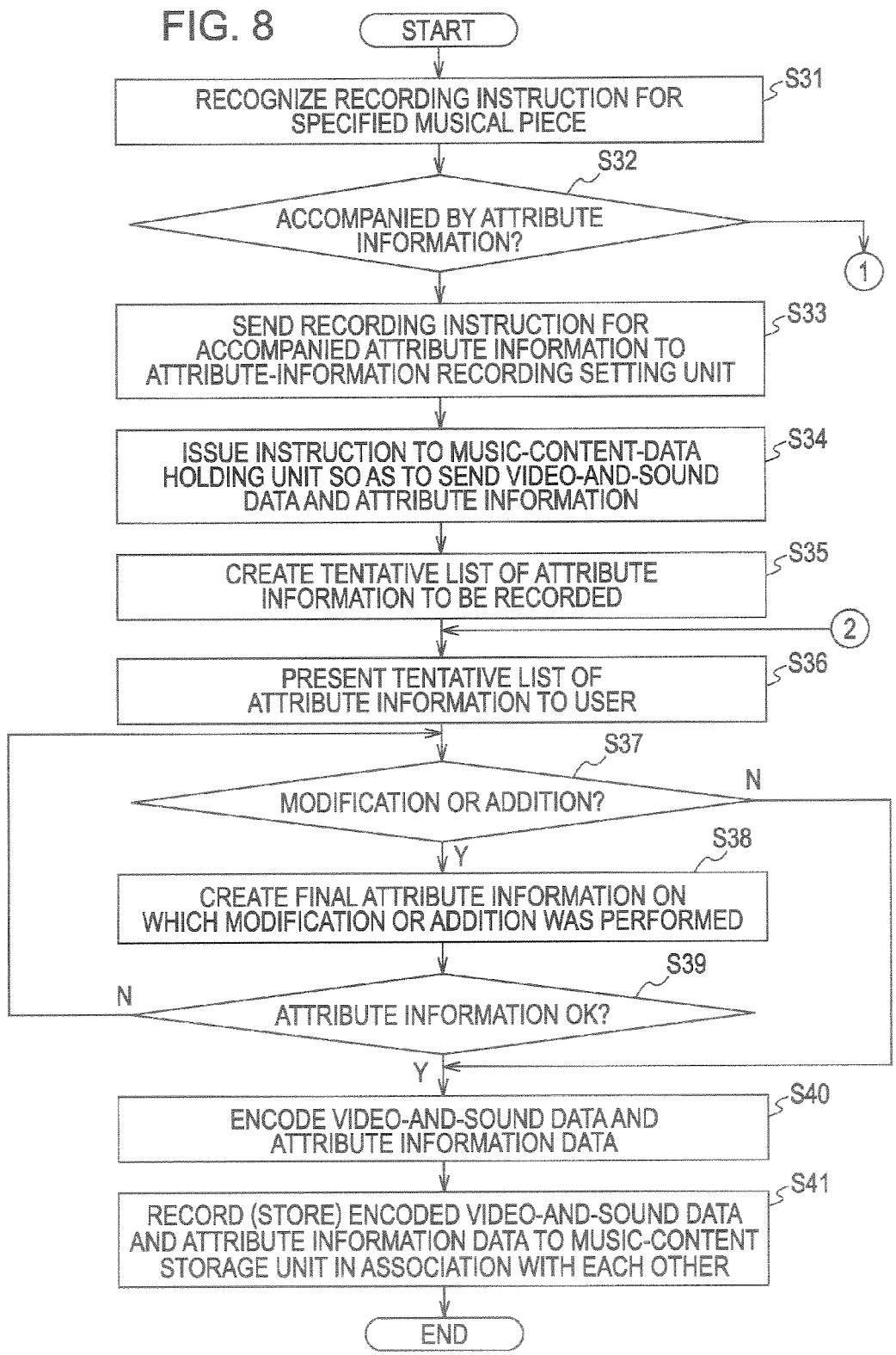
FIG. 8 is a flowchart for describing the recording processing operation of the recording/playback apparatus shown in FIG. 1.

Next, when the user gives a recording instruction through the operation unit of the user interface 11, the music-content recording-instruction control unit 101 recognizes the recording instruction for the specified musical piece (step S31 in FIG. 8). Upon recognizing the recording instruction, the music-content recording-instruction control unit 101 determines whether or not the specified musical piece is accompanied by attribute information (step S32). Upon determining that it is accompanied by attribute information, the music-content recording-instruction control unit 101 sends, to the attribute-information recording setting unit 104, a recording instruction so as to record the attribute information accompanying the music content (step S33).

The music-content recording-instruction control unit 101 issues an instruction to the music-content-data holding unit 102 so as to send, to the video-and-sound-data recording setting unit 103, the video-and-sound data of the held music content to be recorded, and further, the music-content recording-instruction control unit 101 issues an instruction to the music-content-data holding unit 102 so as to send the corresponding attribute information to the attribute-information recording setting unit 104 (step S34). Upon receiving the instruction, the music-content-data holding unit 102 sends the video-and-sound data of the music content to be recorded, together with the music content ID, to the video-and-sound-data recording setting unit 103. The music-content-data holding unit 102 also sends the corresponding attribute information, together with the music content ID, to the attribute-information recording setting unit 104.

Upon receiving the attribute information (including the music content ID) from the music-content-data holding unit 102, the attribute-information recording setting unit 104 creates a tentative list of the attribute information to be recorded (step S35). The attribute-information recording setting unit 104 then presents the created tentative list of the attribute information to the user by, for example, displaying it on the display of the user interface 11 (step S36).

When the user to which the tentative list of the attribute information to be recorded is presented determines that modification or addition is required for the attribute information he or she performs a predetermined operation through the operation unit of the user interface 11. Alternatively when the user determines that no change is required for the attribute information he or she enters information indicating so by operating a decision key or the like on the user interface 11.

The music-content recording-instruct-on control unit 101 determines whether or not a modification instruction or addition instruction for the attribute information is received from the user (step S37). Upon determining that a modification instruction or an addition instruction is received the music-content recording-instruction control unit 101 issues a notification indicating so to the attribute-information recording setting unit 104. Upon receiving the modification instruction or addition instruction the attribute-information recording setting unit 104 performs modification or addition on the attribute information in accordance with the contents of the modification instruction or the contents of the addition instruction received through the user interface 11 (step S38).

When the user operates the decision key to mean that the attribute information is OK after performing the modification or addition on the attribute information or without performing any modification or addition on the attribute information, the music-content recording-instruction control unit 101 detects the user's decision input for the attribute information (step S39). The music-content recording-instruction control unit 101 also issues an instruction to the encoding unit 105 so as to receive the video-and-sound data from the video-and-sound-data recording setting unit 103 and the attribute information from the attribute-information recording setting unit 104 and encode the received information. Upon receiving the instruction, the encoding unit 105 receives the video-and-sound data and the attribute information, and executes encoding processing for storing the received data and information in the music-content storage unit 20 (step S40).

The encoding unit 105 then writes the encoded video-and-sound data to the video-and-sound-data storage unit 21 and also writes the encoded attribute information to the attribute-information storage unit 22 (step S41). After the above-described processing, the recording processing ends.

Figure 9:
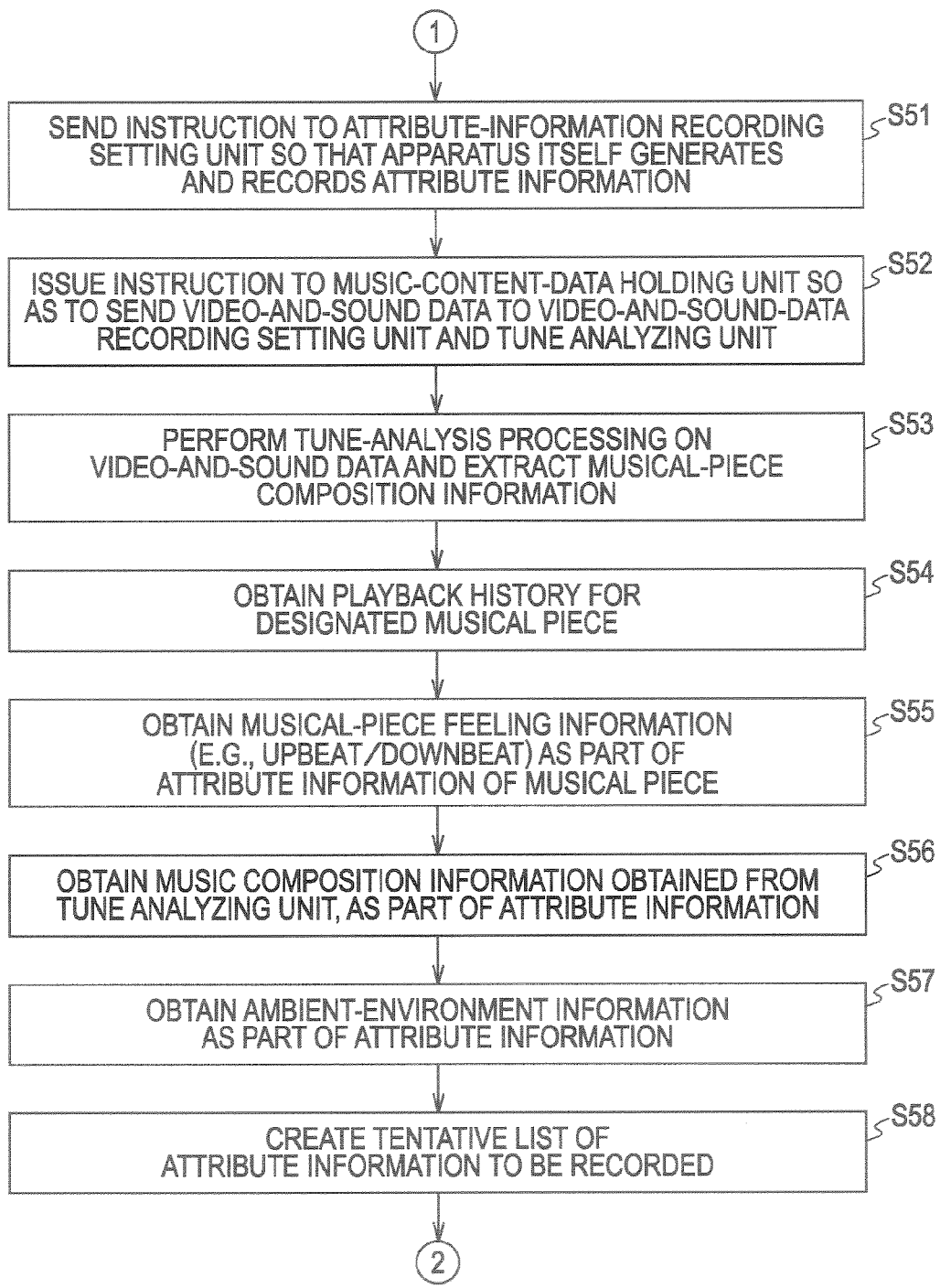
FIG. 9 is part of the flowchart for describing the recording processing operation of the recording/playback apparatus shown in FIG. 1.

On the other hand, upon determining in step S32 that the music content is not accompanied by attribute information, the music-content recording-instruction control unit 101 sends an instruction to the attribute-information recording setting unit 104 so that the apparatus itself generates and records attribute information for the music content (step S51 in FIG. 9).

The music-content recording-instruction control unit 101 also issues an instruction to the music-content-data holding unit 102 so as to send, to the video-and-sound-data recording setting unit 103 and the tune analyzing unit 13, the video-and-sound data of the held music content to be recorded (step S52). Upon receiving the instruction, the music-content-data holding unit 102 sends the video-and-sound data of the music content to be recorded, together with the music-content ID, to the video-and-sound-data recording setting unit 103. The music-content-data holding unit 102 also sends the sound data of the music content to the tune analyzing unit 13.

Upon receiving the sound data from the music-content-data holding unit 102, the tune analyzing unit 13 analyzes the sound data and extracts musical-piece composition information such as a tempo, key, and chord, for each musical-piece material (step S53).

Upon receiving the instruction indicating that the apparatus itself is to generate attribute information from the music-content recording-instruction control unit 101, the attribute-information recording setting unit 104 determines whether or not playback history for the specified musical piece is held by the playback-history-information holding unit 15. When the playback history is held, the attribute-information recording setting unit 104 obtains the playback history to use it as part of the attribute information (step S54). When the playback history information is not held, the playback history information in the attribute information is set to "null" indicating that there is no playback history information.

The attribute-information recording setting unit 104 receives input numerical values (e.g., the aforementioned 16-step numerical values) of the feeling information indicating upbeat/downbeat heavy/mellow, merry/sad, and so on regarding the musical piece to be recorded, and uses the numerical values as part of the attribute information (in step S55). The feeling information is input by the user who has listened to the musical piece, through the user interface 11.

The attribute-information recording setting unit 104 further obtains the musical-piece composition information, analyzed and extracted by the tune analyzing unit 13, from the tune analyzing unit 13, and uses the obtained musical-piece composition information as part of the attribute information (step S56). In addition, the attribute-information recording setting unit 104 obtains ambient-environment information from the ambient-environment-information obtaining unit 40 and uses the ambient-environment information as part of the attribute information (step S57).

Next, based on the information obtained in steps S54 to S57, the attribute-information recording setting unit 104 creates a tentative list of the attribute information to be recorded (step S58). The attribute-information recording setting unit 104 then presents the created tentative list of the attribute list to the user by, for example, displaying it on the display of the user interface 11 (step S35).

When the user to which the tentative list of the attribute information to be recorded is presented determines that modification or addition is required for the attribute information, he or she performs a predetermined operation through the operation unit of the user interface 11. Alternatively, when the user determines that no change is required for the attribute information he or she enters information indicating so by operating the decision key or the like of the user interface 11.

The music-content recording-instruction control unit 101 determines whether or not a modification instruction or addition instruction for the attribute information is received from the user (step S37). Upon determining that a modification instruction or an addition instruction is received, the music-content recording-instruction control unit 101 issues a notification indicating so to the attribute-information recording setting unit 104. Upon receiving the modification instruction or addition instruction the attribute-information recording setting unit 104 performs modification or addition on the attribute information in accordance with the contents of the modification instruction or the contents of the addition instruction received through the user interface 11 (step S38).

When the user operates the decision key to mean that the attribute information is OK after performing the modification or addition on the attribute information or without performing any modification or addition on the attribute information, the music-content recording-instruction control unit 101 detects the user's decision input for the attribute information (step S39). The music-content recording-instruction control unit 101 also issues an instruction to the encoding unit 105 so as to receive the video-and-sound data from the video-and-sound-data recording setting unit 103 and the attribute information from the attribute-information recording setting unit 104 and encode the received information. Upon receiving the instructions the encoding unit 105 receives the video-and-sound data and the attribute information and executes encoding processing for storing the received data and information in the music-content storage unit 20 (step S40).

The encoding unit 105 then writes the encoded video-and-sound data to the video-and-sound-data storage unit 21 and also writes the encoded attribute information to the attribute-information storage unit 22 (step S41). After the above described processing the recording processing ends.

In the embodiment described above, when the music content is not accompanied by the musical-piece composition information of the attribute information the tune analyzing unit 13 extracts musical-piece composition information. However, when the tune of the musical piece is known from the musical-score information or producer information, there is no need to perform tune analysis. Thus, in such a case, the user can input, as the attributer information, the musical-piece composition information, such as a tempo, key, and chord, based on the musical-score information.

When the musical-piece composition information can be obtained through a network, such as the Internet 5, the attribute-information recording setting unit 104 can also obtain the musical-piece composition information through the musical-piece composition-information obtaining unit 106 and can use the obtained musical-piece composition information as part of the attribute information.

When the recording/playback apparatus of this embodiment repeats musical-piece playback, the previous user playback history information is accumulated in the playback-history-information holding unit 15. In general, a musical piece that is frequently listened to means that a listener preference therefor is high, and conversely, a musical piece that is played back for a short period of time means that a listener preference therefor is low. Accordingly, every time the playback frequency and playback time information of each musical piece is updated, the playback history information is written to a music-content attribute area for the musical piece.

The playback history information stored in the attribute-information storage unit 22 in the music-content storage unit 20 as the attribute information is updated when music content is recorded. In addition, when a corresponding musical piece is played back and the playback history in the playback-history-information holding unit 15 is updated, the playback history information of the attribute information of the corresponding musical piece, the attribute information being stored in the attribute-information storage unit 22, is also updated.

Since a musical piece that is frequently listened to generally means that a listener preference therefor is high and a musical piece that is played back for a short period of time generally means that a listener preference is low, referring to the playback history information makes it possible to detect a musical piece preferred by the listener and also makes it possible to determine that the tune of the musical piece having a high degree of preference is a tune having a high degree of user preference. Accordingly, every time the playback frequency information and playback time information for the musical piece are updated, the playback history information in the attribute information storage unit may be updated with respect to the musical piece. With this arrangement, referring to the playback history information and the musical-piece composition information of the attribute information makes it possible to determine a musical piece preferred by the listener and the tune thereof and to use the musical piece and the tune to recompose a musical piece during playback.

[Playback Processing of Recording/Playback Apparatus of First Embodiment]

Next, a description will be given of playback processing of the recording/playback apparatus of the first embodiment. In this embodiment, there are two main points in the playback processing.

One of them is a point in which the recording/playback apparatus has a function for sequentially selecting, only upon operation for starting playback, musical pieces that would be preferred by the user and presenting the musical pieces to the user. In this case, the user selects a first musical piece and inputs a sequential-playback start operation through the operation unit of the user interface 11. In response, the recording/playback apparatus of this embodiment determines whether or not the user is showing a preference for the initially selected musical piece, based on body information obtained from the user (listener). When it is determined that the user is showing a preference, a musical piece that is similar in tune to the initially selected musical piece is designated as a next musical-piece playback candidate.

In this case, the recording/playback apparatus obtains the body information of the user (listener) who is a musical-piece listener, and determines the degree of preference at each given time based on the movement of the body, such as the head and legs, the pulse, and so on when he or she is riding the music.

When it is determined that the user is not showing a preference for the musical piece the listener is listening to, the recording/playback apparatus selects a musical piece that would be preferred by the listener, for example, based on the playback history information held by the playback-history-information holding unit 15. The recording/playback apparatus then designates a musical piece that is similar in tune to the selected musical piece as a next musical-piece playback candidate. Alternatively the recording/playback apparatus may obtain the ambient-environment information of the listener, search for a musical piece that matches the obtained ambient-environment information by referring to the attribute information, and designate the found musical piece and a musical piece similar in tune to the musical piece as next musical piece playback candidates.

Thereafter, when the listener is listening to the second or subsequent musical piece, the recording/playback apparatus constantly determines whether or not the user is showing a preference for the musical piece being listened to, based on the body information obtained from the listener, and performs processing similar to the above-described processing to thereby update a next musical-piece playback candidate. With this arrangement, this embodiment provides an advantage in that it is possible to present a next musical-piece playback candidate in real time while updating the candidate.

In the conventional musical-piece playback apparatus, for example, when the musical-piece data of more than a few hundred musical pieces are stored in the internal storage unit, they can be played back album by album, according to a recording sequence, or according to a random sequence using random numbers. However, there is no musical-piece playback apparatus that can determine the playback sequence based on, particularly, the preference of the user (listener).

There is also an example of a method in which the user side creates the so-called playlist (a list of playback musical-piece candidates) and the playback is performed according to the sequence in the list. However, this method requires the user side to create a playlist each time, which is thus time consuming. In addition, there is also a problem in that the playlist must be revised as the number of musical pieces stored in the internal storage unit increases. This method also has a problem in that user preference is not considered.

In contrast, in this embodiment, the playback apparatus side predicts the degree of preference by referring to the attribute information of a musical piece being currently played back, based on the previous user playback history information, body information and so on input in real time from the user, geographic information regarding the location of the playback apparatus, and so on. The playback apparatus then supplies a musical piece that the user in the current situation would desire to listen to most.

That is, in this method for playing back music content, the attribute information of a musical piece, the body information of the listener, the playback history information, and the ambient environment information are used to dynamically select a musical-piece candidate that seems be the most suitable for the preference of the user at each given time and to playback and present the musical-piece candidate.

For example, a musical piece whose chord progression and tempo are close to those of a musical piece that was often listened to in the past is searched for from the attribute information of many musical pieces stored in the attribute-information storage unit 22, and the found musical piece is played back. When body information indicating that the listener seems relaxed with the musical piece to which he or she is currently listening is obtained, a musical piece having a composition that is close thereto is searched for from the attribute information, and the found musical piece is played back. That is, in this embodiment, the musical-piece attribute information is used to dynamically present a musical piece that matches the preference of the listener.

As described above, in this embodiment, examples of information recorded as the attribute information include the musical-piece feeling information (e.g. downbeat music/upbeat music) representing how the listener feels; the playback history information indicating how many times the user played back this musical piece and so on; information regarding the performers and musical instruments, and the ambient-environment information including geographical information and so on indicating where the musical piece was recorded and a location that is suitable for listening to the musical piece. The playback side utilizes the information described above, as needed, so that a musical piece that is more suitable for the preference of the user can be extracted from many pieces of music content.

The second point of the playback processing in the recording/playback apparatus of this embodiment is a function for recomposing a musical piece. That is, recomposition is performed on a musical piece being currently listened to, by changing a tempo and a key (interval), performing remixing, and applying an effect for each musical-piece material, based on, particularly, the musical-piece composition information of the attribute information.

That is, in accordance with the mood of the listener at each given time, a musical piece being listened to is dynamically recomposed just like a disk jockey by simultaneously playing back multiple musical pieces through remixing or the like or changing the tune, such as a tempo and key, of the musical piece. In this embodiment, in order to achieve the dynamic recomposition, musical-piece data is accompanied by attribute information as described above, particularly, musical-piece composition information, and a musical piece is played back/synthesized so that it matches the atmosphere where the listener is, while dynamically recomposing the musical piece. The recomposition is to make changes to the musical piece to be played back so that the listener can more enjoy the musical piece and is to propose a new way of enjoying the musical piece to the listener.

Attribute information as described above is intended to allow musical pieces to be recomposed and played back without losing the musical integrity. In general music (a musical piece) is segmented by measures, beats, and so on, and a chord or chords are further defined for each segment. Thus, in accordance with a music theory, for example, even when another music material is combined for each measure/the tune can be changed without losing the musical integrity. This is a technique typically called remixing, which is performed by disk jockeys and so on.

In view of the foregoing, in the present embodiment, particularly, musical-piece composition information required for recomposing a musical piece is pre-attached to the video-and-sound data of the music content and is recorded as the attribute information, as described above. The musical-piece composition information required for recomposing the musical piece refers to information for each musical-piece material, such as a tempo, key, chord, sound volume, or rhythm, as described above.

The attribute information does not always have to accompany the video-and-sound data of the music content. For example, attribute information stored in another storage place may be read therefrom based on the identification information of the music content, or attribute information may be obtained from a server apparatus or the like for the attribute information through a network, when necessary.

In this embodiment, the recomposition is systematically performed using the musical-piece composition information. For example, the body information is fed back from the listener to the playback apparatus, the listener's listening/viewing state is dynamically recognized, the ambient-environment information regarding the location where the recording/playback apparatus is placed (exists) is dynamically recognized, and a musical piece suitable for the location is recomposed from the attribute information and is presented to the listener.

As described below, in this first embodiment, a musical piece is reconfigured only when the listener is showing a preference so that the musical piece is more preferred by the listener. However, when the listener is not showing a preference, a musical piece may also be recomposed and be presented to the listener, so that the listener is prompted to show his or her preference.

Naturally, during the recomposition of the musical piece being listened to, a musical piece to be remixed for the recomposition may be selected or an effect may be selected by feeding back the body information of the listener to the playback apparatus, referring to the playback history information, and referring to the ambient-environment information. In addition, naturally, when recommended effect information is contained in the attribute information, it may be used.

Figure 10:
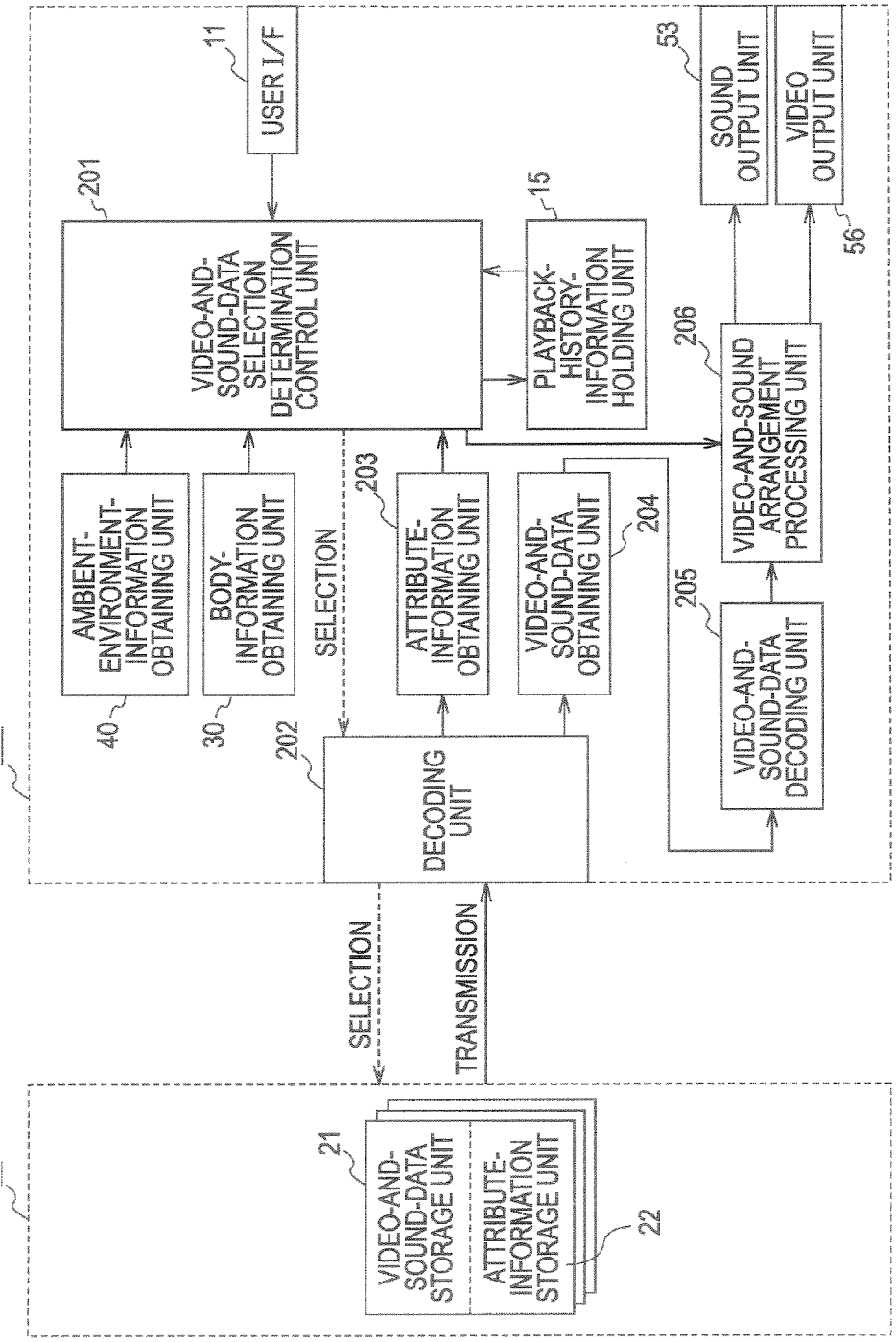
FIG. 10 is a functional block diagram for describing a playback processing operation section of the recording/playback apparatus shown in FIG. 1.

Next, an example of a detailed processing operation of the above-described playback processing will be described with reference to the drawings. FIG. 10 is a block diagram showing a playback processing section functionally extracted from the recording/playback apparatus of this first embodiment. FIGS. 11 to 18 illustrate the recomposition processing of a musical piece. FIGS. 19 to 22 are flowcharts illustrating one example of the playback processing operation.

As shown in FIG. 10, the playback processing section of the recording/playback apparatus of this first embodiment also has two components, as in the recording processing section described above. One of them is the music-content storage unit 20 in which multiple pieces of music content are recorded and held, and the other is a playback unit 200 for playing back the music content. The music-content storage unit 20 is the same as the one described above, and thus a description is given of the playback unit 200 below.

As shown in FIG. 10, the playback unit 200 includes the user interface 11, the playback-history-information holding unit 15, the body-information obtaining unit 30, the ambient-environment information obtaining unit 40, the sound output unit 53, and the video output unit 56. The playback unit 200 further includes a video-and-sound-data selection determination control unit 201, a decoding unit 202, an attribute-information obtaining unit 203, a video-and-sound-data obtaining unit 204, a video-and-sound-data decoding unit 205, and a video-and-sound arrangement processing unit 206, which serve as functional processing units realized by processing performed by the CPU 1 in accordance with the program stored in the ROM 3.

In accordance with a user instruction through the user interface 11, the video-and-sound-data selection determination control unit 201 is a section that selects music content to be played back and performs playback control processing (musical-piece recomposition processing) on the music content. The video-and-sound-data selection determination control unit 201 is also a section that selects music content to be played back and performs playback control (including musical-piece recomposition) on the music content, based on the playback history information from the playback-history-information holding unit 15, the body information obtained through the body-information obtaining unit 30, the ambient environment information obtained from the ambient-environment-information obtaining unit 40, and so on. This video-and-sound-data selection determination control unit 201 corresponds to a section that the CPU 1 executes using the RAM 4 as its work area based on the recording program stored in the ROM 3.

In accordance with a music-content selection instruction from the video-and-sound-data selection determination control unit 201 the decoding unit 202 obtains video-and-sound data and attribute information from the music-content storage unit 20 and performs decompressing-and-decoding processing on the compressed data. The decoding unit 202 corresponds to the decoding unit of the encoding/decoding unit 12.

The decoding unit 202 then passes the attribute information, read from the music-content storage unit 20 and decompressed and decoded, to the attribute-information obtaining unit 203, and supplies the video-and-sound data, read from the music-content storage unit 20 and decompressed and decoded to the video-and-sound-data obtaining unit 204.

The attribute-information obtaining unit 203 receives the attribute information, read from the music-content storage unit 20 and decoded, from the decoding unit 202, and passes the attribute information to the video-and-sound-data selection determination control unit 201. The attribute-information obtaining unit 203 is implemented with a buffer unit that uses an area of the RAM 4

The video-and-sound-data obtaining unit 204 receives the video-and-sound data, read from the music-content storage unit 20 and decoded, from the decoding unit 202, and passes the video-and-sound data to the video-and-sound-data decoding unit 205. The video-and-sound-data obtaining unit 204 is implemented by a buffer unit that uses an area of the RAM 4.

The video-and-sound-data decoding unit 205 is constituted by the sound-data decoding unit 51 and the video-data decoding unit 54. The video-and-sound-data decoding unit 205 decodes the sound data and passes the decoded sound data to the video-and-sound arrangement processing unit 206, and also decodes the video data and sends the decoded video data to the video-and-sound arrangement processing unit 206.

The video-and-sound arrangement processing unit 206 is constituted by the sound arranging unit 52 and the video arranging unit 55. In response to a control signal from the video-and-sound-data selection determination control unit 201, the video-and-sound arrangement processing unit 205 performs recomposition processing on the musical piece by remixing the sound data of another musical piece with the decoded sound data, performing effect processing on the sound data, and changing the tempo, key, or chord progression. The video-and-sound arrangement processing unit 206 also performs effect processing on the decoded video data.

The video-and-sound arrangement processing unit 206 then supplies the sound data, subjected to the remixing, effect processing, and so on, to the sound output unit 53, and also supplies the video data, subjected to the effect processing, to the video output unit 56.

The listener body information obtained by the body-information obtaining unit 30 is supplied to the video-and-sound-data selection determination control unit 201 and is used for music-content selection and musical-piece recomposition. The ambient environment information, such as the information of the location where the recording/playback apparatus is placed, that is obtained by the ambient-environment-information obtaining unit 40 is supplied to the video-and-sound-data selection determination control unit 201 and is used for music-content selection and musical-piece recomposition.

In accordance with a read request sent from the video-and-sound-data selection determination control unit 201 to the playback-history-information holding unit 15, the playback-history-information holding unit 15 supplies the held playback history information to the video-and-sound-data selection determination control unit 201. The video-and-sound-data selection determination control unit 201 uses the supplied the playback history information in order to select music content and recompose the musical piece.

Figure 11:
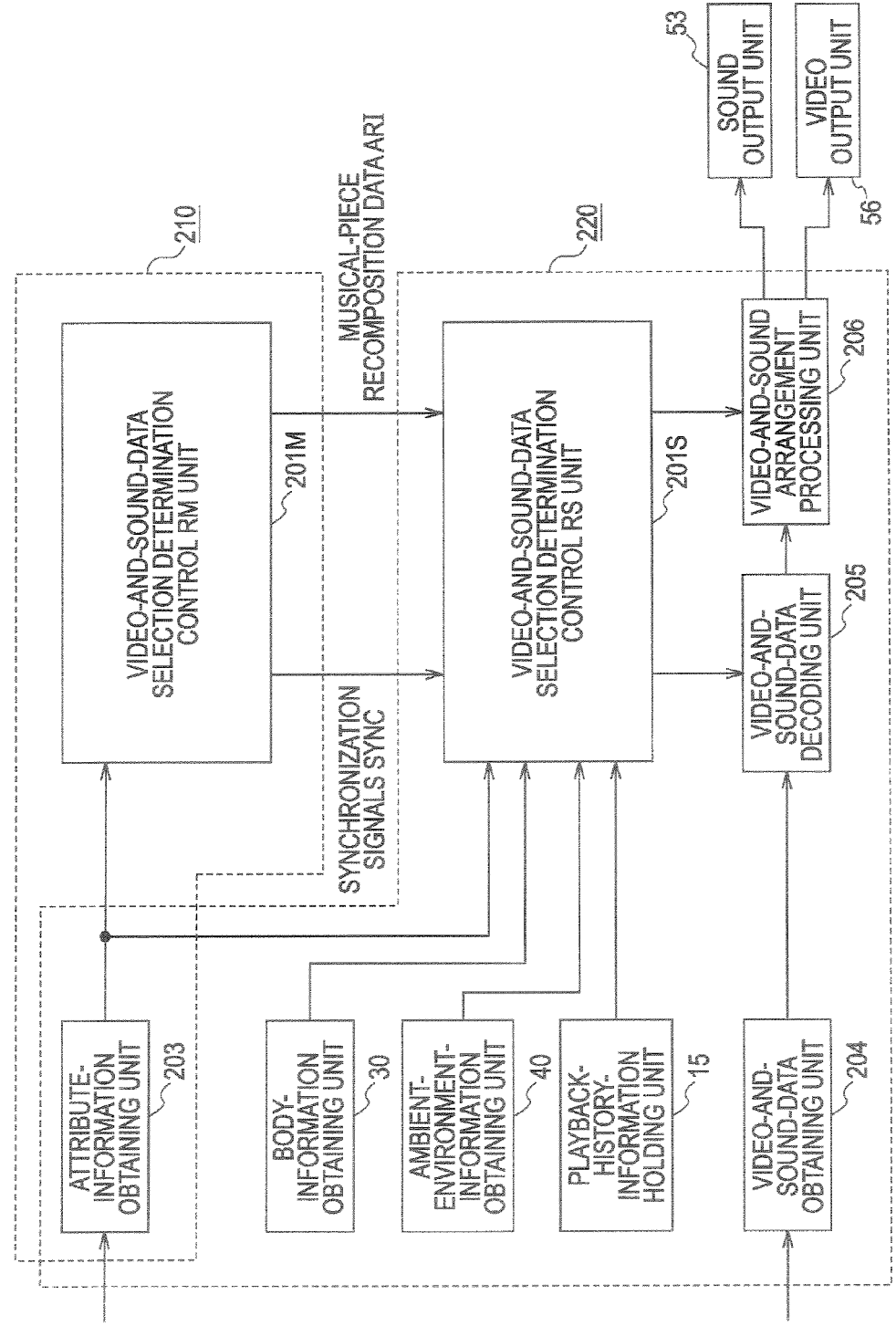
FIG. 11 is a functional block diagram of a major portion of the recording/playback apparatus shown in FIG. 1.

FIG. 11 is a functional block diagram showing the configuration of the playback unit 200 shown in FIG. 10, when viewed from the viewpoint of the musical-piece recomposition processing. The substantial contents of the configuration are the same as those shown in FIG. 10.

As shown in FIG. 11, the playback unit 200 includes a rhythm master unit 210 and a rhythm slave unit 220. The rhythm master unit 210 generates information for recomposing a musical-piece and synchronization signals, which serve as references for recomposing the data of the musical piece, and supplies the generated musical-piece recomposition information and the synchronization signals. The rhythm slave unit 220 receives the synchronization signals SYNC and the musical-piece recomposition information ARI from the rhythm master unit 210 and recomposes the data of the musical piece. The synchronization signals SYNC from the rhythm master unit 210 are output in synchronization with the playback of the musical-piece data. The musical-piece recomposition information ARI is output in synchronization with the synchronization signals SYNC and has a value that dynamically changes in synchronization with the playback of the musical-piece data.

In terms of a concert, the rhythm master unit 210 has a function corresponding to the conductor and the rhythm slave unit 220 has a function corresponding to the roll of performers.

The video-and-sound-data selection determination control unit 201 can be separated into a video-and-sound-data selection determination control RM unit 201M (RM is an abbreviation of "rhythm master") belonging to the rhythm master unit 210 and a video-and-sound-data selection determination control RS unit 201S (RS is an abbreviation of "rhythm slave") belonging to the rhythm slave unit 220. The attribute-information obtaining unit 203 belongs to both the rhythm master unit 210 and the rhythm slave unit 220.

That is, the rhythm master unit 210 has a configuration that includes the video-and-sound-data selection determination control RM unit (hereinafter referred to as "RM unit") 201M and the attribute-information obtaining unit 203.

The rhythm slave unit 220 has a configuration that includes the video-and-sound-data selection determination control RS unit (hereinafter referred to as "RS unit") 201S and the attribute-information obtaining unit 203 as well as the body-information obtaining unit 30, the ambient-environment-information obtaining unit 40, the playback-history-information holding unit 15, the video-and-sound-data obtaining unit 204, the video-and-sound-data decoding unit 205, and the video-and-sound arrangement processing unit 206.

In this first embodiment, based on the attribute information of music content being played back, the attribute information being obtained by the attribute-information obtaining unit 203, the RM unit 201M of the rhythm master unit 210 generates musical-piece composition data ARI and synchronization signals SYNC, which serve as references for recomposing a musical piece. The RM unit 201M then supplies the generated musical-piece recomposition data ARI and synchronization signals SYNC to the RS unit 201S of the rhythm slave unit 220

Figure 12:
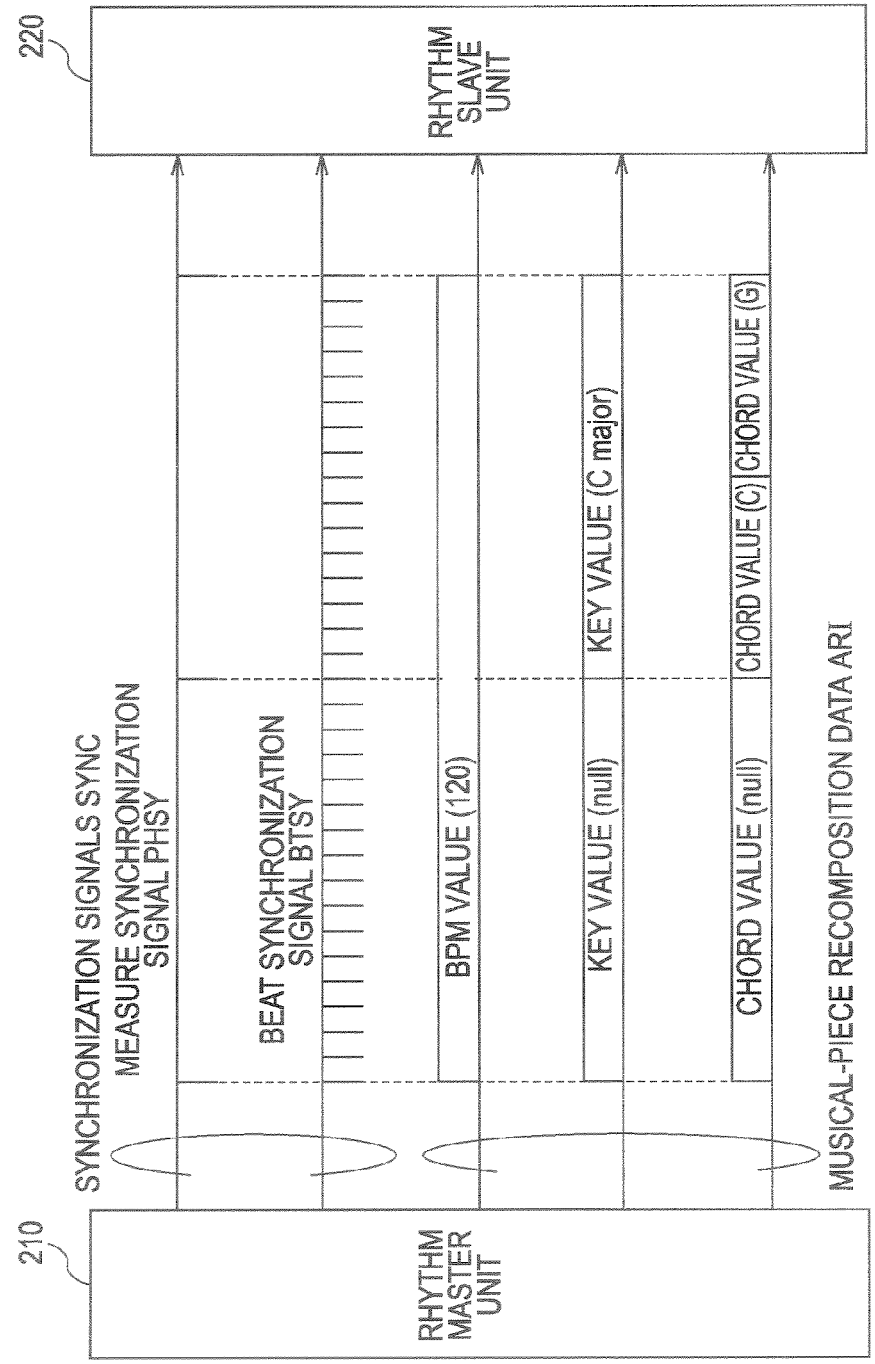
FIG. 12 is a diagram for describing the functional block diagram shown in FIG. 11.

In this embodiment, as shown in FIG. 12, as the synchronization signals SYNC, the RM unit 201M generates and outputs a measure synchronization signal PHSY having a period corresponding to a measure of a musical piece and a beat synchronization signal BTSY having a period corresponding to a beat of the musical piece. In this case, in this first embodiment, the RM unit 201M generates and outputs signals that synchronizes with a measure and a beat of the musical piece being played back.

The measure synchronization signal PHSY is a signal indicating the start of a measure of the musical piece, and has, for example, a falling edge pulse at only the start of the measure of the musical piece. The beat synchronization signal BTSY is a signal indicating the start of a beat of the musical piece and has, for examples a falling edge pulse at only the start of the beat. The number of beats per measure differs depending on the type of musical rhythm.

In synchronization with those synchronization signals, the musical-piece recomposition data ARI is sent from the rhythm master unit 210 to the rhythm slave unit 220. Since this musical-piece recomposition data ARI is multivalued data, the signals of the data flow through multi-bit signal line, such as a data bus.

In this first embodiment, as shown in FIG. 12, as the musical-piece recomposition data ARI, the RM unit 201M generates three values, namely, a BPM value, key value, and chord value, of the musical-piece composition information, and supplies the generated values to the RS unit 201S of the rhythm slave unit 220. Data of the values may be transmitted through a multi-bit signal line, or data of each value may be transmitted through a corresponding signal line as serial data.

The BPM value is a value that serves a master tempo indicating at which tempo the musical piece is to be played back by the rhythm slave unit 220. The BPM value corresponds to the oscillation frequency of the synchronization signals SYNC.

The key value defines the key of music content to be played back. The key value may be a "null" value, when no particular key is determined. When the key value in the musical-piece recomposition data ARI is a "null" value, the rhythm slave unit 220 performs playback at an arbitrary key.

The chord value defines the chord progression of the music content to be played back. The rhythm slave unit 220 performs playback at a given chord value or at a substitute chord. It is acceptable, as long as the tune is maintained in accordance with a music theory. The chord value may be a "null" value. When the chord value in the musical-piece recomposition data ARI is a "null" value, the rhythm slave unit 220 performs playback at an arbitrary chord.

In the case of this first embodiment, the RM unit 201M directly outputs, as the musical-piece recomposition information ARI, the BPM value, key value, and chord value extracted from the attribute information of the musical piece being played back.

Figure 13:
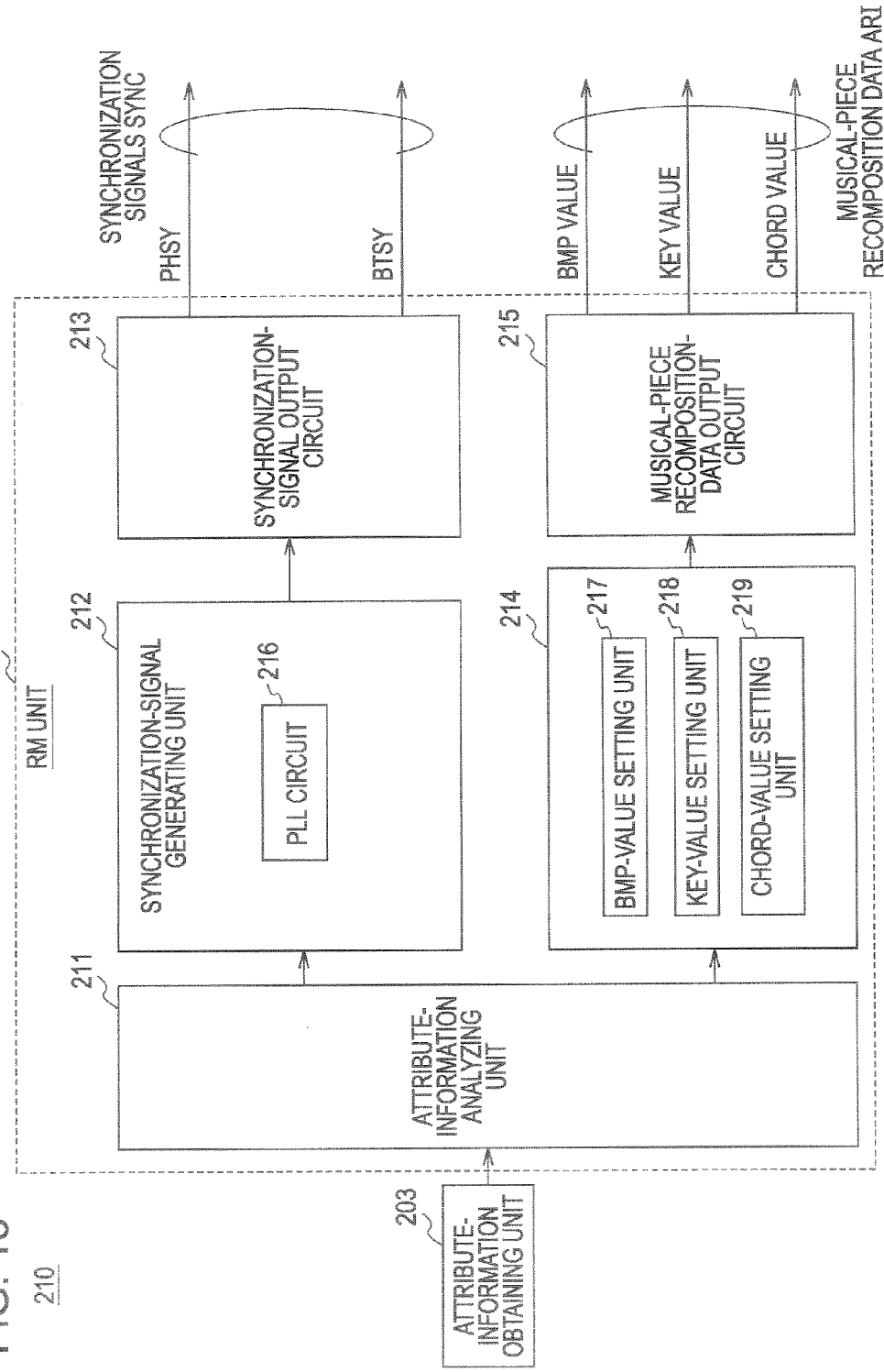
FIG. 13 is a more detailed functional block diagram of part of the functional block diagram shown in FIG. 11.

FIG. 13 is a diagram showing an example of a detailed configuration of the rhythm master unit 210 in this first embodiment and particularly showing, in blocks, details of the function of the RM unit 201M. Thus, from the functional point of view, the RM unit 201M includes an attribute-information analyzing unit 211, a synchronization-signal generating unit 212, a synchronization-signal output circuit 213, a musical-piece recomposition-data setting unit 214, and a musical-piece recomposition-data output circuit 215.

The attribute-information analyzing unit 211 in the RM unit 201M receives from the attribute-information obtaining unit 203, the attribute information of the musical piece that is being played back and that is to be recomposed and analyzes the received attribute information. Of the attribute information of the musical piece being played back, the attribute-information analyzing unit 211 extracts the above-described musical-piece composition information. Then, of the extracted musical-piece composition information, the attribute-information analyzing unit 211 supplies, particularly, the BPM value, which serves as tempo information and which is one type of segment information of a measure and beat, to the synchronization-signal generating unit 212.

The synchronization-signal generating unit 212 includes a PLL (phase-locked loop) circuit 216. The PLL circuit 216 is used to generate synchronization signals SYNC that oscillate at an oscillation frequency corresponding to the BPM value supplied from the attribute-information analyzing unit 211. The synchronization signals SYNC include a measure synchronization signal PHSY and a beat synchronization signal BTSY, which respectively synchronize with a measure and a beat of the music content to be played back. As shown in FIG. 12, the synchronization-signal generating unit 212 supplies the generated synchronization signals SYNC to the RS unit 201S through the synchronization-signal output circuit 213.

Of the musical-piece composition information of the attribute information of the musical piece being played back, the attribute information being received from the attribute-information obtaining unit 203, the attribute-information analyzing unit 211 in the RM unit 201M extracts the BPM value, key value, and chord value and supplies the extracted values to the musical-piece recomposition-data setting unit 214.

The musical-piece recomposition-data setting unit 214 sets the received BPM value in a BPM-value setting unit 217, sets the received key value in a key-value setting unit 218, and sets the received chord value in a chord-value setting unit 219. The BPM value, the key value, and the chord value which are set in the BPM-value setting unit 217, the key-value setting unit 218, and the chord-value setting unit 219, respectively, are passed from the musical-piece recomposition-data setting unit 214 to the musical-piece recomposition-data output circuit 215. As shown in FIG. 12, the values are then supplied from the musical-piece recomposition-data output circuit 215 to the RS unit 201S as the musical-piece recomposition data ARI.

In synchronization with the playback of the musical-piece data of the music content, the RM unit 201M generates the synchronization signals SYNC and the musical-piece recomposition data ARI in real time based on the attribute information sent from the attribute-information obtaining unit 203, and supplies the generated synchronization signals SYNC and musical-piece recomposition data ARI to the RS unit in the rhythm slave unit 220.

Figure 14:
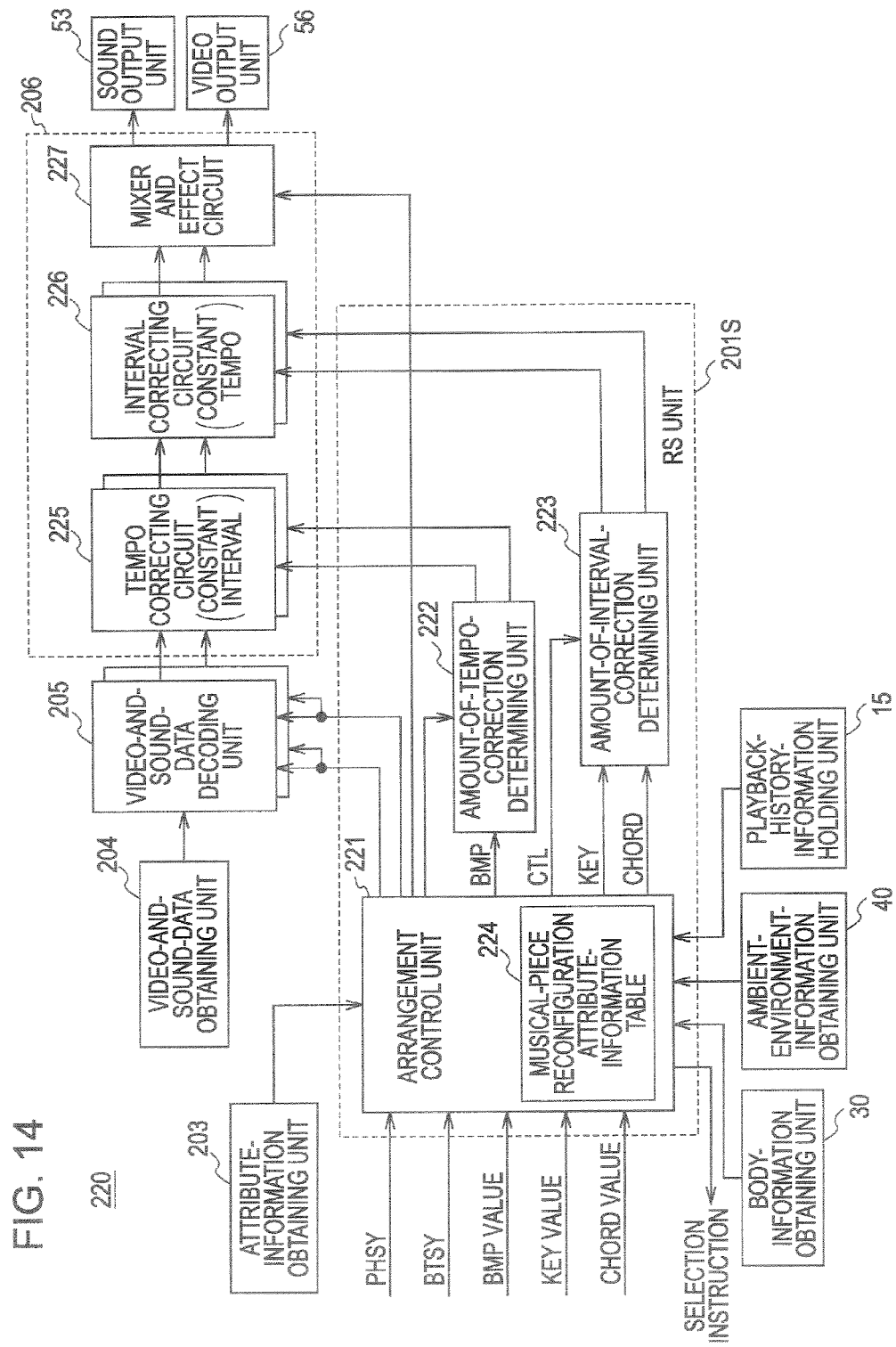
FIG. 14 is a more detailed functional block diagram of part of the functional block diagram shown in FIG. 11.

FIG. 14 shows an example of a detailed configuration of the rhythm slave unit 220 in this first embodiment. From the functional point of view, the RS unit 201S in the rhythm slave unit 220 has a configuration as shown in FIG. 14 and includes an arrangement control unit 221, an amount-of-tempo-correction determining unit 222, and an amount-of-interval-correction determining unit 223. The video-and-sound arrangement processing unit 206 in the rhythm slave unit 220 includes a tempo correcting circuit 225, an interval correcting circuit 226, and a mixer and effect circuit 227.

The arrangement control unit 221 pre-obtains the attribute information of all music content from the attribute-information storage unit 22 in the music-content storage unit 20 through the attribute-information obtaining unit 203, creates a musical-piece recomposition attribute-information table 224 based on the obtained attribute information, and holds the musical-piece recomposition attribute-information table 224.

FIG. 15 shows one example of the musical-piece recomposition attribute-information table 224. In this case, remixing is performed as one example of the recomposition processing. Thus, the musical-piece recomposition attribute-information table 224 has the structure of an attribute-information table for remixing. Thus, as shown in FIG. 15, the musical-piece recomposition attribute-information table 224 includes chord values, BPM values, musical-piece names, and feeling values with respect to musical-piece material names. In this example, the feeling values indicate only uptempo feelings, but are, naturally, not limited thereto.

For executing remix processing, for each musical instrument for remixing, the arrangement control unit 221 searches the musical-piece recomposition attribute-information table 224 for a musical-piece material having a BPM value and a chord value that are equal to or close to the BPM value and the chord value in the musical-piece recomposition data API received from the RM unit 201M.

Subsequently by referring to the body information sent from the body-information obtaining unit 30, the ambient-environment information sent from the ambient-environment-information obtaining unit 40, and the playback history information sent from the playback-history-information holding unit 15, the arrangement control unit 221 determines whether or not the listener is requesting an upbeat musical piece. Further, by referring to the feeling values in the musical-piece recomposition attribute-information table, the arrangement control unit 221 determines a musical-piece material to be actually remixed. The arrangement control unit 221 sends a selection instruction to the decoding unit 202 so as to read the sound data of the determined musical-piece material from the music-content storage unit 20.

In response to the selection instruction the decoding unit 202 reads, from the music-content storage unit 20, the musical-piece-material audio data for which the selection instruction was sent. The decoding unit 202 then passes the musical-piece-material sound data for remixing, together with the already read video-and-sound data to be played back to the video-and-sound-data obtaining unit 204.

Thus, the video-and-sound-data obtaining unit 204 supplies the sound data of one or multiple musical-piece materials for remixing, together with the video-and-sound data to be played back, to the video-and-sound-data decoding unit 205.

Thus, the video-and-sound-data decoding unit 205 and the video-and-sound arrangement processing unit 206 processes the multiple pieces of video-and-sound data in parallel. That is the video-and-sound-data decoding unit 205 and the tempo correcting circuit 225 and the interval correcting circuit 226 in the video-and-sound arrangement processing unit 206 have configurations in which processing circuit units corresponding to the number (two in FIG. 14) of pieces of video-and-sound data to be processed in parallel are functionally provided as shown in FIG. 14.

FIG. 16 is a diagram showing a case in which the flows of musical-piece signals in the video-and-sound-data decoding unit 205 and the video-and-sound arrangement processing unit 206 in the rhythm slave unit 220 are synchronized with the synchronization signals SYNC from the rhythm master unit 210. In this case, one stream of playback signals of the musical-piece data (sound data) will be referred to as a "musical-piece track". As described above, the rhythm slave unit 220 has multiple musical-piece tracks. The musical-piece data in the musical-piece tracks are subjected to tempo correction and interval correction, as needed, and the musical-piece data are eventually mixed by the mixer and effect circuit 227.

In the example of FIG. 16 three musical-piece tracks output from the video-and-sound-data decoding unit 205 are played back in synchronization with the synchronization signals SYNC output from the rhythm master unit 210, and are mixed and output by the last stage. In this example, a musical-piece track 1 is the track of the musical-piece data of music content to be played back, and musical-piece tracks 2 and 3 are the tracks of musical-piece materials to be remixed.

Musical-piece materials to be remixed do not have to be available so as to correspond to all the measure sections, as the musical-piece tracks 2 and 3 shown in FIG. 16, and thus may be intermittently played back for only a measure section or multiple-beat section to be mixed.

When only a special effect is to be applied to the musical-piece data of the music content to be played back without remixing, only a stream of the musical-piece data of the music content to be played back exists. In such a case, the mixer and effect circuit 227 applies the aforementioned special-effect processing, such as reverberation or distortion, to the musical-piece data of the music content to be played back.

Based on a difference between the BPM value obtained from the attribute-information obtaining unit 203 and the BPM value (which serves as a target value (i.e., a target BPM value)) in the musical-piece recomposition data ARI sent from the rhythm master unit 210, the amount-of-tempo-correction determining unit 222 determines an amount of tempo correction for the musical-piece materials to be remixed with the musical piece being currently played back. Not only musical-piece materials having a BPM value that is equal to the target BPM but also some musical-piece materials such as a key value and chord value, can also be determined to be suitable as musical-piece materials to be remixed, even when the BPM value thereof is different from the target BPM value. Thus, correction as described above is required to match the BPM value with the target BPM value, when such a musical-piece material is selected.

Subsequently the amount-of-tempo-correction determining unit 222 supplies the determined amount of tempo correction to processing circuit sections for the corresponding musical-piece materials the processing circuit sections being included in the tempo correcting circuit 225.

The tempo correcting circuit 225 corrects sound data so as to change only the playback tempo while keeping the interval constant. For an algorithm for the correction, there are various methods, such as a method using a correlation function. However, the correction in this embodiment does not have a feature in the algorithm therefor, and thus, detailed description thereof will be omitted below.

Based on a difference between the key value/chord value obtained from the attribute-information obtaining unit 203 and the key value/chord value (which serve as target values of the key value/chord value (i.e., target key value/target chord value)) in the musical-piece recomposition data ARI sent from the rhythm master unit 210, an amount-of-interval-correction determining unit 223 determines the amount of interval correction for each musical-piece material to be remixed with the musical piece being currently played back. Not only musical-piece materials having a key value and a chord value that exactly match the target key value and the target chord value but also some musical-piece materials that have different values can also be determined to be suitable as musical-piece materials to be remixed, based on other conditions. Thus, correction as described above is required to match the key value and the chord value with the target values, when such a musical-piece material is selected.

Subsequently, the amount-of-interval-correction determining unit 223 supplies the determined amount or interval correction to the processing circuit sections for the corresponding musical-piece materials, the processing circuit sections being included in the interval correcting circuit 226.

The interval correcting circuit 226 corrects sound data so that it changes only the interval while keeping the tempo constant. Various methods are available for an algorithm for the correction. However, the correction in this embodiment does not have a feature in the algorithm therefor and thus detailed description thereof will be omitted herein.

In response to a mixing control signal or a special-effect control signal from the arrangement control unit 221 the mixer and effect circuit 227 applies a special effect to the video-and-sound data supplied from the interval correcting circuit 226 or mixes the multiple pieces of the video-and-sound data supplied from the interval correcting circuit 226. The type of special effect to be applied depends on the special-effect control signal sent from the arrangement control unit 221.

Figure 17:
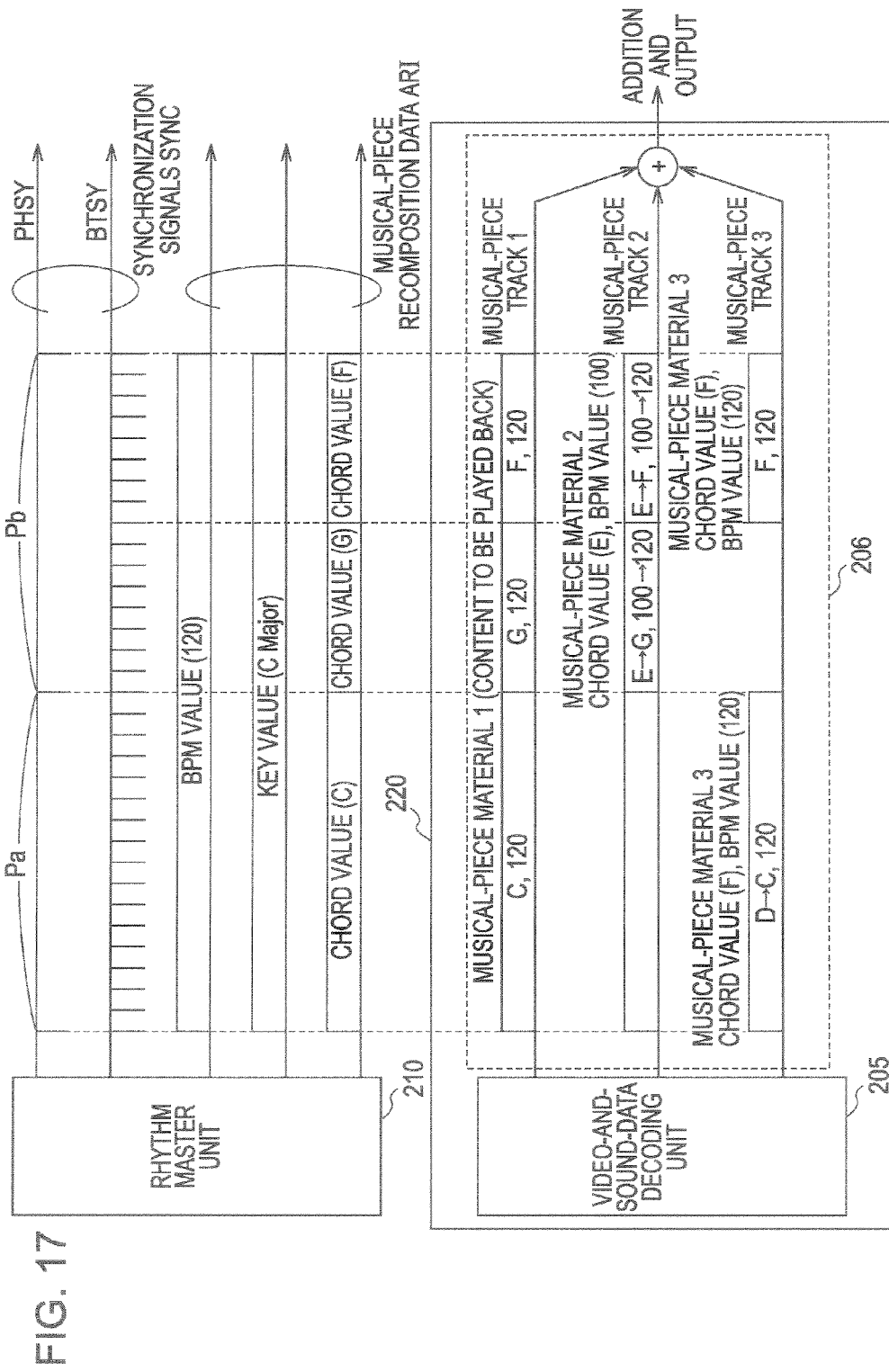
FIG. 17 is a timing diagram for describing the functional block diagram shown in FIG. 11.
Figure 18:
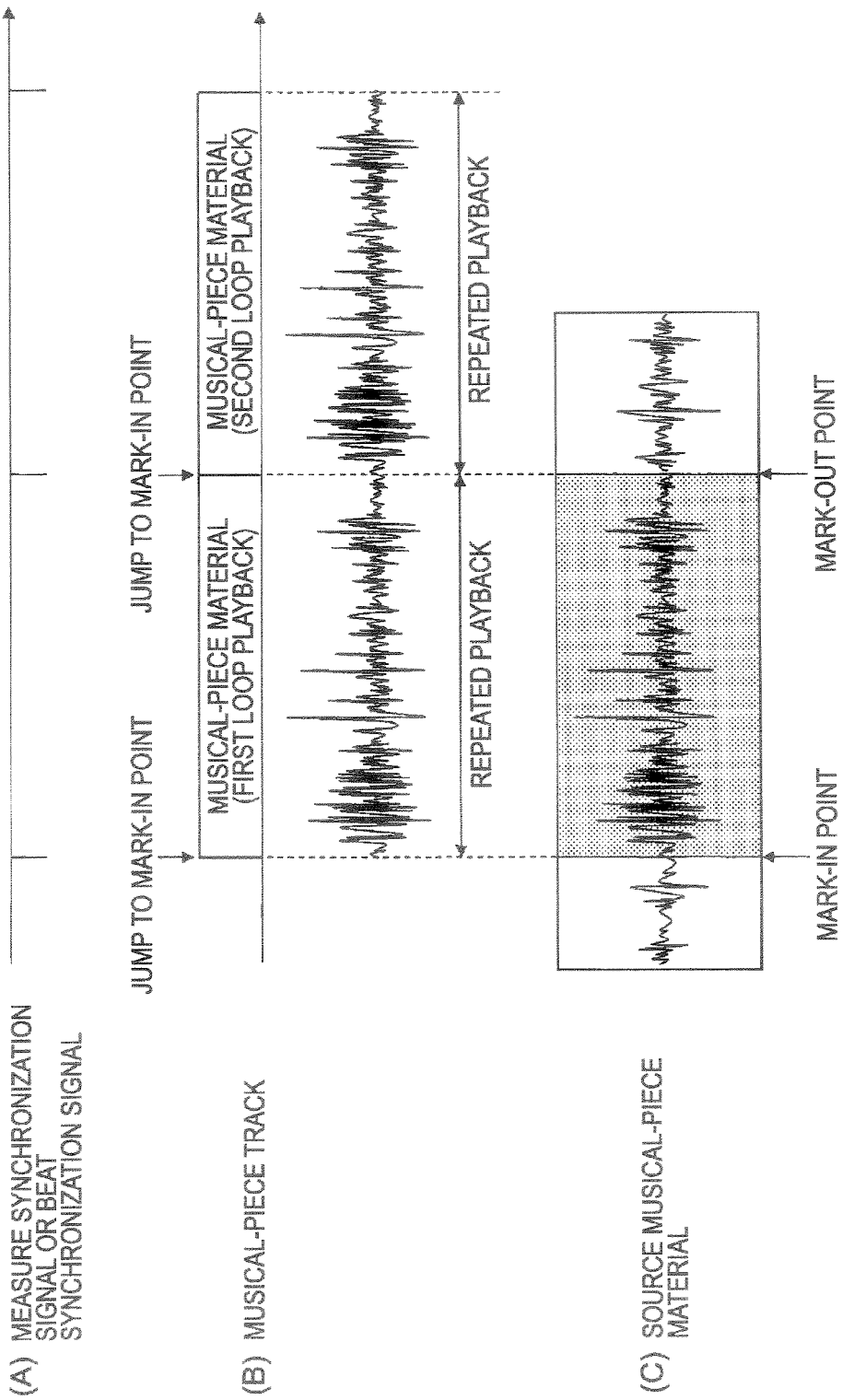
FIG. 18 is a diagram for describing the functional block diagram shown in FIG. 11.

FIG. 17 shows a case in which the flows of musical-piece signals in the video-and-sound-data decoding unit 205 and the video-and-sound arrangement processing unit 206 in the rhythm slave unit 220 are synchronized with the synchronization signals SYNC sent from the rhythm master unit 210 and also the operation of musical-niece recomposition in the video-and-sound arrangement processing unit 206 in the rhythm slave unit 220 is performed so as to correspond to the musical-piece recomposition data ARI in the rhythm master unit 210.

In the case of the example shown in FIG. 17, the musical-piece recomposition data ARI is extracted from the attribute information of the music content to be played back, and the music content to be played back becomes the playback signal stream of a musical-piece track 1. In the example shown in FIG. 17, as the musical-piece recomposition data ARI, the target values of a BPM value "120" a key value "C major", and chord progressions "C"→"G"→"F" are input from the rhythm master unit 210 to the rhythm slave unit 220.

With respect to the playback signal stream of the musical-piece track 1 for the music content to be played back, two musical-piece materials, obtained from the music-content storage unit 20 based on the selection instruction sent from the arrangement control unit 221, are output from the video-and-sound-data decoding unit 205 in the rhythm slave unit 220 as a musical piece track 2 and a musical piece track 3. In the rhythm slave unit 220, the output musical-piece materials are corrected so as to match the target values of the respective values in the musical-piece recomposition data ARI and the corrected musical-piece materials are eventually mixed.

That is, the sound data of the musical-piece tracks 2 and 3 are corrected by the video-and-sound arrangement processing unit 206 so as to match the target BPM value and the tar et chord value in the musical-piece recomposition data ARI and are then mixed with the musical-piece data of the musical-piece track 1, thereby performing remix processing.

In this case, as shown in FIG. 17, in a measure section Pa, a musical-piece material 3 of the musical-piece track 3 is mixed with the sound data of the musical-piece track 1. The BPM value of the musical-piece material 3 in the measure section Pa the BPM value being obtained through the attribute-information obtaining unit 203, is "120" and is thus the same as the BPM value in the musical-piece recomposition data ARI. Thus, the tempo of the musical-piece data of the musical-piece material 3 is not corrected by the video-and-sound arrangement processing unit 206.

However, the chord value of the musical-piece material 3 in the measure section Pa, the chord value being obtained through the attribute-information obtaining unit 203, is "D" and is thus different from the chord value "C" in the musical-piece recomposition data ARI. Thus, the interval of the musical-piece data of the musical-piece material 3 is corrected by the interval correcting circuit 226 in the video-and-sound arrangement processing unit 206, as described above, so that a change "D"→"C" is made so as to reach the target value".

In the first half of a next measure section Pb, a musical-piece material 2 of the musical-piece track 2 is mixed with the sound data of the musical-piece track 1. In the last half of the measure section Pb, the musical-piece material 2 of the musical-piece track 2 and the musical-piece material 3 of the musical-piece track 3 are mixed with the musical-niece data of the musical-piece track 1.

The BPM value and the chord value of the musical-piece material 2 in the first half of the measure section Pb, the values being obtained from the attribute-information obtaining unit 203, are "100" and "E", respectively, and thus are different from the corresponding target BPM value "120" and the target chord value "G" in the musical-piece recomposition data ARI. Thus, in the first half of the measure section Pb, the musical-piece data of the musical-piece material 2 is corrected by the video-and-sound arrangement processing unit 206 so that the tempo changes from "100" to "120" as to match the target BPM value and the interval becomes "E" to "G" so as to match the target chord value. In the first half of the measure section Pb, the corrected musical-piece data of the musical-piece material 2 is added to the musical-piece data of the musical-piece track 1.

In the last half of the measure section Pb, the BPM value and the chord value of the musical-piece material 2 are "100"

and "E", respectively, and are different from the target BPM value "120" and the target chord value "F" in the musical-piece recomposition data ARI. The BPM value and the chord value of the musical-piece material 3 are "120" and "F", respectively, and are the same as the target BPM value "120" and the target chord value "F" in the musical-piece recomposition data ARI.

Thus, in the last half of the measure section Pb, the tempo and the interval of the musical-piece material 2 of the musical piece track 2 are corrected by the video-and-sound arrangement processing unit 206 and the resulting musical-piece material 2 is added to the musical-piece data of the musical-piece track 1. The musical-piece material 3 of the musical-piece track 3 is added to the musical-piece data of the musical-piece track 1, without correction.

As described above, in this first embodiment, with respect to music content to be played back, the synchronization signals SYNC that synchronize with the music content and the musical-piece recomposition data ARI based on the musical-piece composition information of the music content are generated, and based on the generated synchronization signals SYNC and the musical-piece recomposition data ARI, other musical-piece materials are mixed with the original musical piece. This makes it possible to smoothly execute the so-called "remix processing" on the musical piece.

Since the segments of the measure and beat can be easily detected based on the synchronization signals SYNC, special-effect processing can also be easily performed on the musical-piece data.

The arrangement control described above can be executed dynamically in real time. For example, it is possible to easily deal with an input that changes frequently with time, such as an input from a body-information sensor.

In this embodiment, loop playback processing can be performed as one type of special-effect processing for remixing. The loop playback processing refers to a processing function for repeatedly playing back a small amount of musical-piece material data for, for example, one or multiple measures or one or multiple beats. Performing the loop playback allows music to be endlessly played, even with a small amount of musical-piece material. Examples of a musical-piece material to be used for the loop playback include the rhythm pattern of a drum.

For example, in a source musical-piece material as shown in FIG. 18(C), a mark-in (Mark In) point that indicates the start point of loop playback and a mark-out (Mark Out) point that indicates the end point of the loop playback are specified in advance. Multiple pieces of such musical-piece material information are stored in a "DJ loop information storage section", which is separately provided in, for example, the attribute-information storage unit 22 in the music-content storage unit 20. Naturally, the "DJ loop information storage section" may be provided in a storage area other than the attribute-information storage unit 22 so that the source musical-piece material information is stored in the storage area.

For example, when one source musical-piece material is selected and specified from multiple musical-piece materials through the user interface 11 and loop playback is specified the information of the specified musical-piece material is read from the attribute-information storage unit 22 and is supplied to the video-and-sound-data decoding unit 205 in the rhythm slave unit 220. The video-and-sound-data decoding unit 205 and the video-and-sound arrangement processing unit 206 execute the loop playback, while performing tempo correction and interval correction, as needed.

In this case, in synchronization with the measure synchronization signal PHSY or the beat synchronization signal BTSY (see FIG. 18(A)) of the synchronization signals SYNC, the video-and-sound-data decoding unit 205 and the video-and-sound arrangement processing unit 206 start playback from the mark-in point of the source musical-piece material in a musical-piece track to which loop playback is to be performed, as shown in FIG. 18(B). When the playback is finished up to the mark-out point, the playback is jumped from the mark-out point to the mark-in point to execute loop playback. In this case, it is assumed that a timing at which the loop jump is performed from the mark-out point to the mark-in point matches a timing at which the playback reaches the mark-out point.

In this case, since not only one musical piece track to which the loop playback is performed but also all musical-piece tracks are played back in synchronization with the synchronization signals SYNC, it is possible to smoothly perform DJ-loop playback.

Next, the above-described playback processing operation will be described with reference to the flowcharts of FIGS. 19 and 20. In accordance with the program in the ROM 3, the CPU 1 executes processing steps shown in FIGS. 19 and 20 by using the RAM 4 as its work area.

First, the user selects desired music content (musical pieces) on a music-content selection screen of the display of the user interface 11 and gives an instruction for playing back a first musical piece to the video-and-sound-data selection determination control unit 201. For second and subsequent musical pieces, the recording/playback apparatus of the embodiment automatically selects them to continue playback.

Upon receiving the first musical-piece playback instruction through the user interface 11, the video-and-sound-data selection determination control unit 201 checks the music content for which the playback instruction was received. Further, the video-and-sound-data selection determination control unit 201 issues an instruction to the decoding unit 202 so as to read, from the attribute-information storage unit 22 in the music-content storage unit 20, the attribute information of the music content for which the playback instruction was received and all other attribute information or a predetermined amount of attribute information. The video-and-sound-data selection determination control unit 201 then reads the attribute information sent, in response to the instruction, from the decoding unit 202 through the attribute-information obtaining unit 203, and analyzes the attribute information (step S61).

In this case, in order to select a next playback musical-piece candidate, described below, and to recompose the musical piece being listened to, the video-and-sound-data selection determination control unit 201 pre-obtains and analyzes the attribute information of the music content for which the playback instruction was given and the attribute information of other music content, thereby preparing for the selection of the next playback musical-piece candidate, as described below, and preparing for the recomposition of the musical piece being listened to.

Next, the video-and-sound-data selection determination control unit 201 issues an instruction to the decoding unit 202 so as to read the video-and-sound data of the music content for which the playback instruction was given. In response, the decoding unit 202 reads, from the music-content storage unit 20, the video-and-sound data of the music content for which the playback instruction was given, and passes the read video-and-sound data to the video-and-sound-data obtaining unit 204. The video-and-sound data obtained by the video-and-sound-data obtaining unit 204 is passed to the video-and-sound-data decoding unit 205 and is decoded. Via the videoand-sound arrangement processing unit 206 the decoded data is supplied to the sound output unit 53, so that sound is output, and the decoded data is also supplied to the video output unit 556 so that video is output, thereby starting playback (step S62).

When the playback of the music content is started as described above, the video-and-sound-data selection determination control unit 201 obtains the listener body information from the body-information obtaining unit 30 and also obtains the ambient environment information from the ambient-environment-information obtaining unit 40 (step S63).

Thereafter, based on the listener body information obtained from the body-information obtaining unit 30, the video-and-sound-data selection determination control unit 201 determines whether or not the listener is showing a preference for the musical piece he or she is listening to (step S64).

By receiving the body information, such as body movement, through the body-information sensor 31 and the body-information analyzing unit 32 in the recording/playback apparatus, the video-and-sound-data selection determination control unit 201 determines whether or not the listener currently wants to positively listen to music. For example, when the listener is in a state in which he or she is riding music, the body moves with the music naturally.

That is, for example, calculation of a cross-correlation function for the musical-piece composition information (e.g. the segment and tempo of each musical-piece material) of the musical-piece being played back and signals output from a body-movement sensor (e.g. an acceleration sensor) allows a determination as to whether or not the listener currently wants to positively listen to the music to be made to some degree based on the coefficients of the correlation. In this case, it is more preferable to consider the feeling information in the attribute information. It can be assumed that, for a heavy musical piece, the listener's body movement becomes active correspondingly, and for a mellow musical pieces the listener's body movement becomes slow.

It can be understood that a large correlation coefficient means that the listener is in the so-called "riding" state, in which the listener wishes to positively view/listen to the music. When the listener is positively listening to music, repeated playback of a musical piece having a higher "riding" numeric value makes it possible to play back a musical piece that meets the user's preference.

Conversely when the amount of listener's body movement during listening to a musical piece is small and the brain waves and so on are calm, playback of a mellow musical piece having a small "riding" numeric value with a small sound volume allows the user to enjoy the music in a mellower mood.

A determination is made as to whether or not the user is showing a preference by analyzing the listener body information while referring to not only the "riding" but also feeling information contained in the attribute information of the music content being played back. Examples of the feeling information include feeling numeric values indicating, for example, "upbeat/downbeat", "mellow/heavy", and "sad/merry". That is, for example, a mellow musical piece and a sad musical piece exhibit a low "riding" numeric value, but the listener may show a preference for such a musical piece when the brain waves, pulse, and so on are calm.

When it is determined in step S64 that the listener is not showing a preference for the musical piece being played back, the video-and-sound-data selection determination control unit 201 detects a musical piece having a high frequency of playback by referring to the playback history information in the playback-history-information holding unit 15 or the playback history information contained in the music content, the playback history information being contained in the pre-obtained attribute information (step S65).

Next, the video-and-sound-data selection determination control unit 201 extracts the musical-piece composition information in the attribute information of the musical piece having a high frequency of playback and determines a tune that would be preferred by the listener. In this case, when multiple musical pieces having a high frequency of playback exist and the tunes of the musical pieces are the same, it is determined that the listener prefers the musical-piece composition information of the tune. When multiple musical pieces having a high frequency of playback exist and multiple tunes also exist, it is determined that the listener prefers musical-piece composition information of a high-frequency-playback musical piece having a tune similar to the tunes.

The video-and-sound-data selection determination control unit 201 then selects other musical pieces having musical-piece composition information that is similar to the musical-piece composition information of the tune determined to be preferred by the listener, that is, other musical pieces having similar tunes and designates the selected musical pieces as next musical-piece playback candidates (step S66). This is intended to present the listener a musical piece that would be preferred by the listener based on the previous listener playback history, since the listener is not showing a preference for the musical piece being currently played back.

The video-and-sound-data selection determination control unit 201 then monitors whether or not the musical piece being played back has been played back to its end (step S67). When it is determined that the musical piece has been played back to its end, the playback-history-information holding unit 15 updates the playback history for the played back musical piece (music content) and also updates the playback history information of the attribute information of the music content (step S68).

The video-and-sound-data selection determination control unit 201 selects, from the playback musical-piece candidates determined in step S66, the music content of a musical piece to be played back next, and issues an instruction for reading the video-and-sound data of the music content to start the playback of the musical piece (step S69). The process then returns to step S63 and the processing from step S63 is repeated.

When it is determined in step S67 that the musical-piece has not been played back to its end, the video-and-sound-data selection determination control unit 201 determines whether or not the user has pressed a "next button" provided at the operation section of the user interface 11 (step S70). This "next button" is pressed when the listener wishes to listen to a next musical piece rather than the musical piece he or she is currently listening to.

When it is determined in step S70 that the "next button" has been pressed, the process proceeds to step S69. In step S69, the video-and-sound-data selection determination control unit 201 selects, from the playback musical-piece candidates determined in step S66, the music content of a musical piece to be played back next, and issues an instruction for reading the video-and-sound data of the music content to start the playback of the musical piece. The process then returns to step S63 and the processing from step S63 is repeated.

When it is determined in step S70 that the "next button" has not been pressed, the video-and-sound-data selection determination control unit 201 determines whether or not a "stop button" of the operation section of the user interface 11 has been pressed by the user (step S71). When it is determined that the "stop button" has not been pressed, the process returns to step S67, in which the video-and-sound-data selection determination control unit 201 monitors the end of the musical piece being played back. When it is determined that the stop button has been pressed, this playback processing routine ends.

When it is determined in step S64 that the listener is not showing a preference for the musical piece being played back, the video-and-sound-data selection determination control unit 201 determines whether or not the listener's preference is high by using the above-described "riding" numeric values or the like (step S81 shown in FIG. 12).

When it is determined that the listener's preference is not sufficiently high, the video-and-sound-data selection determination control unit 201 in this embodiment considers the ambient-environment information obtained from the ambient-environment-information obtaining unit 40 and designates, as the next playback musical-piece candidates, musical pieces that are similar in tune to the musical piece being currently played back (step S82). That is, for example, the video-and-sound-data selection determination control unit 201 first selects other musical pieces having attribute information containing musical-piece composition information that is similar to the musical-piece composition information of the attribute information accompanying the musical piece being currently played back. The video-and-sound-data selection determination control unit 201 obtains the current-location information, such as a mountain or sea, from the ambient-environment-information obtaining unit 40. The video-and-sound-data selection determination control unit 201 then selects, from the selected musical pieces, musical pieces having attribute information containing ambient-environment information indicating that the listening thereto are recommended at that location, and designates the selected musical pieces as the next playback musical-piece candidates.

In step S82, the next musical-piece candidates may be determined based on only the ambient-environment information without searching for any musical piece that is similar in tune to the musical piece being currently played back. Also, not only musical pieces having ambient-environment information that matches the ambient-environment information but also musical pieces that have musical-piece composition information similar to that of those musical nieces may be determined and the determined musical pieces may be used as the next playback musical-piece candidates.

Next, when it is determined in step S81 that the preference is high the video-and-sound-data selection determination control unit 201 designates, as the next playback musical-piece candidates, musical pieces that are similar in tune to the musical piece being currently played back (step S83). That is, for example, the video-and-sound-data selection determination control unit 201 first selects other musical pieces having attribute information containing musical-piece composition information that is similar to the musical-piece composition information of the attribute information accompanying the musical piece being currently played back, and designates the selected musical pieces as the next playback musical-piece candidates.

In addition, the video-and-sound-data selection determination control unit 201 obtains the musical-piece composition information of each musical-piece material, together with the segment information of each musical-piece material, from the attribute information of the musical piece being played back (step S84). Examples of the musical-piece composition information include a tempo, key, and chord progression. The segment information of each musical-piece material and the musical-piece composition information of each musical-piece material are used to recompose the sound data of a musical piece so that it does not sound musically unnatural (step S85). Also, in step S85 an effect may also be applied to the video data.

The recomposition of the sound data involves processing, such as increasing or reducing the tempo, increasing or reducing the key, and changing the chord progression, in addition to the above-described remixing and effect application.

For example, in the case of remixing, a musical piece having musical-piece composition information that is similar to that of the musical piece being played back is selected from the musical-piece composition information of other musical pieces, and the elected musical piece is smoothly mixed with the original musical piece, considering the segment of each musical piece material. During the remixing, the feeling information in the attribute information may also be referred to in order to determine what type of music data of a musical-piece material is to be remixed.

In addition, a drumbeat rhythm and a percussion part are pre-stored and prepared in the recording/playback apparatus so as to be remixed with the musical piece being played back, while careful attention is given to the segment of each musical-piece material.

The video-and-sound-data selection determination control unit 201 can be configured such that, when selecting another musical piece to be remixed, it searches for a musical piece that matches the ambient environment by referring to the ambient-environment information of the attribute information.

When parameters of a recommended effect is contained in the attribute information of the musical piece being played back, the parameters of the effect may be used to perform effect processing so that it does not sound musically unnatural, while paying attention to the segment of each musical-piece material.

In the example described above, when the listener is not showing a preference for the musical piece being played back, the playback history information is obtained in step S65 and the next playback musical-piece candidates are determined in step S66 based on the playback history information. However, the location, such as a mountain or sea, may be determined in step S65 through the analysis of the ambient-environment information obtained through the ambient environment-information obtaining unit 40, and musical pieces that have, as the attribute information, ambient environment information that matches the obtained ambient environment information may be designated in step S66 as the next playback musical-piece candidates. Also not only musical pieces having ambient-environment information that matches the corresponding ambient-environment information but also musical pieces having musical-piece composition information similar to that of those musical pieces may be obtained and the obtained musical pieces may be used as the next playback musical-piece candidates.

In addition, the video-and-sound-data selection determination control unit 201 may be configured so as to determine the next playback musical-piece candidates by using both the playback history information and the ambient-environment information in step S66.

Figure 21:
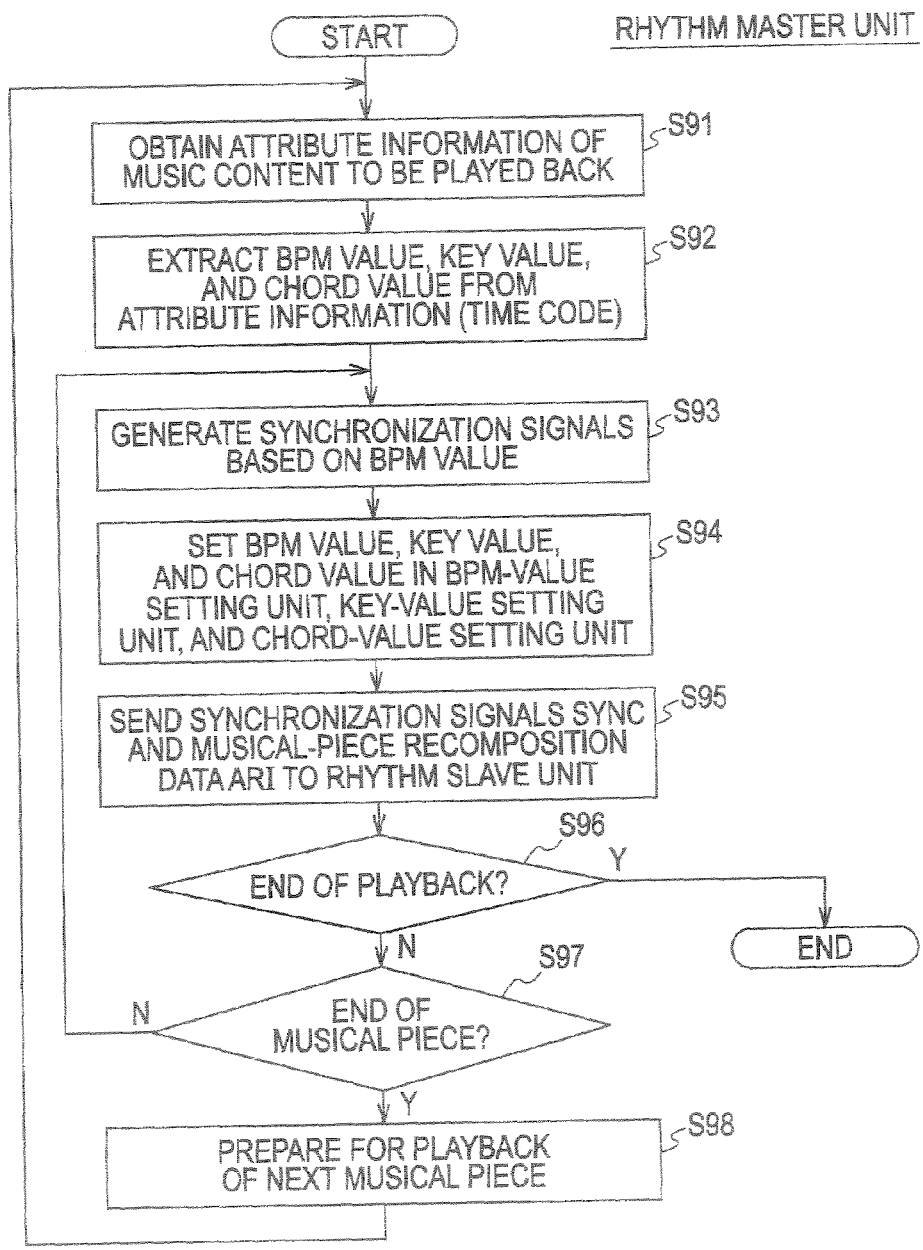
FIG. 21 is a flowchart of a processing operation of a rhythm master unit, which is a portion included in FIG. 11.

FIG. 21 is a flowchart showing one example in which the rhythm master unit 210 performs generation and output processing of synchronization signals and musical-piece recomposition data.

First, the video-and-sound-data selection determination control RM unit 201M obtains the attribute information of music content to be played back, from the attribute-information storage unit 22 in the music-content storage unit 20 through the attribute-information obtaining unit 203 (step S91). The RM unit 201M extracts a BPM value, key value, and chord value from the obtained attribute information (step S92).

Next, based on the extracted BPM value, the RM unit 201M generates synchronization signals SYNC including a measure synchronization signal PHSY and a beat synchronization signal BTSY (step S93). The extracted BPM value, key value, and chord value are also set in the BPM-value setting unit, the key-value setting unit, and the chord-value setting unit (step S94).

The RM unit 201M then sends the synchronization signals SYNC generated in step S93 and musical-piece recomposition data ARI containing the BPM value, key value, and chord value set in step S94 to the rhythm slave unit 220 (step S95).

A determination is then made as to whether or not the playback is finished (step S965). When the playback is finished, the processing routine shown in FIG. 21 ends. When the playback is not finished, a determination is made as to whether or not the musical piece being played back has been played back to its end and the playback is finished (step S97). When it is determined that the playback of the musical piece has not been finished yet, the process returns to step S93, and the synchronization signals SYNC and the musical-piece recomposition data ARI are continuously sent to the rhythm slave unit 220.

When it is determined in step S97 that the playback of the musical piece has been finished, preparation is made for the playback of a next selected musical piece (step S98). The process then returns to step S91 and the above-described processing is repeated.

In this case, as described above, the recording/playback apparatus is configured so that, for example, the time-code information of the segment of a measure serving as a musical-piece material unit, the time-code information being described in the attribute information, and the time code of the segment of a measure of the actual video-and-sound exactly match each other. That is, the recording/playback apparatus is configured so that the video-and-sound data of the music content and the attribute information exactly correspond to each other. Thus the synchronization signals SYNC and the musical-piece recomposition data ARI supplied from the rhythm master unit 210 to the rhythm slave unit 220 are completely synchronized with the playback signal stream of the video-and-sound data input to the rhythm slave unit 220 through the video-and-sound-data obtaining unit 204.

Figure 22:
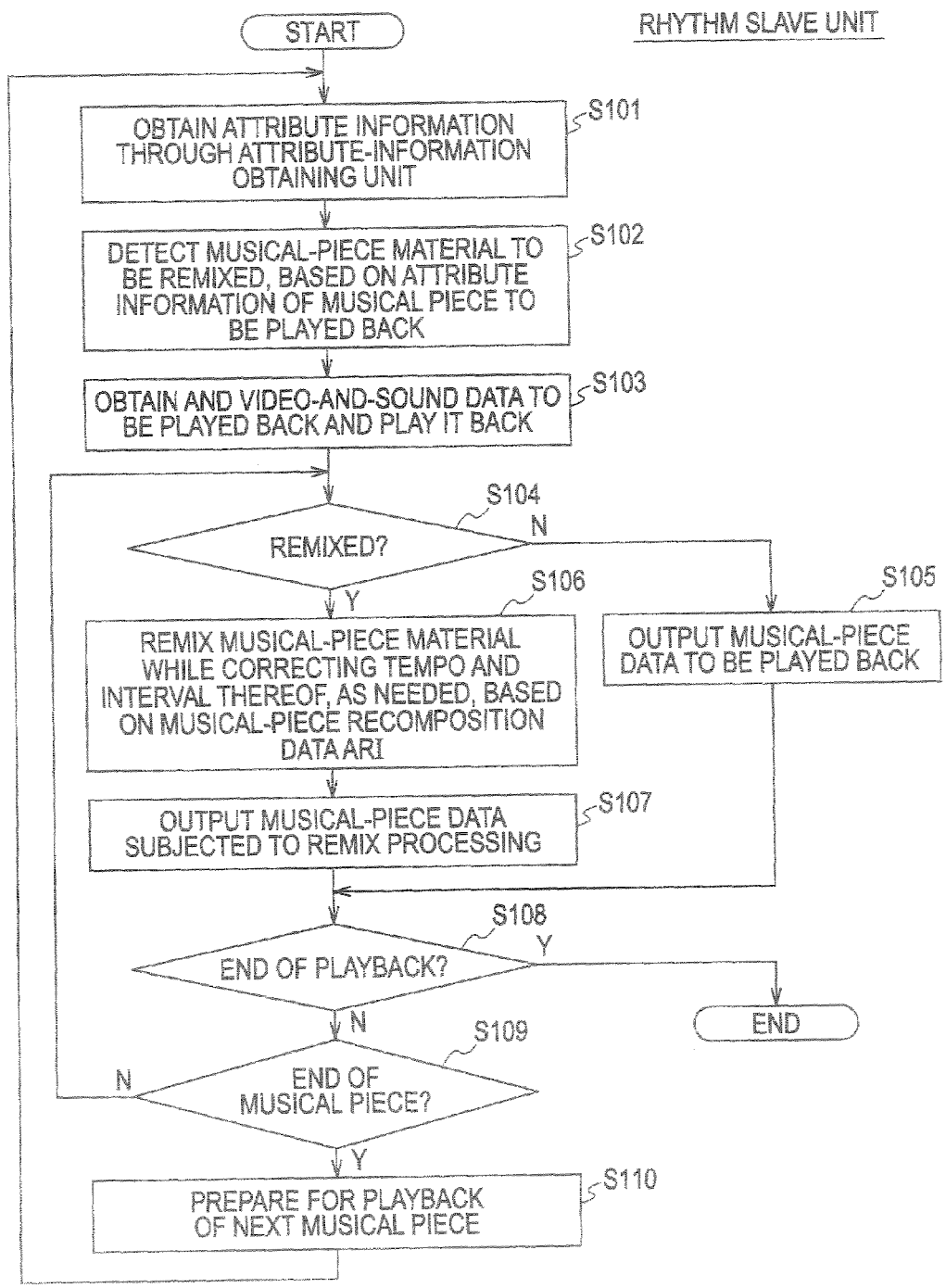
FIG. 22 is a flowchart of a processing operation of a rhythm slave unit, which is a portion included in FIG. 11.

FIG. 22 is a flowchart of one example of the musical-piece recomposition processing in the rhythm slave unit 220. Although only an example of remix processing will be described below for the musical-piece recomposition processing, special-effect processing can also be performed, as described above.

Firsts the video-and-sound-data selection determination control RS unit 201S obtains not only a musical piece to be played back but also the attribute information of multiple pieces of music content from the attribute-information storage unit 22 in the music-content storage unit 20 through the attribute-information obtaining unit 203 (step S101). Based on the obtained attribute information the RS unit 201S detects musical-piece materials to be remixed with the musical piece to be played back (step S102).

In this case, the RS unit 201S may read and obtain the attribute information of all music content from the attribute-information storage unit 22 in the music-content storage unit 20. However, when the number of pieces of music content stored in the music-content storage unit 20 is large, the load of detecting musical-piece materials to be remixed with the musical piece to be played back increases significantly. Accordingly in this example, by reading attribute information multiple times in a separate manner from the attribute-information storage unit 22 in the music-content storage unit 20 rather than reading all the attribute information therefrom at a time, the RS unit 201S detects musical-piece materials to be remixed at each time with the musical piece to be played back.

Since the attribute information is read from the attribute-information storage unit 22 in the music-content storage unit 20 multiple times in a separate manner, the detection processing of the musical-piece materials to be remixed is also performed even after the playback of the musical piece to be played back is started. However, when considering that remixing is rarely performed simultaneously with the start of the playback of a musical piece, there is an enough time for the detection processing of the musical-piece materials to be remixed with the musical piece to be played back.

Next, in accordance with a selection instruction from the video-and-sound-data selection determination control RS unit 201S, the video-and-sound data to be played back is obtained through the decoding unit 202 and the video-and-sound-data obtaining unit 204, and the playback of the video-and-sound data is started (step S103). This playback is performed in synchronization with the synchronization signals SYNC and the musical-piece recomposition data ARI supplied from the rhythm master unit 210, as described above.

Next, the video-and-sound selection determination control RS unit 201S determines whether or not remix processing is to be performed on the musical piece being played back (step S104). Upon determining that no remix processing is to be performed, the video-and-sound-data selection determination control RS unit 201S sends the musical-piece data being played back to the sound output unit 53 and the video output unit 56 through the video-and-sound-data decoding unit 205 and the video-and-sound arrangement processing unit 206 (step S105).

When it is determined in step S104 that remix processing is to be performed, the tempo and interval of the musical-piece materials detected in step S102 are remixed, while being corrected as needed with the musical-piece data to be played back, based on the musical-piece recomposition data ARI from the rhythm master unit 210, as described above (step S106). Then, musical-piece data subjected to the remix processing is output (step S107).

A determination is then made as to whether or not the playback is finished (step S108). When the playback is finished, the processing routine shown in FIG. 22 ends. When the playback is not finished, a determination is made as to whether or not the musical piece being played back has been played back to its end and the playback is finished (step S109). When it is determined that the playback of the musical piece has not been finished yet, the process returns to step S104, and the processing in step S104 and the subsequent steps is repeated.

When it is determined in step S109 that the playback of the musical piece has been finished, preparation is made for the playback of a next selected musical piece (step S110). The process then returns to step S101 and the above-described processing is repeated.

Second Embodiment

In the first embodiment described above, the description has been mainly given of a case in which the rhythm master unit 210 performs remix processing as recomposition processing for a musical piece to be played back, based on the BPM value, the key value, and the chord value extracted from the attribute information of the music content to be played back. Thus, no change has been performed on the tempo and the interval of the musical piece to be played back. However, the musical-piece recomposition processing can include changing and correcting the tempo and the interval of the musical piece to be played back, based on the listener's mood, the ambient environment such as the location where the musical piece is listened to, and so on.

In some cases, the listener may give an instruction for changing the tempo or interval. There is also a requirement for playing back a musical piece being played back in synchronization with a drum and piano played at the location where the recording/playback apparatus is placed, and there is a requirement for playing back a musical piece in synchronization with a musical piece externally input from the recording/playback apparatus.

This second embodiment provides a recording/playback apparatus that can achieve those requirements.

Figure 23:
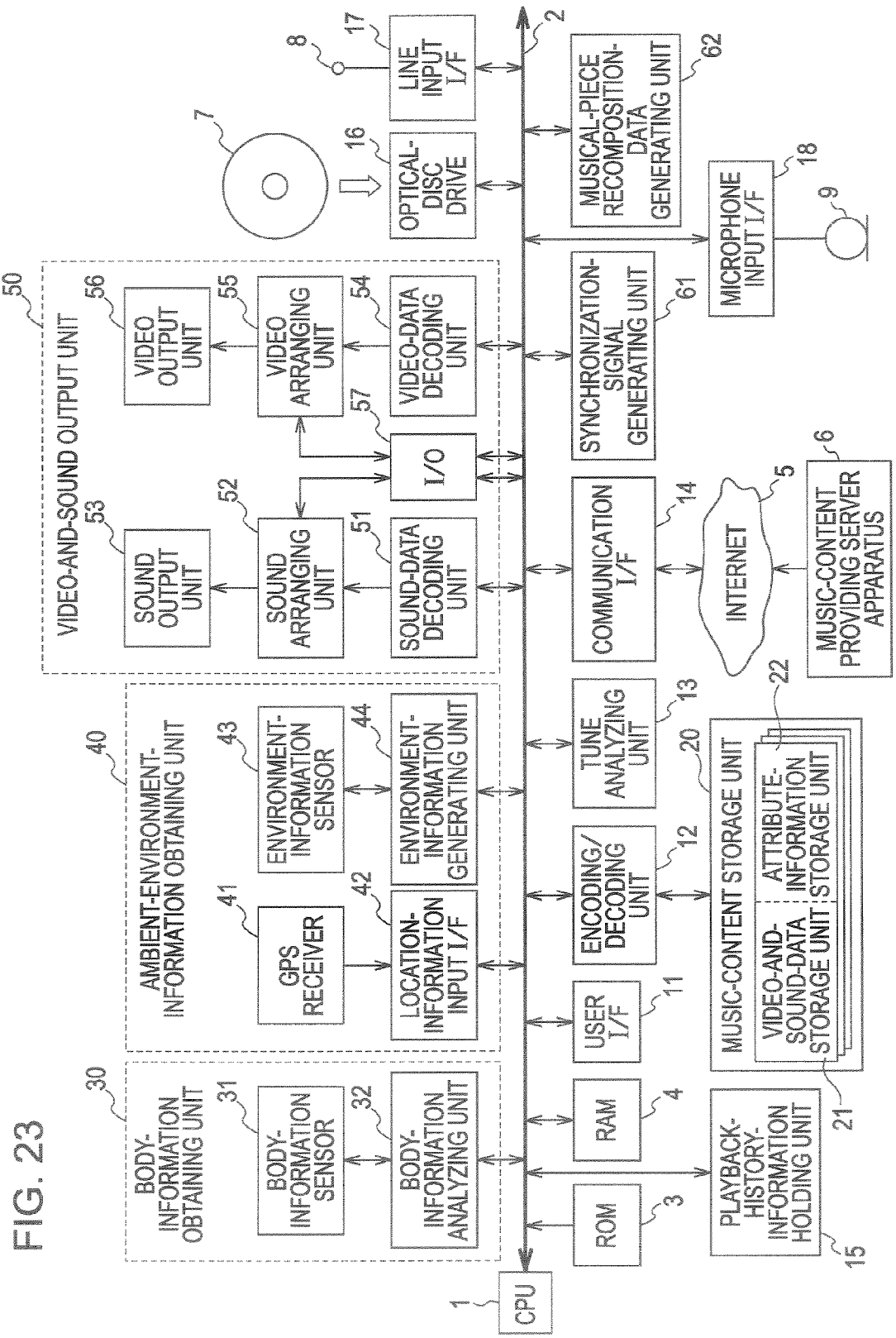
FIG. 23 is a block diagram of a recording/playback apparatus to which a second embodiment of the music-content playback apparatus of the present invention is applied.

FIG. 23 is a block diagram of a recording/playback apparatus in the case of this second embodiment. The recording/playback apparatus has a configuration in which a line input interface 17 and a microphone input interface 18 are additionally connected to the system bus 2 in the recording/playback apparatus in the case of the first embodiment shown in FIG. 1. In terms of hardware, other configurations are the same as those of the first embodiment.

An external input terminal 8 is connected to the line input interface 17. The line input interface 17 sends video-and-sound data, input via the external input terminal (line input terminal) 8, to the system bus 2.

In this second embodiment, in response to a user instruction operation through the user interface 11, the encoding/decoding unit 12 performs record-encoding on the video-and-sound data input via the external input terminal 8, and the resulting video-and-sound data is stored in the video-and-sound-data storage unit 21 in the music-content storage unit 20.

The video-and-sound data input via the external input terminal 8 is analyzed by the tune analyzing unit 13, the resulting musical-piece composition information is subjected to record-encoding by the encoding/decoding unit 12, and is stored in the attribute-information storage unit 22 in the music-content storage unit 20. In this case, the attribute information and the corresponding video-and-sound data which are stored in the music-content storage unit 20 are associated with each other by the identification information thereof, as described above.

In this second embodiment, the recording/playback apparatus is configured so as to allow the playback of musical-piece data to be played back in synchronization with the tempo of the video-and-sound data input via the external input terminal 8, as described below. That is, the video-and-sound data input via the external input terminal 8 is analyzed by the tune analyzing unit 13, and the above-described synchronization signals SYNC are generated based on the BPM value, which is one of the results of the analysis.

A microphone 93 which serves as sound collecting means, is connected to the microphone input interface 18. An audio signal resulting from sound collected by the microphone 9 is converted by the microphone input interface 18 into a digital signal, which is then sent to the system bus 2.

In this second embodiment, the recording/playback apparatus is configured so as to allow the playback of musical-piece data in synchronization with the tempo of sound data collected by the microphone 9 and input via the microphone input interface 18, as described above.

For example, the sound of a drum, a piano, and a musical piece played in the vicinity of the recording/playback apparatus is collected by the microphone 9 and analyzed by the tune analyzing unit 13, and the BPM value is detected. The above-described synchronization signals SYNC are generated based on the detected BPM value.

Figure 24:
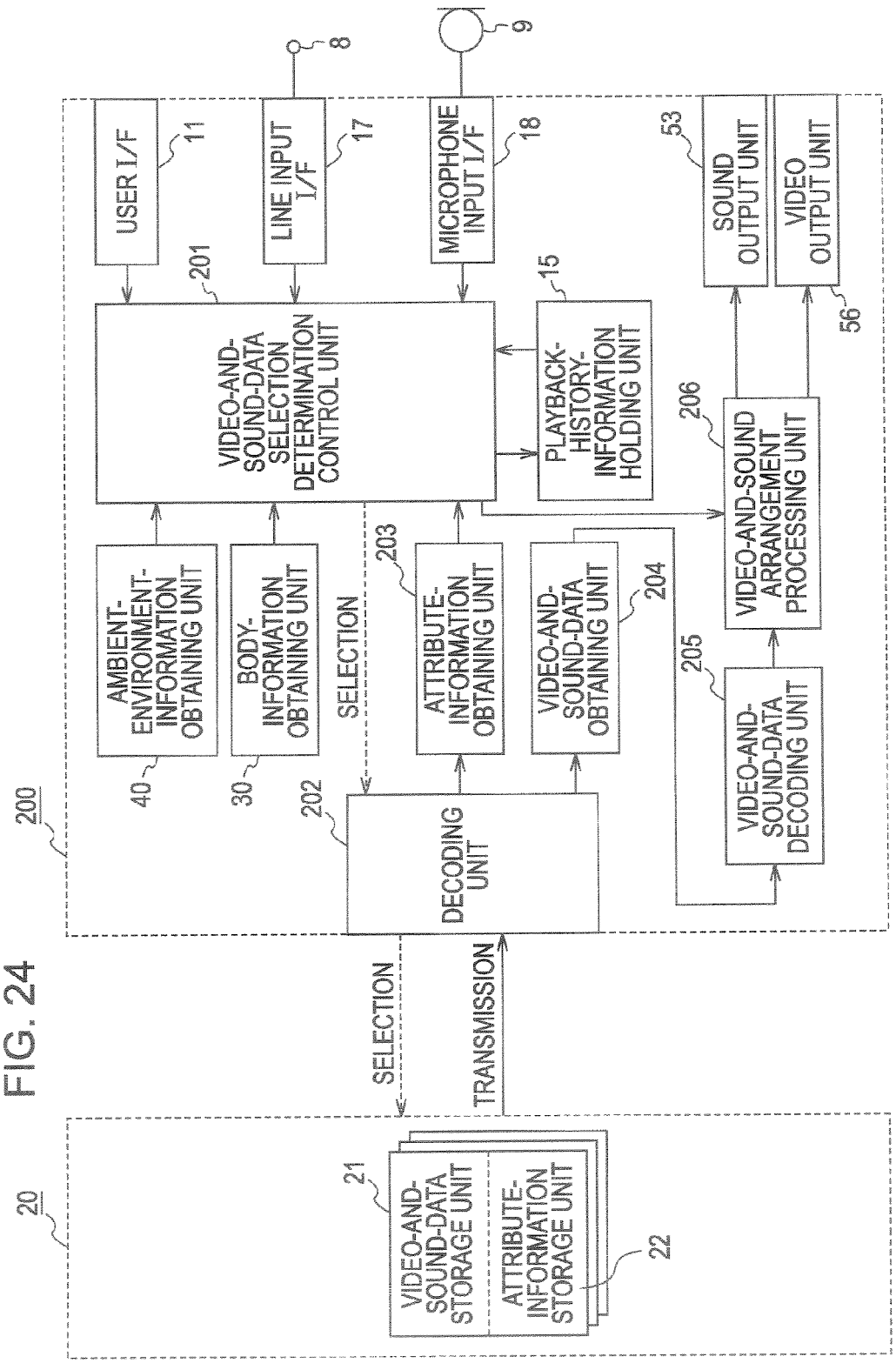
FIG. 24 is a functional block diagram for illustrating a playback processing operation section of the recording/playback apparatus of the second embodiment shown in FIG. 23.

FIG. 24 shows a playback unit 200 according to the second embodiment which corresponds to the playback unit shown in FIG. 10 in the first embodiment described above. The playback unit 200 of the second embodiment is different from the playback unit of the first embodiment in that the line input interface 17 and the microphone input interface 18 are connected to the video-and-sound-data selection determination control unit 201, and is also different in the software processing of the video-and-sound-data selection determination control unit 201. Other configurations are analogous to those in the first embodiment.

Figure 25:
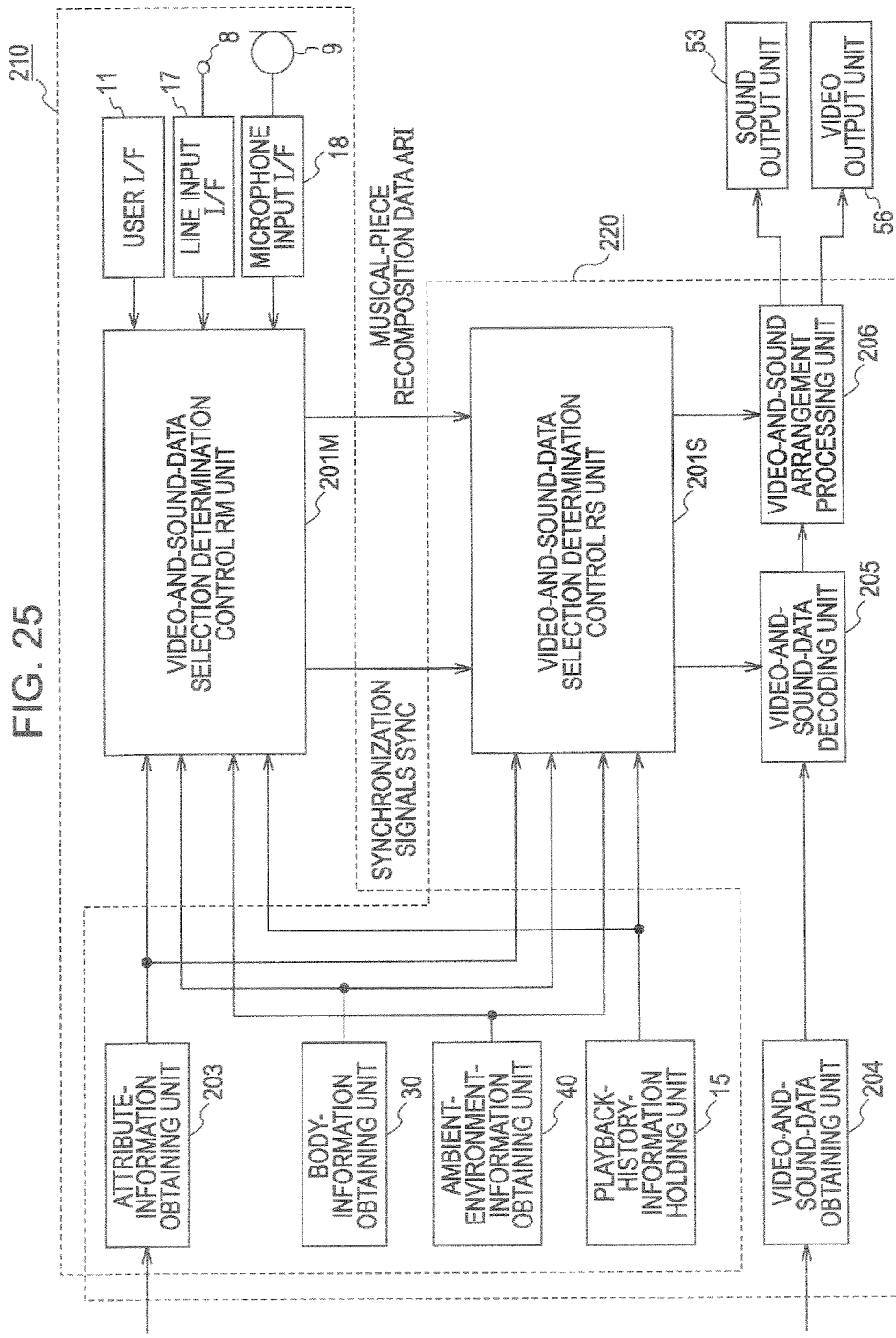
FIG. 25 is a functional block diagram of a major portion of the recording/playback apparatus of the second embodiment shown in FIG. 23.

FIG. 25 is a functional block diagram showing the configuration of the playback unit 200 shown in FIG. 24, when viewed from the viewpoint of the musical-piece recomposition processing. The substantial contents of the configuration are the same as those shown in FIG. 24.

As shown in FIG. 25, the playback unit 200 includes a rhythm master unit 210 and a rhythm slave unit 220. The rhythm master unit 210 generates musical-piece recomposition information and synchronization signals that serve as references for recomposing musical-piece data, and supplies the generated information and signals. The rhythm slave unit 220 receives the synchronization signals and the musical-piece recomposition information from the rhythm master unit 210 and recomposes the musical-piece data.

As in the first embodiment, the video-and-sound-data selection determination control unit 201 is separated into the RM unit 201M, which belongs to the rhythm master unit 210, and the RS unit 201S, which belongs to the rhythm slave unit 220. In this second embodiment, not only the attribute-information obtaining unit 203 but also the body-information obtaining unit 30, the ambient-environment-information obtaining unit 40 and the playback-history-information holding unit 15 belong to both the rhythm master unit 210 and the rhythm slave unit 220.

Thus, the rhythm master unit 210 in this second embodiment has a configuration that includes the RM unit 201M, the attribute-information obtaining unit 203, the body-information obtaining unit 30, the ambient-environment-information obtaining unit 40, and the playback-history-information holding unit 15.

On the other hand, the rhythm slave unit 220 in this second embodiment has a configuration that includes the RS unit 201S, the attribute-information obtaining unit 203, the body-information obtaining unit 30, the ambient-environment-information obtaining unit 40, the playback-history-information holding unit 15, the video-and-sound-data obtaining unit 204, the video-and-sound-data decoding unit 205, and the video-and-sound arrangement processing unit 206, as in the first embodiment. That is, the rhythm slave unit 220 has substantially the same configuration as the one in the first embodiment.

The RM unit 201M of the rhythm master unit 210 is configured so as to generate synchronization signals SYNC serving as references for the recomposition of a musical piece, based on not only the attribute information from the attribute-information obtaining unit 203 but also other data and information. In this second embodiment based on a user input sent through the user interface 11, video-and-sound data externally input through the line input interface 17, externally-collected audio data input through the microphone input interface 18, listener body information obtained by the body-information obtaining unit 30, ambient-environment information obtained by the ambient-environment-information obtaining unit 40, and playback history information read from the playback-history-information holding unit 15, the rhythm master unit 210 generates synchronization signals SYNC serving as references for recomposing a musical piece.

In this second embodiment, based on a user input sent through the user interface 11, video-and-sound data externally input through the line input interface 17, externally-collected audio data input through the microphone input interface 18, listener body information obtained by the body-information obtaining unit 30, ambient-environment information obtained by the ambient-environment-information obtaining unit 40, and playback history information read from the playback-history-information holding unit 15, the rhythm master unit 210 can generate musical-piece recomposition data ARI as well as the synchronization signals SYNC.

Figure 26:
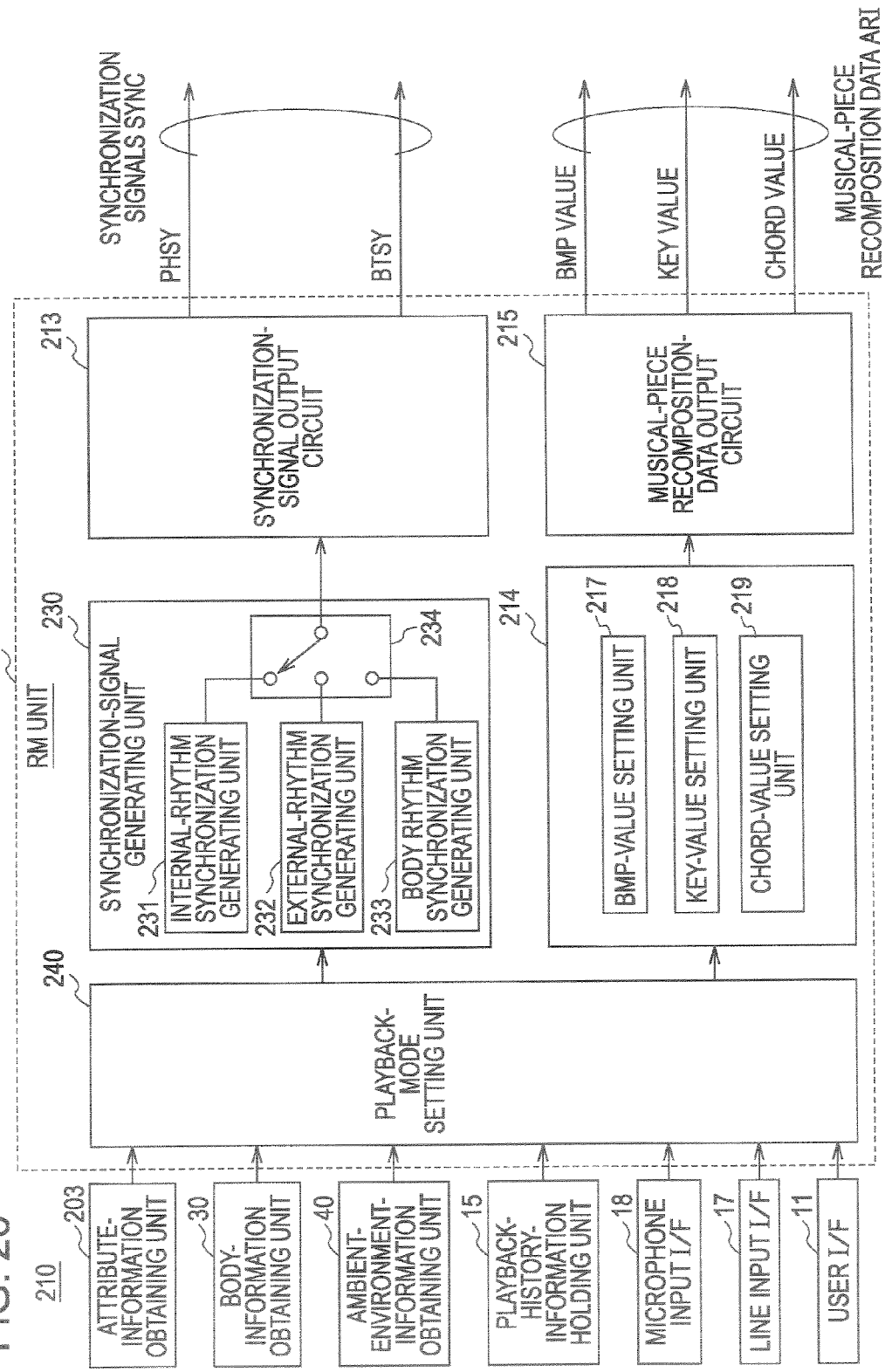
FIG. 26 is a more detailed functional block diagram of part of the functional block diagram shown in FIG. 23.

FIG. 26 is a diagram showing an example of a detailed configuration of the rhythm master unit 210 in this second embodiment and particularly showing, in blocks, details of the function of the RM unit 201M. In this second embodiment, the RM unit 201M has a synchronization-signal generating unit 230 instead of the synchronization-signal generating unit 212 in the first embodiment and also has a playback-mode setting unit 240 instead of the attribute-information analyzing unit 211 in the first embodiment.

Not only the output of the attribute-information obtaining unit 203 but also outputs of the body-information obtaining unit 30, the ambient-environment-information obtaining unit 40, the playback-history-information holding unit 15, the line input interface 17, the microphone input interface 18, and the user interface 11 are supplied to the playback-mode setting unit 240. The other units are configured in the same manner as those in the rhythm master unit 210 in the first embodiment.

The synchronization-signal generating unit 230 has a configuration that includes an internal-rhythm synchronization generating unit 231, an external-rhythm synchronization generating unit 232, a body-rhythm synchronization generating unit 233, and a selection switch circuit 234. The selection switch circuit 234 selects one of synchronization signals output from the three rhythm synchronization generating units 231, 232, and 233.

The internal rhythm synchronization generating unit 231 has, for example, a PLL circuit. The internal-rhythm synchronization generating unit 231 generates synchronization signals SYNC based on a BPM value extracted from the attribute information of music content to be played back, as in the first embodiment, or generates synchronization signals SYNC based on a BPM value set by the user through the user interface 11

The external-rhythm synchronization generating unit 232 has for example, a PLL circuit, and generates synchronization signals SYNC so as to synchronize with an externally input music rhythm, based on a BPM value extracted from an external input signal input through the line input interface 17 or a BPM value extracted from an externally-collected audio signal input through the microphone input interface 18.

The body-rhythm synchronization penetrating unit 233 has, for example, a PLL circuit based on body information obtained from the body-information obtaining unit 30, the biometric-rhythm synchronization generating unit 233 generates synchronization signals SYNC that synchronize with the body information. Examples of the body information include user pulse waves, a walking tempo, a walking speed, and a hand-shake tempo or speed. The three synchronization generating units 231, 232, and 233 can share one PLL circuit.

In this second embodiment, in accordance with a user synchronization-selection input through the user interface 11, the playback-mode setting unit 240 determines which of the internal-rhythm synchronization, the external-rhythm synchronization, and the body rhythm is used to generate the synchronization signals SYNC, and generates a selection control signal for the selection switch circuit 234 in the synchronization-signal generating unit 230.

[Internal Rhythm Synchronization]

(Synchronization with Music Content to be Played Back)

In the case of the internal-rhythm synchronization, selection is further performed between synchronization with the attribute information of music content to be played back and synchronization with the BPM value set by the user through the user interface 11. Similarly, in the case of the external-rhythm synchronization, selection is further performed between synchronization with the external input signal input through the external input terminal 8 and synchronization with the external audio collected by the microphone 9.

When the synchronization with the attribute information of the music content to be played back is selected as the internal-rhythm synchronization, the playback-mode setting unit 240 switches the selection switch circuit 234 to a state in which it selects an output of the internal rhythm synchronization generating unit 231, and obtains the attribute information of the music content to be played back, through the attribute-information obtaining unit 203. The playback-mode setting unit 240 further extracts a BPM value from the attribute information and supplies the extracted BPM value to the internal rhythm synchronization generating unit 231 in the synchronization-signal generating unit 230. The internal rhythm synchronization generating unit 231 generates synchronization signals SYNC that oscillate at an oscillation frequency corresponding to the BPM value supplied thereto and that synchronize in phase with the music rhythm of the music content to be played back.

Thus, the synchronization signals SYNC penetrated based on the BPM value in the attribute information of the music content to be played back are output from the synchronization-signal generating unit 230 to the rhythm slave unit 220 through the synchronization-signal output circuit 213.

In this case, the playback-mode setting unit 240 extracts a key value and a chord value from the attribute information of the music content to be played back, the attribute information being obtained through the attribute-information obtaining unit 203, and supplies the key value and the chord vale, together with the extracted BPM value, to the musical-piece recomposition-data setting unit 214. The musical-piece recomposition-data setting unit 214 sets the BPM value, the key value, and the chord value in the respective setting units 217, 218, and 219.

Thus, musical-piece recomposition data ARI containing the BPM value, the key value, and the chord value of the attribute information of the music content to be played back is output to the rhythm slave unit 220 in synchronization with the synchronization signals SYNC. As a result, as in the first embodiment, the rhythm slave unit 220 recomposes a musical piece based on the attribute information of the music content to be played back.

(Synchronization with User Input)

When the user-input setting synchronization in the internal-rhythm synchronization is selected, the playback-mode setting unit 240 switches the selection switch circuit 234 to a state in which it selects the output of the internal-rhythm synchronization generating unit 231. The playback-mode setting unit 240 also receives a BPM value input through the user interface 11 and supplies the received BPM setting value to the internal-rhythm synchronization generating unit 231 in the synchronization-signal generating unit 230. The internal rhythm synchronization generating unit 231 generates synchronization signals SYNC that oscillate at an oscillation frequency corresponding to the supplied BPM value.

Thus, the synchronization signals SYNC generated based on the BPM value specified by the user are output from the synchronization-signal generating unit 230 to the rhythm slave unit 220 through the synchronization-signal output circuit 213. As a result, the synchronization signals SYNC generated based on the BPM value specified by the user are supplied from the synchronization-signal generating unit 230 to the rhythm slave unit 220 through the synchronization-signal output circuit 213.

At this point, in addition to the BPM value, the playback-mode setting unit 240 receives the key value and the chord value (a chord progression) input through the user interface 11, and supplies the received BPM value, key value, and chord value to the musical-piece recomposition-data setting unit 214. In this case, the key value and the chord value as well as a mode that changes with time are input by the user. The musical-piece recomposition-data setting unit 214 sets the BPM value, the key value, and the chord value in the respective setting units 217, 218, and 219.

Thus, musical-piece recomposition data ARI containing the BPM value, the key value, and the chord value corresponding to values set by the user is output to the rhythm slave unit 220 in synchronization with the synchronization signals SYNC. As a result, the rhythm slave unit 220 car perform playback and output of the sound of the musical piece at the tempo and tune set by the user.

[External Rhythm Synchronization]

When the external-rhythm synchronization is selected, the playback-mode setting unit 240 switches the selection switch circuit 234 to a state in which it selects the output of the external-rhythm synchronization generating unit 232. The tune analyzing unit 13 analyzes sound data received through the line input interface 17 or the microphone input interface 18 in accordance with user selection, and the playback-mode setting unit 240 supplies a BPM value obtained by the analysis to the external-rhythm synchronization generating unit 232. The external-rhythm synchronization generating unit 232 generates synchronization signals SYNC that oscillate at an oscillation frequency corresponding to the BPM value supplied thereto and that synchronize in phase with the externally input music rhythm.

Thus, the synchronization signals SYNC generated based on the BPM value detected from an external input signal or a microphone input signal are output from the synchronization-signal generating unit 230 to the rhythm slave unit 220 through the synchronization-signal output circuit 213.

The playback-mode setting unit 240 extracts a key value and a chord value from the attribute information of the music content to be played back, the attribute information being obtained through the attribute-information obtaining unit 203, and supplies the key value and the chord vale, together with the extracted BPM value, to the musical-piece recomposition-data setting unit 214. The musical-piece recomposition-data setting unit 214 sets the BPM value, the key value, and the chord value in the respective setting units 217, 218, and 219.

Thus, musical-piece recomposition data ARI containing the key value and the chord value and the BPM value detected from the external input signal or the microphone input signal is output to the rhythm slave unit 220 in synchronization with the synchronization signals SYNC.

With this arrangement, in the external-rhythm synchronization state, the rhythm slave unit 220 can perform playback and output of the sound of a musical piece at a tempo set in synchronization with an externally input musical piece.

[Body Rhythm Synchronization]

When the body-rhythm synchronization is selected the playback-mode setting unit 240 switches the selection switch circuit 234 to a state in which it selects an output of the body-rhythm synchronization generating unit 233, and extracts components regarding a tempo and a rhythm from the body information obtained through the body-information obtaining unit 30. Based on the extracted components the playback-mode setting unit 240 generates information corresponding to a BPM value and supplies the generated BPM value to the body-rhythm synchronization generating unit 231 in the synchronization-signal generating unit 230.

With this arrangements the synchronization-signal generating unit 230 generates synchronization signals SYNC that oscillate at an oscillation frequency corresponding to the user's body rhythm and that synchronize in phase with the body rhythm, and supplies the generated synchronization signals SYNC to the rhythm slave unit 220 through the synchronization-signal output circuit 213. As a result, the rhythm slave unit 220 can perform playback and output of the sound of a musical piece at a tempo that is synchronized with the user's body rhythm.

When the body-rhythm synchronization is selected, the synchronization signals SYNC can be generated by also referring to the ambient-environment information from the ambient-environment-information obtaining unit 40, rather than based on only the body information obtained through the body-information obtaining unit 30.

For example, when it is determined from the ambient-environment information that the location where the recording/playback apparatus exists is "sea" the temperature is high, and the weather is not rainy, the synchronization signals SYNC can be generated so as to increase the tempo in synchronization with the body information. When it is determined the location where the recording/playback apparatus exists is "mountain", the synchronization signals SYNC can be generated so as to reduce the tempo in synchronization with the body information.

Body information, such as the pulse of the listener who is listening to a musical piece, may be stored and held as the playback history information in the playback-history-information holding unit 15 so as to correspond to the musical piece. In such a case, the synchronization signals SYNC may be generated by obtaining the body information from the body-information obtaining unit 30, searching the playback-history-information holding unit 15 for a musical piece having body information that is close to the obtained body information and determining a BPM value from the attribute information of the musical piece. In this case, the synchronization signals SYNC may be or may not be synchronized with the body information obtained from the body-information obtaining unit 30.

In this case, in this embodiment, using the body information from the body-information obtaining unit 30 and/or the ambient-environment information from the ambient-environment-information obtaining unit 40 as a search key, the playback-mode setting unit 240 searches for the playback history information held in the playback-history-information holding unit 15, generates a BPM value, a key value, a chord value based on the attribute information of musical pieces resulting from the search, and passes the generated values to the musical-piece recomposition-data setting unit 214. The musical-piece recomposition-data setting unit 214 sets the BPM value, the key value, and the chord value in the respective setting units 217, 218, and 219.

For example, when it is determined from the body information that the listener is on a high, a musical piece he or she usually listened to when he or she was on a high can be detected from the playback history. In this case, the arrangement can be such that synchronization signals SYNC are generated based on the BPM value of the musical piece, the BPM value, the key value, and the chord progression of the musical piece are generated as musical-piece recomposition data ARI, and the musical-piece recomposition data ARI is supplied from the rhythm master unit 210 to the rhythm slave unit 220. With this arrangement, it is possible to playback a musical piece at a tempo and tune that are similar to those of the musical piece he or she usually listens to when he or she is on a high.

When the location, such as a sea or mountain, can be identified from the ambient-environment information or when the weather, such as rain or fair, can be identified therefrom, a musical piece he or she usually listens to can be detected from the playback history by referring to the ambient-environment information contained in the playback history information. In this case, the arrangement can be such that, synchronization signals SYNC are generated based on the BPM value of the musical piece, the BPM value, the key value, and the chord progression of the musical piece are generated as musical-piece recomposition data ARI, and the musical-piece recomposition data ARI is supplied from the rhythm master unit 210 to the rhythm slave unit 220. With this arrangement, under a similar ambient environment condition, it is possible to playback a musical piece at a tempo and tune that are similar to the musical piece he or she usually listens to when he or she is on a high.

Thus, the musical-piece recomposition data ARI containing the BPM value, the key value, and the chord value of the attribute information of a musical piece selected based on the body information and/or the ambient-environment information and the playback history information is output to the rhythm slave unit 220 in synchronization with the synchronization signals SYNC. As a result, the rhythm slave unit 220 recomposes a musical piece at a tempo and tune corresponding to the user's mood and the ambient environment at a given time to perform sound playback.

In the above description, the body information from the body-information obtaining unit 30 and/or the ambient-environment information from the ambient-environment-information obtaining unit 40 was used as a search key. However, a search key, such as an upbeat and uptempo feeling, or a moody and slow tempo, may be generated from the body information and/or the ambient-environment information and be used to search for the playback history information held in the playback-history-information holding unit 15.

The BPM value, key value, chord value, and chord progression can also be generated from the body information and/or the ambient-environment information. For example, a table containing various data values of the BPM value, key value, chord value, and chord progression for various conditions of the body information and/or the ambient-environment information may be prepared, so that the data of the BPM value, key value, chord value, and chord progression that are corresponding to the body information and/or the ambient-environment information are read from the table. The table may be generated from the listener playback history or may be generated by the listener himself or herself.

In this second embodiment, the method for generating the synchronization signals SYNC is not limited to the example described above. For example, the synchronization signals SYNC can be generated based on the ambient-environment information obtained by the ambient-environment-information obtaining unit 40 and the playback history held by the playback-history-information holding unit 15.

For example, the arrangement may be such that the playback history in the playback-history-information holding unit 15 is searched for by using the ambient-environment information obtained from the ambient-environment-information obtaining unit 40 as a search key, ambient-environment information that is the same as or similar to the ambient-environment information in the musical-piece attribute information contained in the playback history stored in the playback-history-information holding unit 15 is detected and the synchronization signals SYNC are generated based on a BPM value contained in the musical-piece attribute information found by using the ambient-environment information as a search key.

In the first embodiment described above, the musical piece to be played back first is selected by the user. In this second embodiment, the first musical piece may also be selected by the user. In the synchronization set by the user in the internal rhythm synchronization, the external rhythm synchronization and the body rhythm synchronization, the rhythm slave unit 220 can detect a musical piece that has the same or a similar musical-piece recomposition data ARI based on the attribute information stored in the attribute-information storage unit 22 in the music-content storage unit 20 to perform playback.

The recomposition processing for a musical piece being played back can also be performed by using the synchronization signals SYNC and the musical-piece recomposition data ARI sent from the rhythm master unit 210, as in the first embodiment.

[Description of Operation of Rhythm Master Unit 210]

Figure 27:
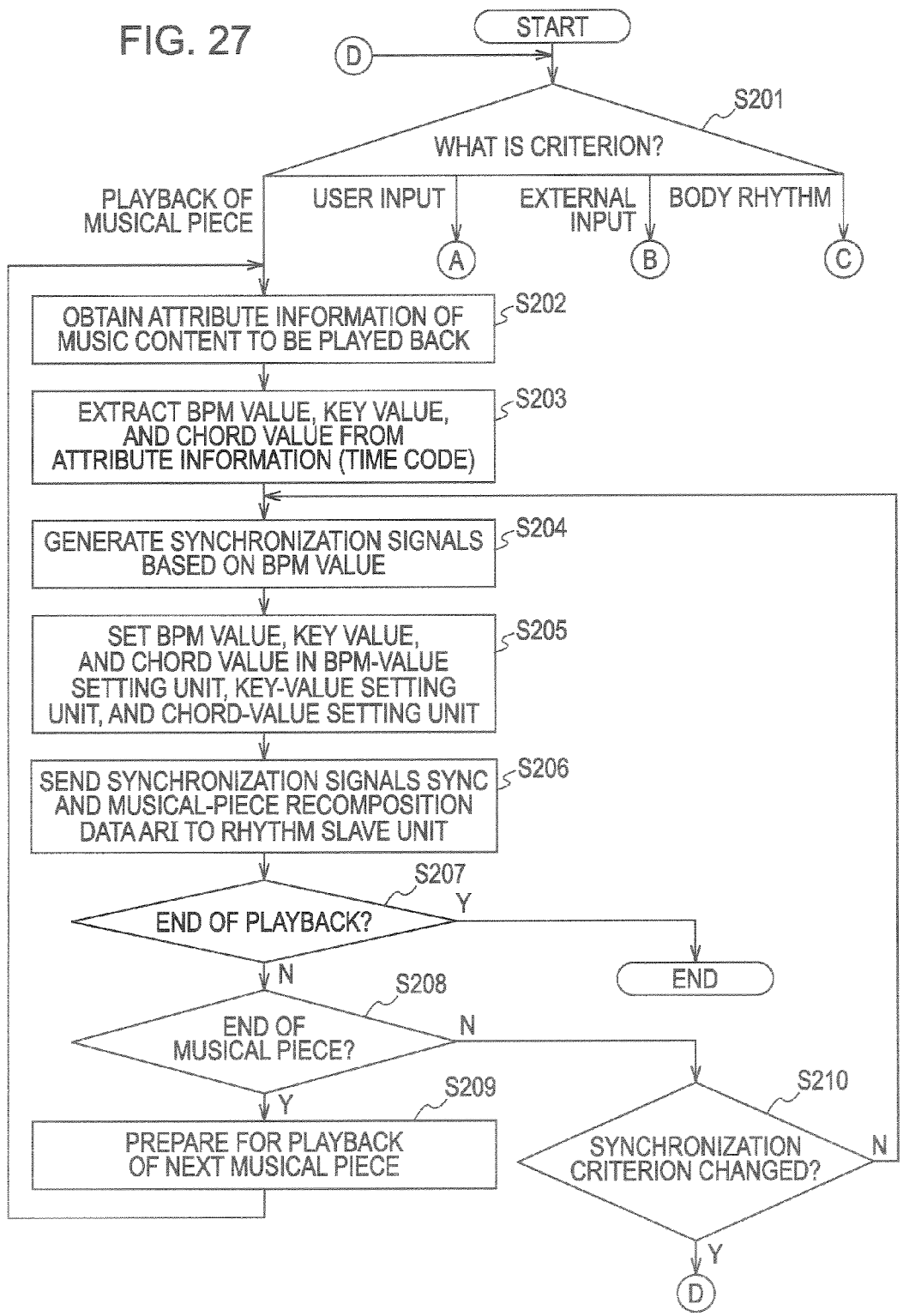
FIG. 27 is a flowchart of a processing operation of a rhythm master unit, which is a portion included in FIG. 23.

Flowcharts of the processing operation performed by the rhythm master unit 210 in this second embodiment will be described with reference to FIGS. 27 to 29.

First, the playback-mode setting unit 240 in this embodiment determines what a synchronization criterion selected and designated by the user is, through the user interface 11 (step S201).

Upon determining in step S201 that the synchronization is the internal-rhythm synchronization and the synchronization criterion is music content to be played back, the playback-mode setting unit 240 in the video-and-sound-data selection determination control RM unit 201M obtains, from the attribute-information storage unit 22 in the music-content storage unit 20 through the attribute-information obtaining unit 203, the attribute information of the music content to be played back (step S202). The playback-mode setting unit 240 then extracts a BPM value, a key value, and a chord value from the obtained attribute information (step S203).

Next, based on the extracted BPM value, the RM unit 201M generates synchronization signals SYNC including a measure synchronization signal PHSY and a beat synchronization signal BTSY (step S204). The extracted BPM value, key value, and chord value are also set in the BPM-value setting unit, the key-value setting unit, and the chord-value setting unit (step S205).

The RM unit 201M then sends the synchronization signals SYNC generated in step S204 and musical-piece recomposition data ARI containing the BPM value, key value, and chord value set in step S94 to the rhythm slave unit 220, respectively (step S206).

A determination is then made as to whether or not the playback is finished (step S207). When the playback is finished, this processing routine ends. When the playback is not finished, a determination is made as to whether or not the musical piece is played back to its end and the playback is finished (step S208). When it is determined that the playback of the musical piece has not been finished, a determination is made as to whether or not, for example, the user has performed operation for changing the synchronization criterion through the user interface 11 (step S210). When it is determined that the operation for changing the synchronization criterion has been performed, the process returns to step S210, and the processing in step S201 and the subsequent steps is repeated.

When it is determined in step S210 that the operation for changing the synchronization criterion has not been performed, the process returns to step S204, and the processing in step S204 and the subsequent steps is repeated.

When it is determined in step S208 that the playback of the musical piece has been finished, preparation is made for the playback of a next selected musical piece (step S209). The process then returns to step S202 and the above-described processing is repeated.

Figure 28:
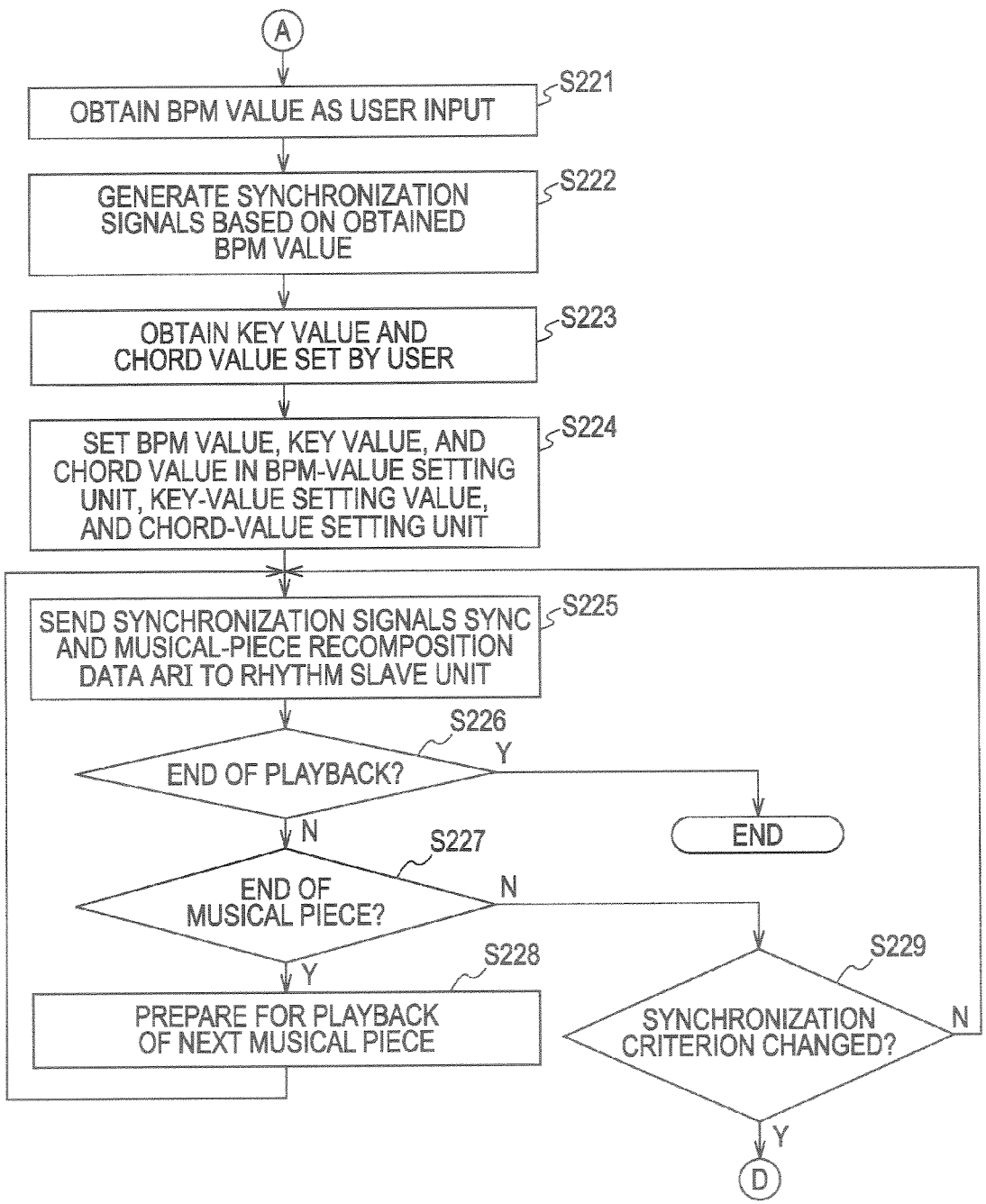
FIG. 28 is part of the flowchart of the processing operation of the rhythm master unit, which is a portion included in FIG. 23.

Next, when it is determined in step S201 that the set synchronization criterion is a user-set input in the case of the internal rhythm synchronization the playback-mode setting unit 240 obtains a BPM value set by the user input (step S221 in FIG. 28). Based on the obtained BPM value, the playback-mode setting unit 240 generates synchronization signals SYNC that include a measure synchronization signal PHSY and a beat synchronization signal BTSY (step S222). The playback-mode setting unit 240 obtains the BPM value, key value, and chord value set by the user input (step S223). The playback-mode setting unit 240 sends the obtained BPM value, key value, and chord value to the musical-piece recomposition-data setting unit 214, so that the values are set in the corresponding BPM-value setting unit 217, the key-value setting unit 218, and the chord-value setting unit 219 (step S224).

The RM unit 201M then sends the synchronization signals SYNC generated in step S222 and musical-piece recomposition data ARI containing the BPM value, key value, and chord value set in step S223 to the rhythm slave unit 220 (step S225).

A determination is then made as to whether or not the playback is finished (step S226). When the playback is finished, this processing routine ends. When the playback is not finished, a determination is made as to whether or not the musical piece is played back to its end and the playback is finished (step S227). When it is determined that the playback of the musical piece has not been finished, a determination is made as to whether or not, for example, the user has performed operation for changing the synchronization criterion through the user interface 11 (step S229). When it is determined that the operation for changing the synchronization criterion has been performed, the process returns to step S201, and the processing in step S201 and the subsequent steps is repeated.

When it is determined in step S229 that the operation for changing the synchronization criterion has not been performed, the process returns to step S225, and the processing in step S225 and the subsequent steps is repeated.

When it is determined in step S227 that the playback of the musical piece has been finished, preparation is made for the playback of a next selected musical piece (step S228). The process then returns to step S225, and the processing in step S225 and the subsequent steps is repeated.

Figure 29:
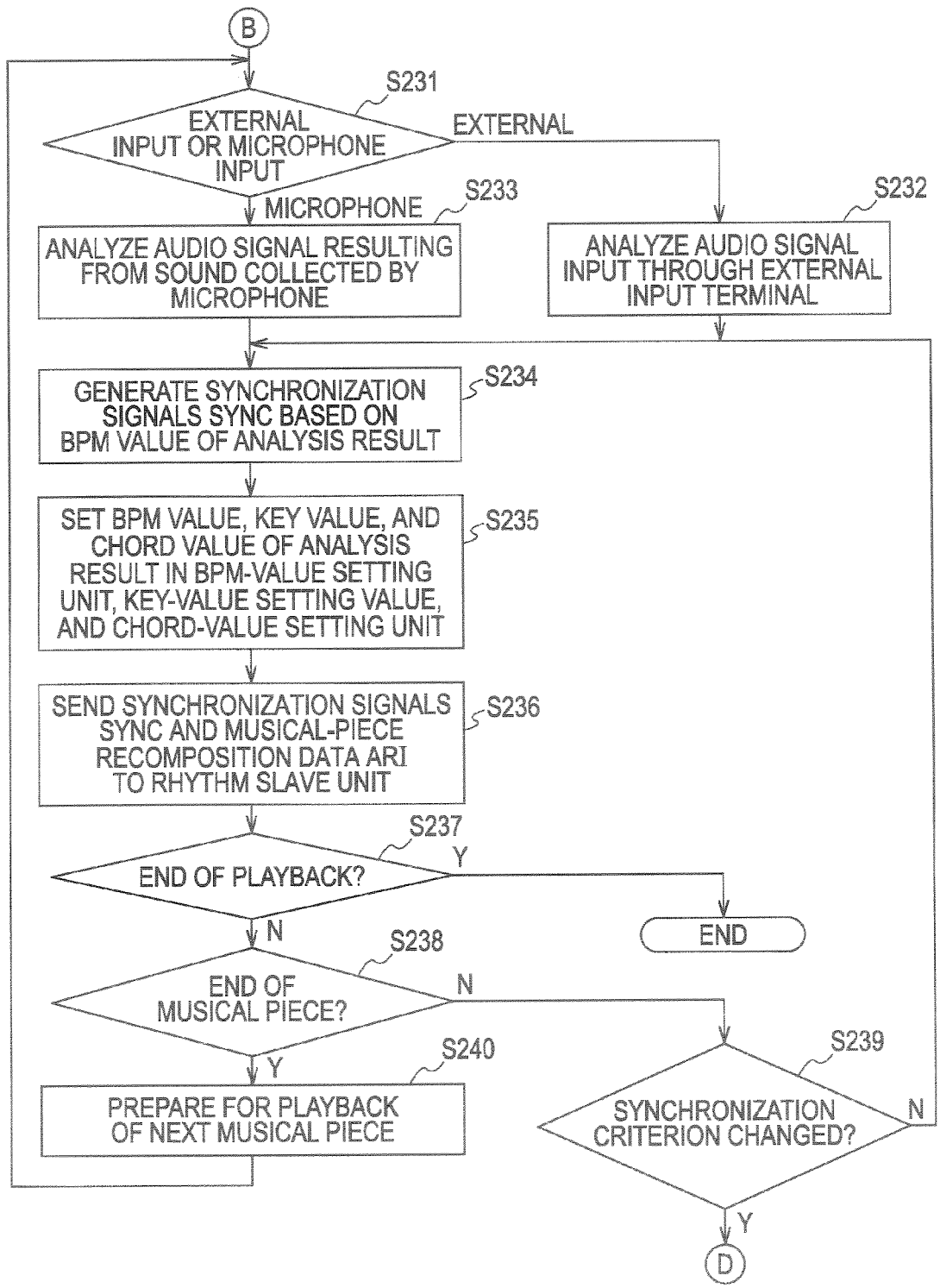
FIG. 29 is part of the flowchart of the processing operation of the rhythm master unit which is a portion included in FIG. 23.
Figure 30:
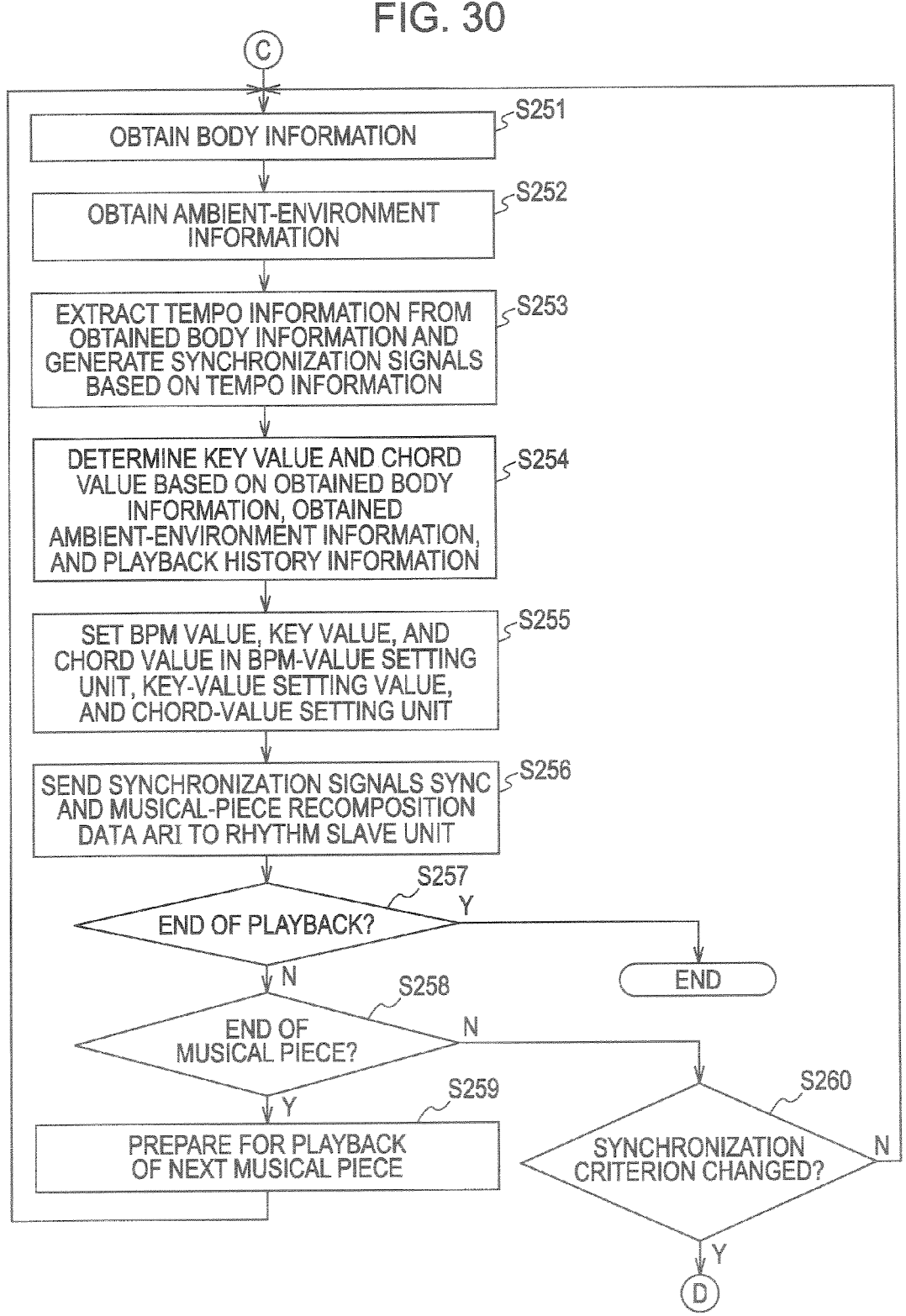
FIG. 30 is part of the flowchart of the processing operation of the rhythm master unit, which is a portion included in FIG. 23.

Next, when it is determined in step S201 that the set synchronization criterion is the external-rhythm synchronization, a determination is made as to whether the external input, which is a synchronization criterion, is an signal input from the external input terminal 8 or an audio signal resulting from sound collected by the microphone 9 (step S231 in FIG. 29).

When it is determined in step S231 that the signal input from the external input terminal 8 is used as the synchronization criterion, the playback-mode setting unit 240 supplies the audio signal, input through the external input terminal 3, to the tune analyzing unit 13, so that the audio signal is analyzed (step S232). When it is determined in step S231 that the audio signal resulting from sound collected by the microphone 9 is used as the synchronization criterion, the playback-mode setting unit 240 supplies the audio signal, obtained from sound collected by the microphone 9, to the tune analyzing unit 13, so that the audio signal is analyzed (step S233).

Subsequent to step S232 or S233, the process proceeds to step S234. A BPM value is determined based on the result of the analysis performed by the tune analyzing unit 13, the determined BPM value is passed to the synchronization-signal generating unit 230, and synchronization signals SYNC are generated (step S234).

The BPM value, a key value, and a chord value are determined based on the result of the analysis performed by the tune analyzing unit 13, and the determined BPM value, key value, and chord value are sent to the musical-piece recomposition-data setting unit 214, so that that values are set in the BPM-value setting unit 217, the key-value setting unit 218, and the chord-value setting unit 219, respectively (step S235).

The RM unit 201M then sends the synchronization signals SYNC generated in step S234 and musical-piece recomposition data ARI containing the BPM value, key value, and chord value set in step S230 to the rhythm slave unit 220 (step S236).

Thereafter, a determination is made as to whether or not the playback is finished (step S237). When the playback is finished, this processing routine ends. When the playback is not finished, a determination is made as to whether or not the musical piece is played back to its end and the playback is finished (step S238). When it is determined that the playback of the musical piece has not been finished, a determination is made as to whether or not, for example, the user has performed operation for changing the synchronization criterion through the user interface 11 (step S239). When it is determined that the operation for changing the synchronization criterion has been performed, the process returns to step S201, and the processing in step S201 and the subsequent steps is repeated.

When it is determined in step S239 that the operation for changing the synchronization criterion has not been performed, the process returns to step S234, and the processing in step S234 and the subsequent steps is repeated.

When it is determined in step S238 that the playback of the musical piece has been finished preparation is made for the playback of a next selected musical piece (step S240). The process then returns to step S231 and the processing in step S231 and the subsequent steps is repeated.

Next, when it is determined in step S201 that the set synchronization criterion is the body-rhythm synchronization the playback-mode setting unit 240 obtains the listener body information through the body-information obtaining unit 30 (step S251) and also obtains the ambient-environment information of the recording/playback apparatus (step S252).

Subsequently, tempo information is extracted from the obtained body information and is supplied to the synchronization-signal generating unit 230, and synchronization signals SYNC are generated from the tempo information (step S253). As described above, a BPM value, a key value, and a chord value are determined based on the body information, the ambient-environment information, and the playback history information of the playback-history-information holding unit 15 (step S254).

The determined BPM value, key value, and chord value are sent to the musical-piece recomposition-data setting unit 214 and are set in the BPM-value setting unit 217, the key-value setting unit 218, and the chord-value setting unit 219, respectively (step S255).

The RM unit 201M then sends the synchronization signals SYNC generated in step S253 and musical-piece recomposition data ARI containing the BPM value, key value, and chord value set in step S255 to the rhythm slave unit 220 (step S256).

A determination is then made as to whether or not the playback is finished (step S257). When the playback is finished, this processing routine ends. When the playback is not finished, a determination is made as to whether or not the musical piece is played back to its end and the playback is finished (step S258). When it is determined that the playback of the musical piece has not been finished, a determination is made as to whether or not, for example, the user has performed operation for changing the synchronization criterion through the user interface 11 (step S260). When it is determined that the operation for changing the synchronization criterion has been performed, the process returns to step S201, and the processing in step S201 and the subsequent steps is repeated.

When it is determined in step S260 that the operation for changing the synchronization criterion has not been performed, the process returns to step S251, and the processing in step S251 and the subsequent steps is repeated.

When it is determined in step S258 that the playback of the musical piece has been finished, preparation is made for the playback of a next selected musical piece (step S259). The process then returns to step S251 and the processing in step S251 and the subsequent steps is repeated.

As described above, in this second embodiment, recomposition for changing a tempo and interval can be performed on a musical piece to be played back. For example, by changing the instruction for changing the tempo and interval through the user interface, the listener can recompose a musical piece being played back so as to meet his or her preference at the time of listening and can perform sound playback and output.

It is also possible to perform recomposition so that a musical piece to be played back is played back in synchronization with externally input audio. A musical piece can also be played back in accordance with the walking or pulse of the listener. In addition, the tempo can be increased or reduced or the key can be increased or reduced in accordance with the ambient environment.

Figure 31:
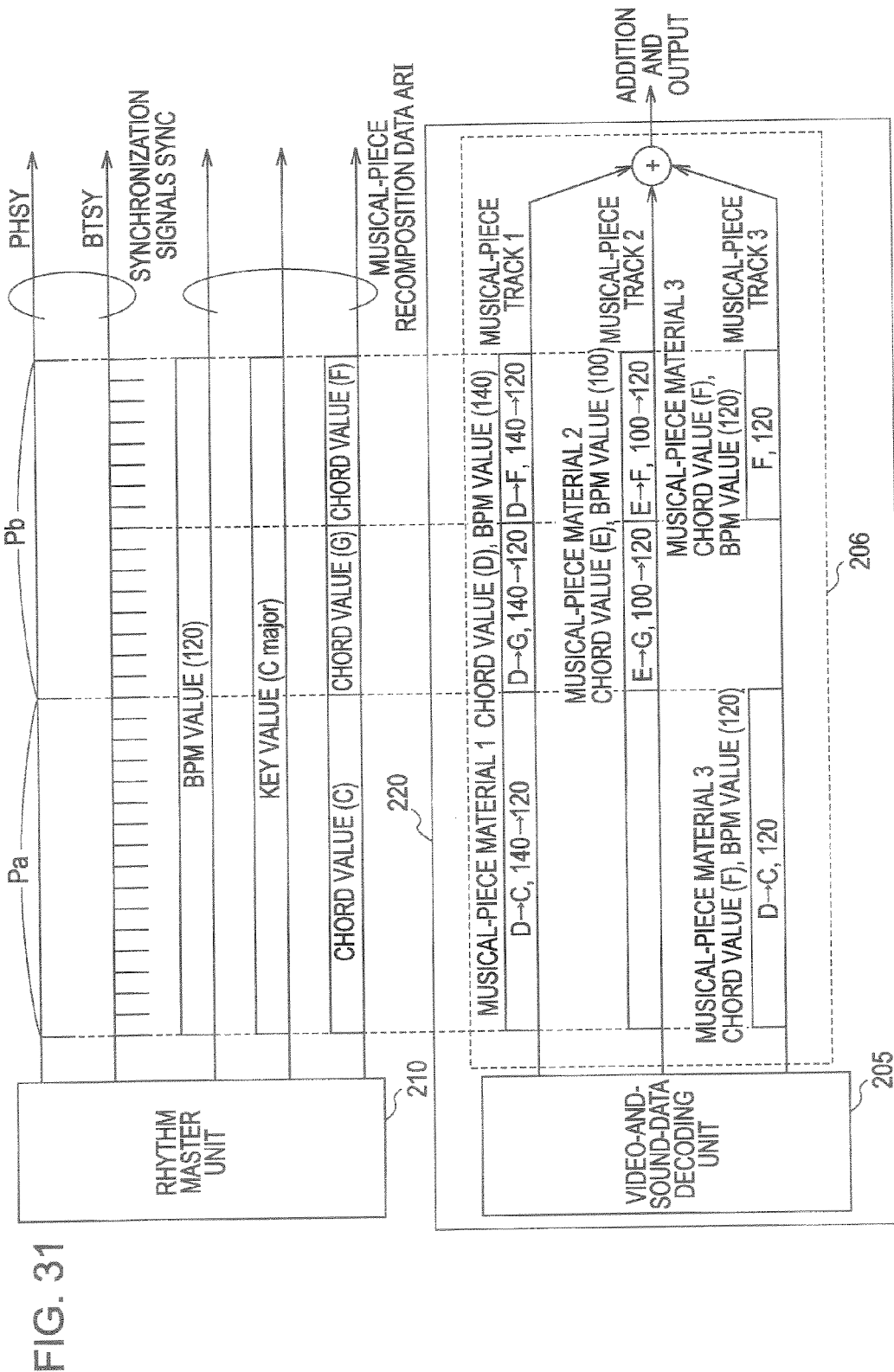
FIG. 31 is a timing diagram for describing the functional block diagram shown in FIG. 23.

FIG. 31 shows a case in which the flows of musical-piece signals in the video-and-sound data decoding unit 205 and the video-and-sound arrangement processing unit 206 in the rhythm slave unit 220 that has received the synchronization signals SYNC and the musical-piece recomposition data ARI sent from the rhythm master unit 210 are synchronized with the synchronization signals SYNC sent from the rhythm master unit 210, and also the operation of musical-piece recomposition in the video-and-sound arrangement processing unit 206 in the rhythm slave unit 220 is performed so as to correspond to the musical-piece recomposition data ARI in the rhythm master unit 210.

In the case of the example shown in FIG. 31, the musical-piece recomposition data ARI is not necessarily extracted from the attribute information of music content to be played back, and has a BPM value that is different from that of the music content to be played back. The key value and the chord value contained in the musical-piece recomposition data ARI are also different from those in the music content to be played back.

In FIG. 31, the music content to be played back becomes a playback signal stream of a musical-piece track 1. In the example shown in FIG. 31 as the musical-piece recomposition data ARI, a BPM value "120", a key value "C major", the target values "C"→"G"→"F" of chord progressions are input from the rhythm master unit 210 to the rhythm slave unit 220.

With respect to the playback signal stream of the music content to be played back for the musical piece track 1, the rhythm slave unit 220 corrects the tempo and interval of the musical piece data of the music content to be played back, the music content being obtained from the music-content storage unit 20 based on the selection instruction issued from the arrangement control unit 221. Two musical-piece materials are output from the video-and-sound data decoding unit 205 as a musical-piece track 2 and a musical-piece track 3. The musical-piece data of the two musical-piece materials are corrected so as to match the target values in the musical-piece recomposition data ARI, and the corrected musical-piece data are eventually mixed with the music content to be played back for the musical-piece track 1.

That is, the sound data of the musical piece track 1 is corrected by the video-and-sound arrangement processing unit 206 so as to match the target BPM value and the target chord value of the musical-piece recomposition data ARI. The sound data of the musical piece tracks 2 and 3 are corrected by the video-and-sound arrangement processing unit 206 so as to match the target BPM value and the target chord value of the musical-piece recomposition data ARI. Thereafter the corrected sound data are mixed with the musical piece data of the musical piece track 1, thereby performing remix processing.

In this case, as shown in FIG. 31, in the sound data of the musical piece track 1, the BPM values in the measure sections Pa and Pb of the musical-piece material obtained through the attribute-information obtaining unit 203 are "140", which is different from the BPM value 1201 of the musical-piece recomposition data ARI. Thus, the tempo of the sound data of the musical piece track 1 is corrected by the video-and-sound arrangement processing unit 206, and thus the musical-piece data of the musical piece track 1 in the measure sections Pa and Pb is corrected so that the BPM value changes from "140" to "120".

In the measure section Pa of the musical-piece material 1, the chord value obtained through the attribute-information obtaining unit 203 is "D", which is different from the chord value "C" of the musical-piece recomposition data ARI. Thus, the interval is corrected by the video-and-sound arrangement processing unit 206, and thus the musical piece data of the musical piece track 1 is corrected so that the chord value changes from "D" to "C".

In this case, in the measure section Pa, the musical-piece material 3 of the musical-piece track 3 is mixed with the sound data of the musical-piece track 1. The BPM value of the musical-piece material 3 in the measure section Pa, the BPM value being obtained through the attribute-information obtaining unit 203, is "120" and is thus the same as the BPM value in the musical-piece recomposition data ARI. Thus, the tempo of the musical-piece data of the musical-piece material 3 is not corrected by the video-and-sound arrangement processing unit 206.

However, the chord value of the musical-piece material 3 in the measure section Pa, the chord value being obtained through the attribute-information obtaining unit 203, is "D"

and is thus different from the chord value "C" in the musical-piece recomposition data ARI. Thus, the interval of the musical-piece data of the musical-piece material 3 is corrected by the interval correcting circuit 226 in the video-and-sound arrangement processing unit 206, as described above, so that a change "D"→"C" is made so as to reach the target value".

In the first half of the next measure section Pb, the chord value of the sound data of the musical piece track 1 the chord value being obtained through the attribute-information obtaining unit 203, is "D" and is thus different from the chord value "G" of the musical-piece recomposition data ARI. Thus, the interval is corrected by the video-and-sound arrangement processing unit 206, and thus the musical piece data of the musical piece track 1 is corrected so that the chord value changes from "D" to "G".

In the last half of the measure section Pb of the musical-piece material 1, the chord value of the musical-piece material 1, the chord value being obtained through the attribute-information obtaining unit 203, is "D" and is thus different from the chord value "F" of the musical-piece recomposition data ARI. Thus, the interval is corrected by the video-and-sound arrangement processing unit 206, and thus the musical piece data of the musical piece track 1 is corrected so that the chord value changes from "D" to "F".

In the first half of the next measure section Pb, a musical-piece material 2 of the musical-piece track 2 is mixed with the sound data of the musical-piece track 1. In the last half of the measure section Pb, the musical-piece material 2 of the musical-piece track 2 and the musical-piece material 3 of the musical-piece track 3 are mixed with the musical-piece data of the musical-piece track 1.

The BPM value and the chord value of the musical-piece material 2 in the first half of the measure section Pb, the values being obtained from the attribute-information obtaining unit 203, are "100" and "E", respectively, and thus are different from the target BPM value "120" and the target chord value "G" in the musical-piece recomposition data ARI. Thus, in the first half of the measure section Pb, the tempo of the musical-piece data of the musical-piece material 2 is corrected by the video-and-sound arrangement processing unit 206 from "100" to "120" so as to match the target BPM value, and the interval of the musical-piece data of the musical-piece material 2 is corrected from "E" to "G" so as to match the target chord value. In the first half of the measure section Pb, the corrected musical-piece data of the musical-piece material 2 is added to the musical-piece data of the musical-piece track 1.

In the last half of the measure section Pb, the BPM value and the chord value of the musical-piece material 2 are "100" and "E", respectively and are different from the target BPM value "120" and the target chord value "F" in the musical-piece recomposition data ARI. The BPM value and the chord value of the musical-piece material 3 are "120" and "F", respectively, and are the same as the target BPM value "120" and the target chord value "F" in the musical-piece recomposition data ARI.

Thus, in the last half of the measure section Pb, the tempo and the interval of the musical-piece material 2 of the musical piece track 2 are corrected by the video-and-sound arrangement processing unit 206 and the resulting musical-piece material 2 is added to the musical-piece data of the musical-piece track 1. The musical-piece material 3 of the musical-piece track 3 is added to the musical-piece data of the musical-piece track 1, without correction.

As described above, in this second embodiment, based on the synchronization signals SYNC and the musical-piece recomposition data ARI from the rhythm master unit, for example, recomposition according to the listener's mood can be performed on music content to be played back. Further, the so-called "remix processing" for mixing another musical-piece material can be smoothly executed on the original musical piece.

In this second embodiment, since the breaks of the measure and beat can be easily detected based on the synchronization signals SYNC, special-effect processing can also be easily performed on musical-piece data. Similarly, in this second embodiment, loop playback processing can also be performed as one type of special-effect processing for remixing.

In this second embodiment, since the synchronization signals can also be chanced based on the body information of the user who listened to a sound-playback musical piece, the ambient-environment information, or the playback history information of the user, variable sound playback can be performed according to the user's preference and an environmental change.

Other Embodiments and Modifications

In the embodiments described above, the music-content storage unit is implemented with a hard-disk device, and the video-and-sound data of music content and the attribute information are recorded in association with each other via the music content identification information (music content IDs). As described above, however, the music-content storage unit may also be implemented with an optical disc, such as a DVD, which is a removal storage medium (a detachable medium).

In the above description for the music-content storage units all music content is accompanied by attribute information. However, using the music content ID as a search key, the attribute information can be obtained and used, through, for example, the Internet. In such a case, a server apparatus that is connected with the Internet has a storage unit for the attribute information.

That is, the video-and-sound data of music content and the attribute information do not have to be stored in one storage unit, and thus may be stored in separate storage units, as long as the configuration thereof can use information for associating the video-and-sound data and the attribute information.

Although the above described embodiments have been directed to a recording/playback apparatus, it goes without saying that the present invention can be applied to a playback apparatus without a recording function.

Figure 19:
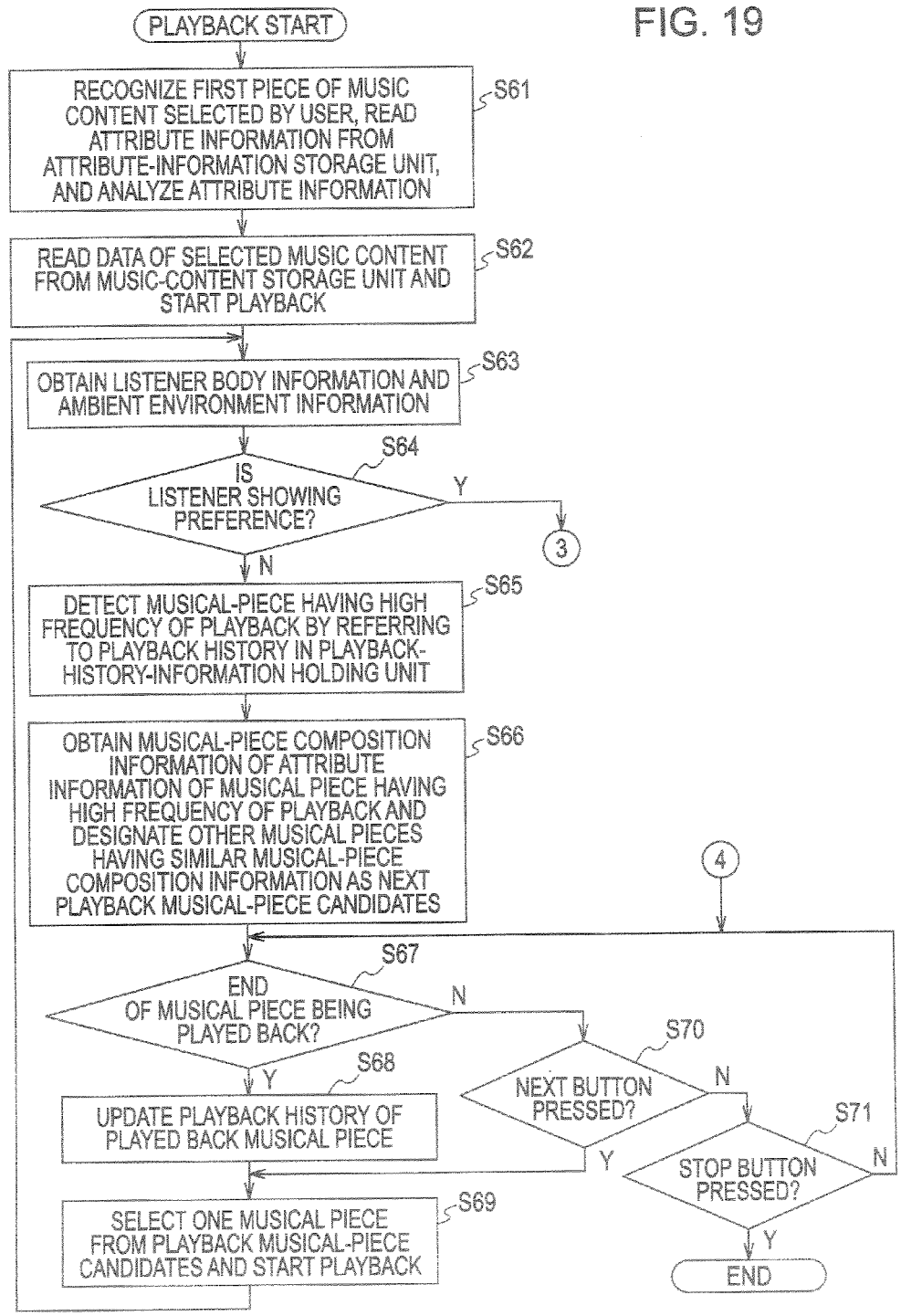
FIG. 19 is part of a flowchart for illustrating the playback processing operation of the recording/playback apparatus shown in FIG. 1.
Figure 20:
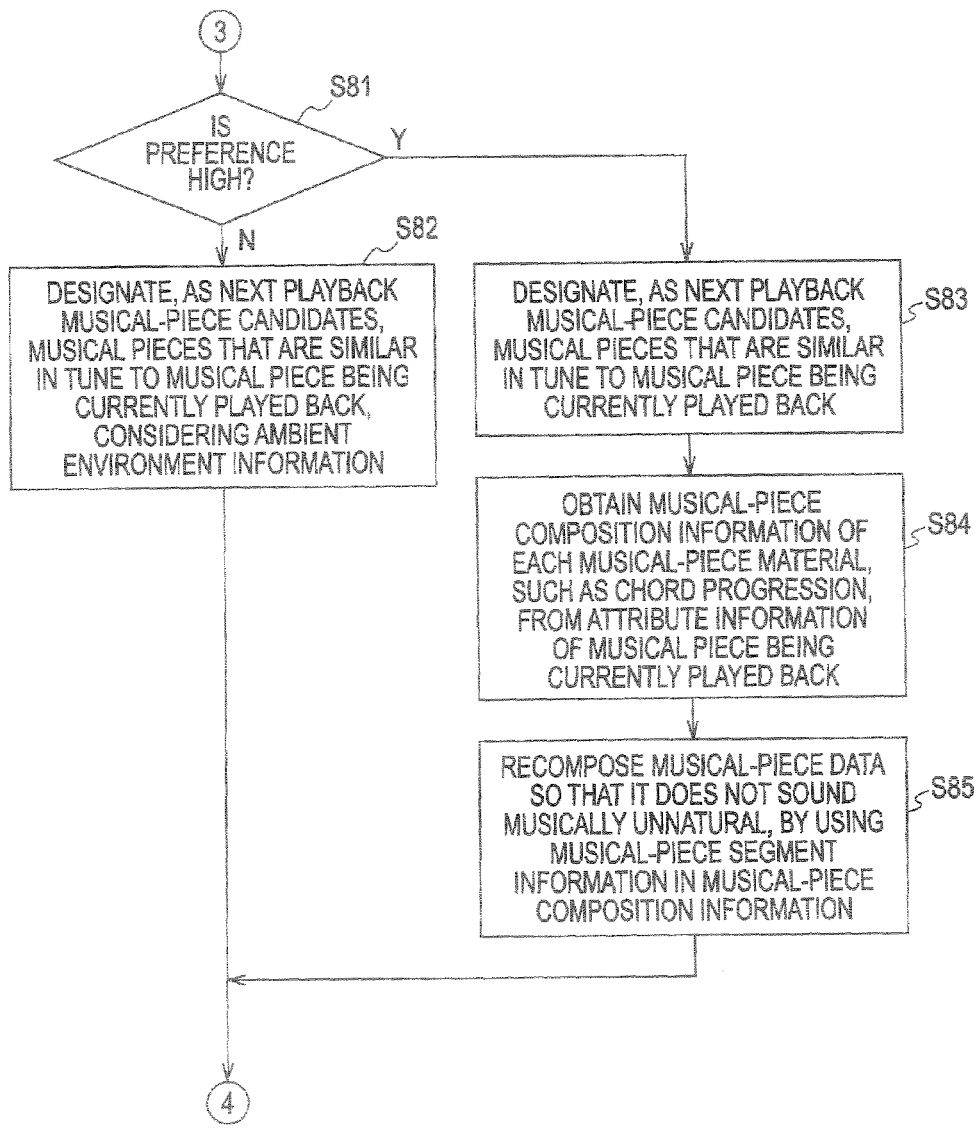
FIG. 20 is part of the flowchart for illustrating the playback processing operation of the recording/playback apparatus shown in FIG. 1.

The flows of the playback processing shown in FIGS. 19 and 20 are merely examples, and thus, how the playback is performed is not limited thereto.

For example, in the above description, when the preference is high, the recomposition processing is performed by, for example, making a change to a tempo or key, performing remixing, and applying an effect with respect to a musical piece being played back. However, regardless of the preference, the recomposition processing may be performed on a musical piece being played back.

The data of music content to be played back, the sound of the music content being to be played back and output, may be recomposed based on the playback history information obtained from the playback-history-information holding unit 15 and the musical-piece composition information in the attribute information of the music content to be played back. In this case, a musical piece that has a high frequency of listening/viewing and that is preferred by the listener may be detected based on the previous playback history. Further, for example, using the musical-piece composition information of the attribute information of the musical piece and the musical-piece composition information of the attribute information of the music-content being played back, the musical-piece data of the high-frequency playback history may be added to the data of the music content being played back, for each musical-piece material. This arrangement makes it possible to smoothly recompose a musical piece being played back into a tune preferred by the listener.

Data of music content to be played back, the sound of the music content being to be played back and output, may be recomposed based on the ambient-environment information obtained from the ambient-environment-information obtaining means and the attribute information of the music content to be played back. The data of music content can be recomposed by, for example, obtaining ambient-environment information such as a sea, mountain, morning, daytime, or nighttime; detecting another musical piece that matches the ambient environment information by using, as a search key, the ambient environment information serving as the attribute information; and smoothly remixing the other musical-piece data resulting from the searching, in accordance with the segment information of the musical-piece recomposition information of the attribute information of the music content to be played back. This arrangement allows the musical piece being played back to be recomposed so as to have a tune corresponding to the ambient environment.

Recomposition processing as described above may be performed by using the musical-piece composition information of the attribute information accompanying the music content, in response to a recomposition request sent by the user through the user interface. In this case the arrangement may also be such that the user can select any of the remixing, effect application, tempo change, key change and chord change.

Although music content that contains video data has been processed in the embodiments described above, it goes without saying that the video data does not necessarily have to be contained.

In the first embodiment described above, when the playback of a musical piece is started, the first musical piece is selected and designated by the user. However, for example, the first musical piece may be automatically selected by the apparatus based on the listener body information, the ambient-environment information or the playback history information.

For example, the arrangement may be such that a determination is made as to whether the listener is excited or calm and a musical piece having a tune that is the same as or that is opposite to the listener's state is selected as the first musical piece. The arrangement may also be such that whether the current location is a mountain or sea is determined based on the ambient-environment information and a musical piece that matches the location is selected as the first musical piece by referring to the ambient-environment information contained in the attribute information. Based on the playback history, a musical piece that is frequently listened to may be selected as the first musical piece.

INDUSTRIAL APPLICABILITY

The present invention allows, for example, the mood, preference, and ambient environment of the listening user to be reflected in a musical piece in real time to recompose a musical piece. Thus, it is possible to improve the entertainment aspect of musical-piece playback.

The invention claimed is:

1. A musical-piece data recomposing apparatus, comprising:
   a musical-piece reading unit configured to input musical-piece data of music content;
   a rhythm master unit configured to generate synchronization signals containing a signal having a period corresponding to a measure of the inputted musical-piece data and another signal having a period corresponding to a beat of the inputted musical-piece data and to generate musical-piece recomposition information in synchronization with the synchronization signals; and
   a rhythm slave unit configured to generate output musical-piece data by recomposing the inputted musical-piece data of music content in accordance with the synchronization signals and the musical-piece recomposition information from the rhythm master unit and to output the output musical-piece data.

2. A musical-piece data recomposing apparatus, comprising:
   a musical-piece reading unit configured to input musical-piece data of multiple pieces of music content;
   a rhythm master unit configured to generate synchronization signals containing a signal having a period corresponding to a measure of the inputted musical-piece data and another signal having a period corresponding to a beat of the inputted musical-piece data and to generate musical-piece recomposition information in synchronization with the synchronization signals; and
   a rhythm slave unit configured to generate output musical-piece data by adding the inputted musical-piece data of multiple pieces of music content in accordance with the synchronization signals and the musical-piece recomposition information from the rhythm master unit and to output the output musical-piece data.

3. The musical-piece data recomposing apparatus according to claim 1,
   wherein the musical-piece recomposition information contains information indicating a tempo.

4. The musical-piece data recomposing apparatus according to claim 1,
   wherein the musical-piece recomposition information contains information indicating a tempo and information indicating a key.

5. The musical-piece data recomposing apparatus according to claim 1,
   wherein the musical-piece recomposition information contains information indicating a tempo and information indicating a chord or a chord progression.

6. The musical-piece data recomposing apparatus according to claim 1,
   wherein the musical-piece recomposition information contains information indicating a tempo, information indicating a key, and information indicating a chord or a chord progression.

7. The musical-piece data recomposing apparatus according to claim 1,
   wherein the synchronization signals are obtained by analyzing an audio signal collected by sound collecting means.

8. The musical-piece data recomposing apparatus according to claim 1,
   wherein the synchronization signals are obtained by analyzing an audio signal input through an external input terminal.

9. The musical-piece data recomposing apparatus according to claim 1, further comprising:
   a user-operation-input receiving unit configured to receive a user operation input,
   wherein, based on the user operation input received by the user-operation-input receiving means, the rhythm master unit generates the synchronization signals and the musical-piece recomposition information.

10. The musical-piece data recomposing apparatus according to claim 1, further comprising:
a sound playback unit configured to perform sound playback of the output musical-piece data output from the rhythm slave unit; and
a body information obtaining unit configured to obtain body information of a listener who listens to the sound playback output,
wherein, based on the obtained listener body information, the rhythm master unit generates the synchronization signals and the musical-piece recomposition information.

11. The musical-piece data recomposing apparatus according to claim 1, further comprising:
an ambient environment information obtaining unit configured to obtain ambient environment information,
wherein, based on the ambient environment information obtained by the ambient-environment-information obtaining unit, the rhythm master unit generates the synchronization signals and the musical-piece recomposition information.

12. The musical-piece data recomposing apparatus according to claim 1, further comprising:
attribute-information obtaining unit configured to obtain attribute information containing musical-piece composition information of each musical-piece material of at least the music content, the attribute information being associated with the music content containing the musical-piece data input to the rhythm slave unit,
wherein the rhythm master unit generates the synchronization signals based on information indicating a rhythm, the information indicating a rhythm included in the attribute information obtained by the attribute-information obtaining unit.

13. The musical-piece data recomposing apparatus according to claim 2, further comprising:
a first obtaining unit configured to obtain, from a music-content-data storage unit in which data of multiple pieces of music content are stored, the data of music content to be played back; and
a second obtaining unit configured to obtain, from an attribute-information storage unit in which attribute information containing musical-piece composition information of each musical-piece material of at least the music content is stored in association with the music content, the attribute information,
wherein the rhythm slave unit analyzes the attribute information of specific music content, the attribute information being obtained by the second obtaining unit, obtains musical-piece data of multiple pieces of music content through the first obtaining unit, the multiple pieces of music content having musical-piece recomposition information similar to the musical-piece recomposition information from the rhythm master unit, generates output musical-piece data by adding the obtained musical piece data based on the synchronization signals, and outputs the output musical-piece data.

14. The musical-piece data recomposing apparatus according to claim 13, wherein the specific music content is music content selected by a user.

15. The musical-piece data recomposing apparatus according to claim 13, wherein the specific music content is music content selected by the apparatus as a playback musical-piece candidate.

16. The musical-piece data recomposing apparatus according to claim 1,
wherein the rhythm master unit comprises:
a first synchronization-signal generating unit configured to obtain the synchronization signals based on an oscillation circuit that oscillates at a set oscillation frequency;
a second synchronization-signal generating unit configured to obtain the synchronization signals by analyzing an audio signal collected by a sound collecting unit or an audio signal input through an external input terminal;
a third synchronization-signal generating unit configured to obtain body information of a listener who listens to a sound playback output and to obtain the synchronization signals based on the obtained listener body information; and
a selecting unit configured to select the synchronization signals from one of the first synchronization-signal generating unit, the second synchronization-signal generating unit, and the third synchronization-signal generating unit and to output the selected synchronization signals.

17. The musical-piece data recomposing apparatus according to claim 16, wherein the selecting unit selects the synchronization signals based on a user selection operation input.

18. The musical-piece data recomposing apparatus according to claim 16, further comprising:
a sound playback unit configured to perform sound playback of the output musical-piece data output from the rhythm slave unit; and
a body information obtaining unit configured to obtain the body information of the listener who listens to the sound playback output,
wherein a selection signal for the selecting unit is generated based on the obtained listener body information.

19. A musical-piece data recomposing method, comprising:
inputting musical-piece data of music content;
generating synchronization signals containing a signal having a period corresponding to a measure of the inputted musical-piece data and another signal having a period corresponding to a beat of the inputted musical-piece data and generating musical-piece recomposition information in synchronization with the synchronization signals; and
generating output musical-piece data by recomposing the inputted musical-piece data of music content in accordance with the synchronization signals and the generated musical-piece recomposition information and of outputting the output musical-piece data.

20. A musical-piece data recomposing method, comprising:
inputting musical-piece data of multiple pieces of music content;
generating synchronization signals containing a signal having a period corresponding to a measure of the inputted musical-piece data and another signal having a period corresponding to a beat of the inputted musical-piece data and generating musical-piece recomposition information in synchronization with the synchronization signals; and
generating output musical-piece data by adding the inputted musical-piece data of multiple pieces of music content in accordance with the synchronization signals and the generated musical-piece recomposition information and of outputting the output musical-piece data.

21. A music-content playback apparatus, comprising:
a music-content-data storage means for storing data of multiple pieces of music content;

first obtaining means for obtaining, from the music-content-data storage means, the data of music content to be played back;

rhythm master means for generating synchronization signals containing a signal having a period corresponding to a measure of the music-content-data obtained by the first obtaining means and another signal having a period corresponding to a beat of the music-content-data obtained by the first obtaining means and generating musical-piece recomposition information in synchronization with the synchronization signals; and rhythm slave means for generating output musical-piece data by recomposing the music-content-data to be played back, the music-content-data obtained by the first obtaining means, in accordance with the synchronization signals and the musical-piece recomposition information from the rhythm master means, and for performing sound playback and output.

22. A music-content playback apparatus according to claim 21, further comprising:

sound collecting means for collecting ambient audio; and
analyzing means for analyzing an audio signal resulting from the collection performed by the sound collecting means,
wherein the rhythm master means generates the synchronization signals and the musical-piece recomposition information according to a tune of the audio collected by the sound collecting means, based on a result of the analysis performed by the analyzing means.

23. The music-content playback apparatus according to claim 21, further comprising:

an external input terminal through which musical-piece data of music content is input from another apparatus; and
tune analyzing means for analyzing a tune of the music content based on the musical piece data input through the external input terminal,
wherein the synchronization signals and the musical-piece recomposition information according to the tune of the music content input through the external input terminal are generated based on a result of the analysis performed by the tune analyzing means.

24. The music-content playback apparatus according to claim 21, further comprising:

means for obtaining body information of a listener who listens to the sound playback output,
wherein the rhythm master means generates the synchronization signals and the musical-piece recomposition information based on the obtained listener body information.

25. The music-content playback apparatus according to claim 21, further comprising:

ambient-environment-information obtaining means for obtaining ambient environment information,
wherein the rhythm master means generates the synchronization signals and the musical-piece recomposition information based on the ambient environment information obtained by the ambient-environment-information obtaining means.

26. The music-content playback apparatus according to claim 21, further comprising:

user-operation-input receiving means for receiving a user operation input,
wherein the rhythm master means generates the synchronization signals and the musical-piece recomposition information based on the user operation input received by the user-operation-input receiving means.

27. A music-content playback apparatus, comprising:

a first obtaining means for obtaining data of music content to be played back from a music-content-data storage means for storing data of multiple pieces of music content;

second obtaining means for obtaining the attribute information from an attribute-information storage means for storing attribute information containing musical-piece composition information of each musical-piece material of at least the music content in association with the music content;

rhythm master means for generating synchronization signals containing a signal having a period corresponding to a measure of a musical piece and another signal having a period corresponding to a beat of the musical piece and generating musical-piece recomposition information in synchronization with the synchronization signals, based on the attribute information of the music content to be played back, the attribute information obtained by the second obtaining means; and rhythm slave means for generating output musical-piece data by recomposing the music content data to be played back, the music content data obtained by the first obtaining means, in accordance with the synchronization signals and the musical-piece recomposition information from the rhythm master means, and for performing sound playback and output.

28. A music-content playback apparatus according to claim 27, further comprising:

means for obtaining body information of a listener who listens to the sound playback output,
wherein the rhythm master means generates the synchronization signals and the musical-piece recomposition information based on the obtained listener body information in addition to the attribute information.

29. The music-content playback apparatus according to claim 27, further comprising:

ambient-environment-information obtaining means for obtaining ambient environment information,
wherein the rhythm master means generates the synchronization signals and the musical-piece recomposition information based on the ambient environment information obtained by the ambient-environment-information obtaining means in addition to the attribute information.

30. The music-content playback apparatus according to claim 27, further comprising:

user-operation-input receiving means for receiving a user operation input,
wherein the rhythm master means generates the synchronization signals and the musical-piece recomposition information based on the user operation input received by the user-operation-input receiving means in addition to the attribute information.

31. The music-content playback apparatus according to claim 27, further comprising:

a playback-history-information holding means for holding previous playback history of music content; and
detecting means for detecting music content having a high frequency of playback by referring to the playback history in the playback-history-information holding means,
wherein the attribute information of the music content having a high frequency of playback, the music content being detected by the detecting means, is obtained from the attribute-information storage means through the second obtaining means, and the rhythm master means generates the synchronization signals and the musical-piece recomposition information based on the obtained attribute information.

32. The music-content playback apparatus according to claim 21,
wherein the musical-piece recomposition information contains information indicating a tempo.

33. The music-content playback apparatus according to claim 21,
wherein the musical-piece recomposition information contains information indicating a tempo and information indicating a key.

34. The music-content playback apparatus according to claim 21,
wherein the musical-piece recomposition information contains information indicating a tempo and information indicating a chord or a chord progression.

35. The music-content playback apparatus according to claim 21,
wherein the musical-piece recomposition information contains information indicating a tempo, information indicating a key, and information indicating a chord or a chord progression.

36. A music-content playback method, comprising:
obtaining data of music content to be played back, from a music-content-data storage unit in which data of multiple pieces of music content are stored;
generating synchronization signals containing a signal having a period corresponding to a measure of a musical piece and another signal having a period corresponding to a beat of the musical piece and generating musical-piece recomposition information in synchronization with the synchronization signals; and
generating output musical-piece data by recomposing the music content data to be played back, the obtained music content data, in accordance with the synchronization signals and the generated musical-piece recomposition information, and of performing sound playback and output.

37. A music-content playback method, comprising:
obtaining data of music content to be played back, from a music-content-data storage unit in which data of multiple pieces of music content are stored;
obtaining, from an attribute-information storage unit in which attribute information containing musical-piece composition information of each musical-piece material of at least the music content is stored in association with the music content, the attribute information;
generating synchronization signals containing a signal having a period corresponding to a measure of a musical piece and another signal having a period corresponding to a beat of the musical piece and generating musical-piece recomposition information in synchronization with the synchronization signals, based on the obtained attribute information of the music content to be played back; and
generating output musical-piece data by recomposing the music content data to be played back, the obtained music content data, in accordance with the synchronization signals and the obtained musical-piece recomposition information obtained, and of performing sound playback and output.

* * * * *